(12) United States Patent
Kitabayashi

(10) Patent No.: US 7,520,621 B2
(45) Date of Patent: Apr. 21, 2009

(54) MANUFACTURING APPARATUS OF OPTICAL DEVICE, MANUFACTURING METHOD THEREOF AND PROJECTOR

(75) Inventor: Masashi Kitabayashi, Azmino (JP)

(73) Assignee: Seiko Epson Corporation, Tokyo (JP)

( * ) Notice: Subject to any disclaimer, the term of this patent is extended or adjusted under 35 U.S.C. 154(b) by 471 days.

(21) Appl. No.: 11/339,513

(22) Filed: Jan. 26, 2006

(65) Prior Publication Data

US 2006/0170886 A1 Aug. 3, 2006

(30) Foreign Application Priority Data

Feb. 3, 2005 (JP) .............................. 2005-027901
Jun. 6, 2005 (JP) .............................. 2005-165216

(51) Int. Cl.
G03B 21/14 (2006.01)
G03B 21/00 (2006.01)

(52) U.S. Cl. ........................................ 353/69; 353/122

(58) Field of Classification Search ................. 353/122; 356/138

See application file for complete search history.

(56) References Cited

U.S. PATENT DOCUMENTS 6,923,545 B2  8/2005  Kitabayashi
7,004,590 B2  2/2006  Kitabayashi
2004/0263807 A1* 12/2004  Kitabayashi ................ 353/122

FOREIGN PATENT DOCUMENTS

JP  A 2000-147448   5/2000
JP  A-2003-162003   6/2003
JP  A-2003-337211   11/2003

OTHER PUBLICATIONS

Congzhou, Z.; "The Study of Laser Scanning Measuring;" *J. Changchun Inst. Opt. & Fine Mech.;* vol. 20; No. 1; Mar. 1997; pp. 66-67. (with abstract) Abstract only.

* cited by examiner

*Primary Examiner*—William C Dowling
*Assistant Examiner*—Danell L Owens
(74) *Attorney, Agent, or Firm*—Oliff & Berridge, PLC

(57) ABSTRACT

A manufacturing apparatus for manufacturing a projection optical system has a plurality of optical modulators, a color-combining optical device and a projection optical device. The manufacturing apparatus positions each of the optical modulators relative to the color-combining optical device and at a back-focus position of the projection optical device. The back-focus position is determined by calculating a deviation amount of the optical path length of a light beam from the optical modulator to the projection optical device based on the external dimensions of the color-combining optical device when the color-combining optical device is interposed between the optical modulator and the projection optical device.

7 Claims, 34 Drawing Sheets

REFERENCE POSITION, MEASUREMENT POSITION

MANUFACTURING APPARATUS OF OPTICAL DEVICE, MANUFACTURING METHOD THEREOF AND PROJECTOR

The entire disclosures of Japanese Patent Application No. 2005-27901, filed Feb. 3, 2005 and Japanese Patent Application No. 2005-165216, filed Jun. 6, 2005, are expressly incorporated by reference herein.

BACKGROUND

1. Technical Field

The present invention relates to a manufacturing apparatus of an optical device, a manufacturing method thereof and a projector.

2. Related Art

There has been known a projector that includes an optical device and a projection optical device (projection lens), the optical device having three optical modulators (liquid crystal panels) that respectively modulate each of three color lights (R, G, B) in accordance with image information and a color-combining optical device (cross dichroic prism) that has the optical modulators and combines three modulated light beams to form an image light, and the projection optical device projecting the formed image light in an enlarged manner.

In the above projector, the liquid crystal panels need to be at back-focus positions of the projection lens in order to obtain a clear image. To make the image clearer, it is further necessary to prevent pixel displacement among the liquid crystal panels.

To meet these requirements, a focus adjustment for accurately positioning the liquid crystal panels at the back-focus positions of the projection-lens and an alignment adjustment for aligning pixels of the liquid crystal panels are precisely performed in the manufacturing process of the projector. And a manufacturing apparatus of an optical device that manufactures the optical device by performing such adjustments has been known (see, for instance, JP-A-2000-147448).

The manufacturing apparatus of the optical device disclosed in the above patent publication includes: an adjustment light-source device for introducing a light beam to liquid crystal panels; a light-beam detector for detecting the light beams having passed through the liquid crystal panels and a cross dichroic prism; and position-adjusting devices for performing the focus and alignment adjustments of the liquid crystal panels.

In the focus adjustment performed by the manufacturing apparatus, while the liquid crystal panels are moved respectively in a direction toward and away from the cross dichroic prism, the light beams having passed through the liquid crystal panels and cross dichroic prism are detected respectively at several positions in the direction. For each detected image, luminance values are calculated at several positions in order to FIG. 10 out variations in the luminance values (a dispersion value of the luminance). The position of the liquid crystal panel corresponding to the image of which dispersion value of the luminance is the largest among the plurality of images, i.e., the image with the highest contrast is determined as a focus position.

However, in the focus adjustment performed in the manufacturing apparatus disclosed in the above patent publication, the light beams having passed through the liquid crystal panels and cross dichroic prism need to be detected at many positions in the direction toward and away from the cross dichroic prism, and the focus position of the liquid crystal panels is determined based on the many detected images. Accordingly, the adjustment requires a long time for respectively moving the liquid crystal panels to the positions to detect the images as well as for determining the focus position based on the many images, which impedes speedy manufacturing of the optical device.

SUMMARY

An advantage of some aspects of the invention is to provide a manufacturing apparatus of an optical device that is capable of speedy manufacturing of the optical device, a manufacturing method thereof and a projector.

A manufacturing apparatus of an optical device that is used for a projector according to an aspect of the invention, the optical device including a plurality of optical modulators that respectively modulate each of a plurality of color lights in accordance with image information; and a color-combining optical device that combines the color lights modulated by the optical modulators to form an image light. The projector includes a projection optical device that is disposed on a downstream of an optical path of the optical device and projects the image light formed by the optical device in an enlarged manner. The manufacturing apparatus includes a holding unit that holds the color-combining optical device at a predetermined position; position adjusters that respectively hold the optical modulators and adjust positions of the optical modulators relative to the color-combining optical device; dimension-measuring units that measure an external dimension of the color-combining optical device in an optical-axis direction; and a controlling unit that drives the position adjusters. The controlling unit includes a storage that stores distance information relating to a back-focus distance defined in accordance with specifications of the projection optical device; a deviation-amount calculating unit that calculates a deviation amount of an optical path length of a light beam from the optical modulator to the projection optical device when the color-combining optical device is interposed between the optical modulator and the projection optical device based on the external dimension of the color-combining optical device in the optical-axis direction measured by the dimension-measuring units; a back-focus-position calculating unit that calculates a back-focus position of the projection optical device in correspondence with a deviation of the optical path length based on the distance information stored in the storage and the deviation amount of the optical path length calculated by the deviation-amount calculating unit; and a drive controller that drives the position adjusters and positions the optical modulators at the back-focus positions of the projection optical device in correspondence with the deviation of the optical path length calculated by the back-focus-position calculating unit.

In the aspect of the invention, since the manufacturing apparatus of the optical device includes the holding unit, the position adjuster, the dimension-measuring units and the controlling unit, the optical device can be manufactured, for instance, in a below described manner.

Firstly, the color-combining optical device is held by the holding unit. And, the optical modulators are held by the position adjusters.

Next, the external dimension of the color-combining optical device in the optical-axis direction is measured by the dimension-measuring units.

Then, the deviation-amount calculating unit of the controlling unit calculates the deviation amount between the optical path length in a condition that the light beam passes through an air layer and the optical path length in a condition that the light beam passes though the color-combining optical device based on the external dimension in the optical-axis direction of the color-combining optical device measured by the dimension-measuring units. The back-focus-position calculating unit of the controlling unit calculates the back-focus position of the projection optical device in correspondence with the deviation of the optical path length in the condition that the color-combining optical device is interposed between the optical modulator and the projection optical device based on the distance information on the back-focus distance defined in accordance with the specifications of the projection lens 160 stored in the storage and the deviation amount of the optical path length calculated by the deviation-amount calculating unit. The drive controller of the controlling unit drives the position adjusters to position the optical modulators at the back-focus positions calculated by the back-focus-position calculating unit.

According to the aspect of the invention, as explained above, since the manufacturing apparatus employs the above-described arrangement, the back-focus positions can be quickly judged without detecting the light beam passing through the optical modulator and the color-combining optical device at many positions in the direction toward and away from the color-combining optical device. Hence, the optical device body can be quickly manufactured without spending a lot of time in the position-adjusting of the optical modulator.

Since the external dimension in the optical-axis direction of the color-combining optical device is actually measured and the deviation amount of the optical path length and the back-focus position are calculated based on the measured external dimension, the back-focus position can be accurately calculated even if the color-combining optical device to be a product has a manufacturing error, so that the optical modulators can be located at the accurate back-focus positions, thereby precisely manufacturing the optical device as compared with the arrangement in which the deviation amount of the optical path length and the back-focus position are calculated based on the designed external dimension of the color-combining optical device.

Unlike the related arts, the manufacturing apparatus may not be provided with an adjustment light-source device, a light-beam detector, an image processing device that is for processing an image detected by the light-beam detector, or the like. By employing such arrangement, the arrangement of the manufacturing apparatus can be simple, thereby reducing the manufacturing cost of the manufacturing apparatus.

Preferably, the above-described manufacturing apparatus of the optical device further includes an adjustment light-source device that introduces a position-adjusting light beam to the optical modulator; and a light-beam detector that detects the image light passing through the optical modulator and the color-combining optical device. The controlling unit preferably includes a capturing unit that captures the image detected by the light-beam detector and converts the captured image to an image signal; and an image processor that performs an image processing based on the image signal output by the capturing unit and judges best attitude positions of the optical modulators based on results of the image processing. After positioning the optical modulators at the back-focus positions of the projection optical device in correspondence with the deviation of the optical path length, the drive controller preferably drives the position adjusters based on the best attitude positions judged by the image processor and finely adjusts the positions of the optical modulators.

In the aspect of the invention, the controlling unit has the capturing unit and the image processor to capture the images detected by the light-beam detector and to perform the image-processing for judging the best attitude positions of the optical modulators. The drive controller, after positioning the optical modulators at the back-focus positions of the projection optical device in correspondence with the deviation of the optical path length, drives the position adjuster based on the best attitude positions judged by the image processor and finely adjusts the positions of the optical modulators. Accordingly, the optical modulators can be precisely positioned at the back-focus positions of the projection optical device, thereby precisely manufacturing the optical device.

Since the positions of the optical modulators are finely adjusted after the optical modulators are positioned at the back-focus positions of the projection optical device which correspond to the deviation of the optical path length, the optical modulators do not need to be moved a long distance in the direction toward and away from the color-combining optical device unlike the related arts. Hence, the optical device can be quickly and precisely manufactured without spending a lot of time in the adjustment of the optical modulator.

Preferably, with the above-described manufacturing apparatus of the optical device, the dimension-measuring unit includes a laser-beam irradiation unit that irradiates a laser beam to a reference position or a measurement position in measuring an external dimension of an object to be measured in the optical-axis direction; and a laser-beam-receiving unit that receives the laser beam reflected at the reference position or the measurement position. And the dimension-measuring unit measures the external dimension of the object to be measured in the optical-axis direction based on a deviation between a light-receiving position on the laser-beam-receiving unit of the laser beam reflected at the reference position and a light-receiving position on the laser-beam-receiving unit of the laser beam reflected at the measurement position.

In the aspect of the invention, the dimension-measuring unit has the laser-beam irradiation unit and the laser-beam-receiving unit and has the arrangement in which the external dimension of the color-combining optical device in the optical-axis direction is measured in a non-contact method, so that the external dimension of the color-combining optical device in the optical-axis direction can be measured more quickly as compared with the arrangement employing a contact-type dimension-measuring unit.

Preferably, with the above-described manufacturing apparatus of the optical device, the color-combining optical device has a rectangular shape in plan view, and the dimension-measuring unit has two image pickups that respectively capture rectangular diagonal areas of the color-combining optical device and measure the external dimension of the color-combining optical device in the optical-axis direction based on a deviation between designed reference top positions of reference diagonal areas of the color-combining optical device and top positions of the diagonal areas captured by the two image pickups.

According to the aspect of the invention, since the dimension-measuring unit has the two image pickups and measures the external dimension in the optical-axis direction of the color-combining optical device based on the deviation between the designed reference top positions of the reference diagonal areas and the captured top positions of the diagonal areas, the external dimension in the optical-axis direction of the color-combining optical device can be quickly measured as compared with the arrangement in which in a contact-type dimension-measuring unit is employed for measuring the external dimension by bringing a probe into contact with the color-combining optical device, thereby quickly manufacturing the optical device.

Preferably, with the above-described manufacturing apparatus of the optical device, the dimension-measuring unit measures a rotation angle of the color-combining optical device relative to a designed reference position based on the reference diagonal areas and the diagonal areas captured by the two image pickups. The controlling unit has a position-adjustment-amount calculating section that calculates position adjustment amounts of the optical modulators in accordance with a rotation of the color-combining optical device based on the rotation angle of the color-combining optical device measured by the dimension-measuring unit. And the drive controller drives the position adjusters based on the position adjustment amounts calculated by the position-adjustment-amount calculating section and positions the optical modulators at positions corresponding to the position adjustment amounts.

For instance, the color-combining optical device may be arranged so as to have the color-combining optical element (i.e., cross dichroic prism) that has the four reflecting surfaces disposed in a substantially X shape such that the incident angles respectively become substantially 45 degrees and one pair of the reflecting surfaces along one extending direction of the X shape reflect the light beam of a wavelength range different from the other pair of the surfaces; and a fixing plate that is adhered and fixed to the surface intersecting the reflecting surface in the X shape of the color-combining optical device. The three optical modulators are provided and respectively disposed at the three light incident surfaces of the color-combining optical element.

When the color-combining optical device is held by the holding unit, the below-described problem occurs in a case that the color-combining optical element is rotated by the predetermined angle relative to the designed reference position.

The reflecting surface of the color-combining optical element is also rotated relative to the designed reference position, so that even when the optical modulators are positioned at the back-focus positions calculated by the above-described method, the introduction position of the light beam passing through the optical modulator and the color-combining optical element which are respectively confronting each other tends to displace from the designed reference introduction position relative to the projection optical device disposed on the light beam irradiation surface side of the color-combining optical element when the optical device is mounted in the projector. Thus, even when the optical modulators are positioned at the back-focus positions calculated by the above-described method, accurately positioning the optical modulators relative to the color-combining optical device is difficult in the case that the color-combining optical element is rotated by the predetermined rotation angle relative to the designed reference position when the color-combining optical device is held by the holding unit.

In the aspect of the invention, the dimension-measuring unit measures the external dimension of the color-combining optical device in the optical-axis direction and also measures the rotation angle of the color-combining optical device relative to the designed reference position based on the reference diagonal areas and the captured diagonal areas. The position-adjustment-amount calculating section of the controlling unit calculates the position adjustment amount of the optical modulators, which corresponds to the rotation of the color-combining optical device, based on the rotation angle of the color-combining optical device measured by the dimension-measuring unit. The drive controller then positions the optical modulators at the positions corresponding to the rotation of the color-combining optical device based on the position adjustment amount calculated by the position-adjustment-amount calculating section.

Thus, by positioning the optical modulators at the back-focus positions calculated by the above-described method and then moving the optical modulators to the position in accordance with the position adjustment amount, the optical modulators can be accurately positioned relative to the color-combining optical device even when the color-combining optical device is rotated by the predetermined rotation angle relative to the designed reference position.

With a manufacturing method of an optical device that is used for a projector according to another aspect of the invention, the optical device includes a plurality of optical modulators that respectively modulate each of a plurality of color lights in accordance with image information; and a color-combining optical device that combines the color lights modulated by the optical modulators to form an image light, and the projector includes a projection optical device that is disposed on a downstream of an optical path of the optical device and projects the image light formed by the optical device in an enlarged manner. The manufacturing method includes the processes of: device-attaching for attaching the color-combining optical device at a predetermined position; dimension-measuring for measuring an external dimension of the color-combining optical device in an optical-axis direction; deviation-amount-calculating for calculating a deviation amount of an optical path length of a light beam from the optical modulator to the projection optical device when the color-combining optical device is interposed between the optical modulator and the projection optical device based on the external dimension of the color-combining optical device in the optical-axis direction measured in the dimension-measuring; back-focus-position-calculating for calculating a back-focus position of the projection optical device in correspondence with a deviation of the optical path length based on the deviation amount of the optical path length calculated in the deviation-amount-calculating and distance information relating to a back-focus distance defined in accordance with specifications of the projection optical device; optical-modulator-holding for holding the optical modulators by the position adjusters; and positioning the optical modulators at the back-focus positions of the projection optical device in correspondence with the deviation of the optical path length calculated in the back-focus-position-calculating by driving the position adjusters.

According to the aspect of the invention, since the manufacturing method of the optical device includes the device-attaching process, the dimension-measuring process, the deviation-amount-calculating process, the back-focus-position-calculating process, the optical-modulator-holding and the positioning process, the same advantages as the above manufacturing apparatus of the optical device can be attained.

And the optical device can be manufactured quickly, thereby reducing the unit cost of the optical device.

A projector according to yet another aspect of the invention includes: a light source device; an optical device that is manufactured by the above-described manufacturing method of the optical device; and a projection optical device that projects an image light formed by the optical device in an enlarged manner.

According to the aspect of the invention, since the projector includes the optical device manufactured by the above explained manufacturing method of the optical device, the same advantages as the above manufacturing method of the optical device can be attained.

And the projector also has the optical device that enables the unit cost down, thereby decreasing the unit cost of the entire projector.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

1 First Exemplary Embodiment

A first exemplary embodiment of the invention will be described below with reference to the attached drawings.

Arrangement of Projector

Figure 1:
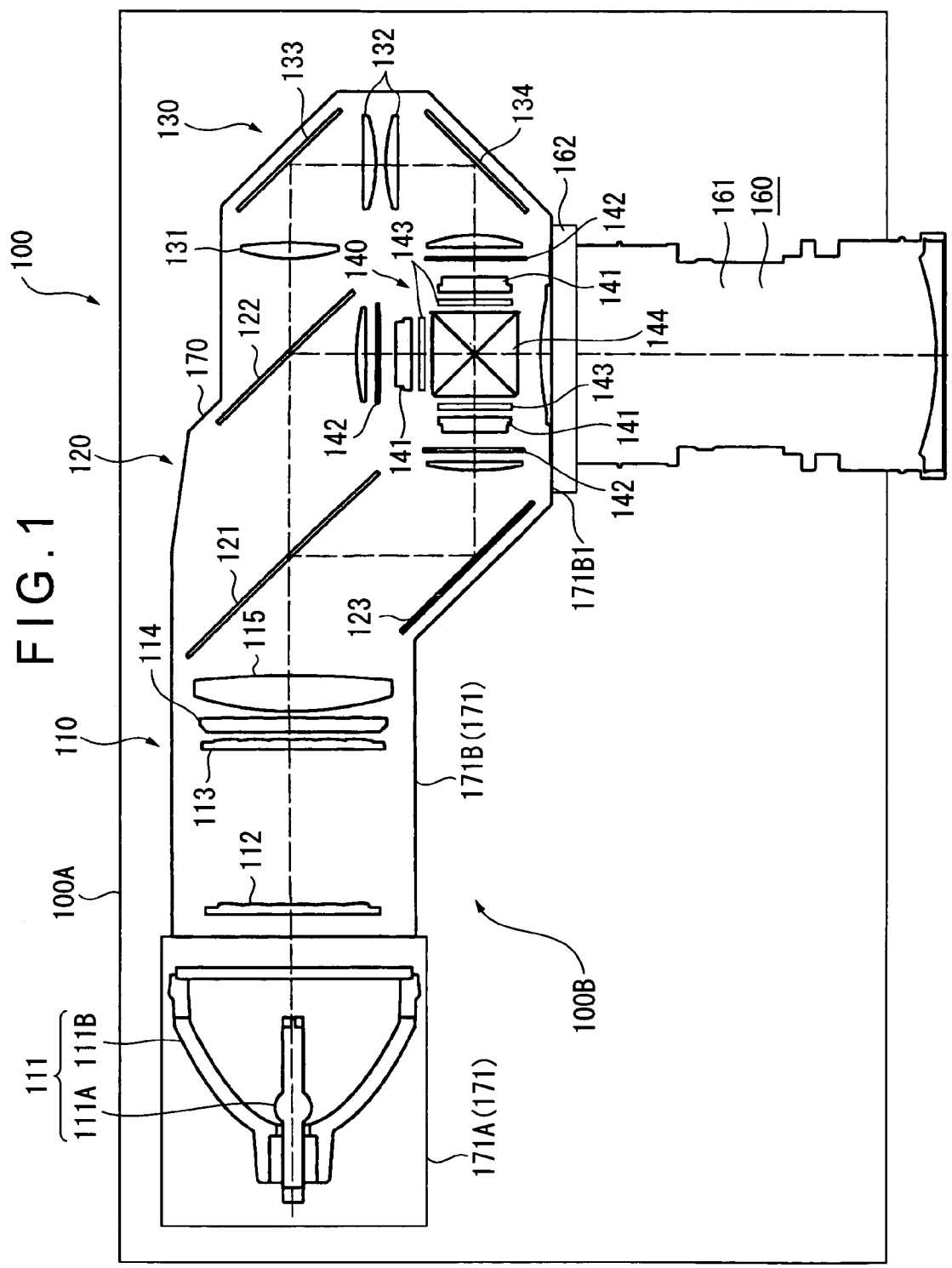
FIG. 1 is a schematic illustration showing an arrangement of a projector having an optical device to be manufactured according to a first exemplary embodiment.

FIG. 1 is a schematic illustration showing an arrangement of a projector 100 having an optical device to be manufactured.

The projector 100 modulates light beams irradiated by a light source in accordance with image information in order to form a color image and projects the formed color image on a screen (not shown) in an enlarged manner. As shown in FIG. 1, the projector 100 has an exterior case 100A and an optical unit 100B.

Although not shown in FIG. 1, a power supply unit that supplies components of the projector 100 with power from outside, a cooling unit that cools the inside of the projector 100, a control substrate that controls the entire projector 100 and the like are provided in the space not occupied by the optical unit 100B in the exterior case 100A.

The exterior case 100A is made of synthetic resin and formed by injection molding or the like, the exterior case 100A having a substantially rectangular-parallelepiped shape as a whole and accommodating the optical unit 100B. The exterior case 100A is constituted of an upper case forming a top side, a front side, lateral sides and a rear side of the projector 100 as well as a lower case forming a bottom side, the front side, the lateral sides and the rear side of the projector 100, the upper case and the lower case being fixed together by screws or the like.

The exterior case 100A may not be formed of synthetic resin, but may be of any other material such as metal.

The optical unit 100B modulates the light beam irradiated by a light source device in accordance with the image information in order to form the color image and projects the formed color image via a projection lens on the screen in an enlarged manner under the control of the control substrate. As shown in FIG. 1, the optical unit 100B has an integrator illuminating optical system 110, a color-separating optical device 120, a relay optical system 130, the optical device 140, the projection lens 160 (as a projection optical device) and an optical component casing 170.

The integrator illuminating optical system 110 is an optical system for equalizing the illuminance of the light beam, which is irradiated by the light source, in a plane orthogonal to the illumination optical axis. As shown in FIG. 1, the integrator illuminating optical system 110 has a light source device 111 including a light source lamp 111A and a reflector 111B, a first lens array 112, a second lens array 113, a polarization converter 114 and a superposing lens 115. The light beam irradiated by the light source lamp 111A is aligned by the reflector 111B into a certain irradiation direction, split into a plurality of sub beams by the first lens array 112, and then focused near the second lens array 113. The sub beams irradiated by the second lens array 113 enter an plane of incidence of the polarization converter 114, which is on the downstream of the second lens array 113, with the center axis (main beam) being perpendicular to the plane, and the sub beams being irradiated by the polarization converter 114 as a substantially uniform linear polarized light The plurality of sub beams irradiated by the polarization converter 114 as the linear polarized light and having passed through the superposing lens 115 are superposed on below-described three liquid crystal panels of the optical device 140.

The color-separating optical device 120 has two dichroic mirrors 121, 122 and a reflection mirror 123, the optical device 120 separating the plurality of sub beams irradiated by the integrator illuminating optical system 110 into three color lights (red, green, blue) by means of the dichroic mirrors 121, 122 and the reflection mirror 123.

The relay optical system 130 has an incident-side lens 131, a relay lens 132 and reflection mirrors 133, 134, the optical system 130 guiding the color lights separated by the color-separating optical device 120 to the below-described liquid crystal panels.

Figure 2:
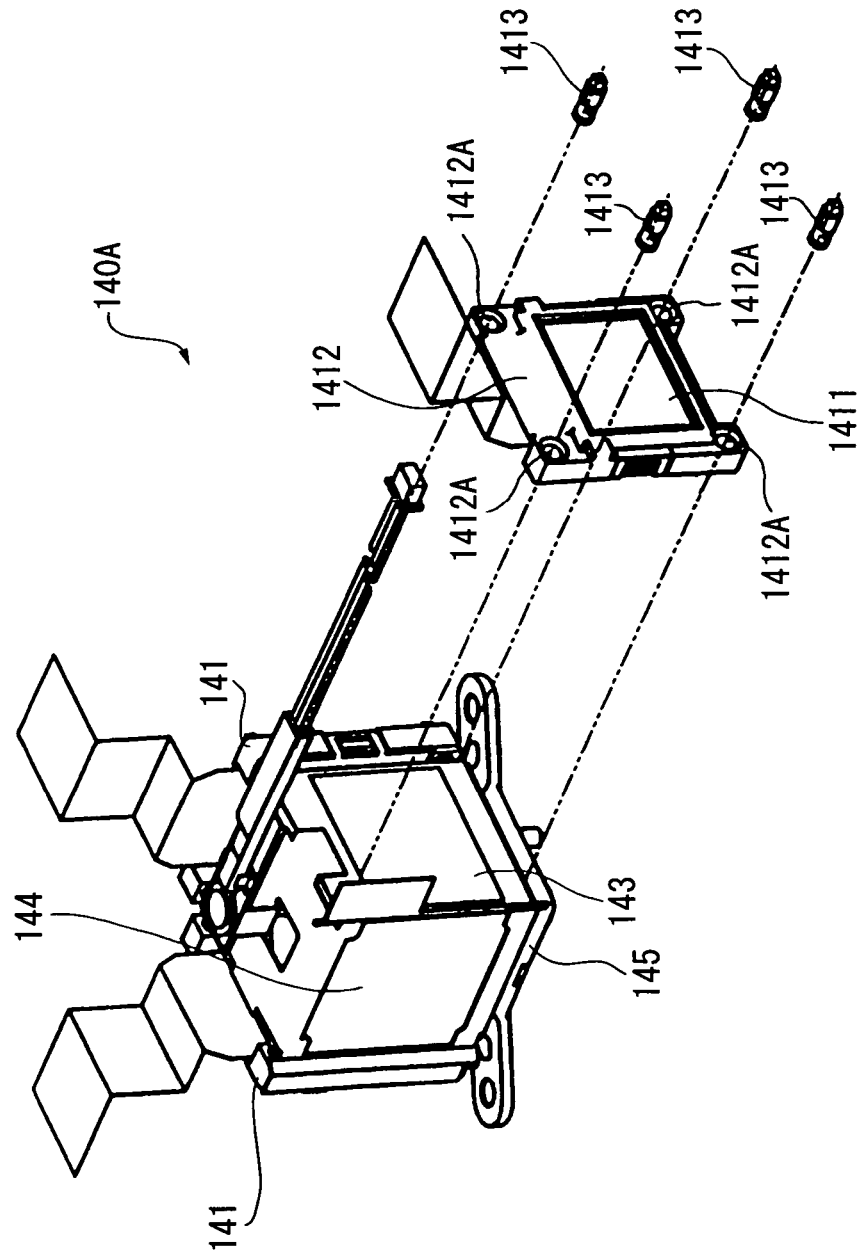
FIG. 2 is an exploded perspective view showing an arrangement of an optical device body according to the first exemplary embodiment.
Figure 3:
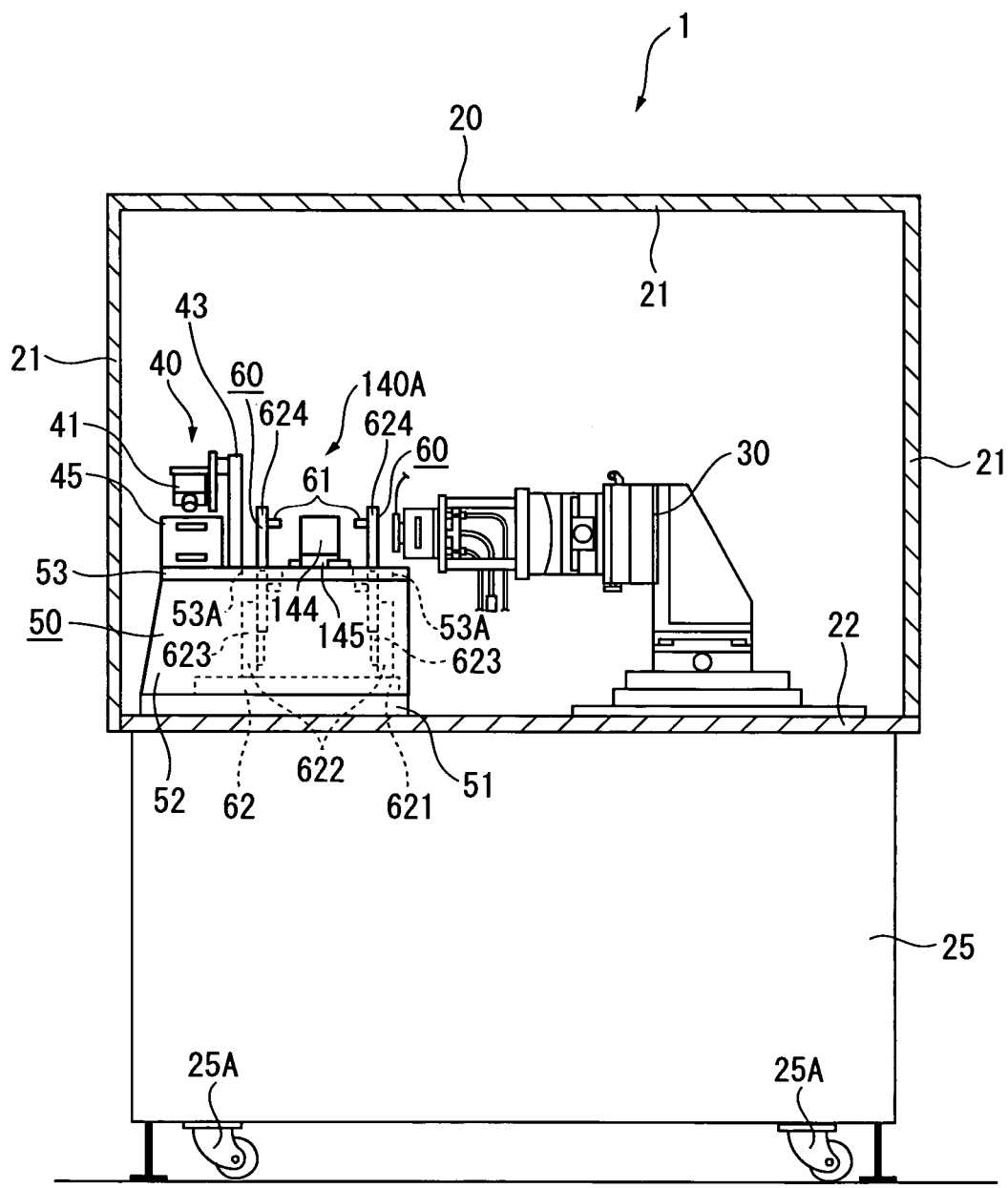
FIG. 3 is a view showing a manufacturing apparatus of the optical device body according to the first exemplary embodiment.

The optical device 140 modulates the three color lights irradiated by the color-separating optical device 120 in accordance with image information, combines the modulated color lights in order to form the color image and projects the formed color image in an enlarged manner. As shown in FIG. 1, the optical device 140 has three optical modulators 141 each including a liquid crystal panel 1411 (FIG. 2); incident-side polarization plates 142 and irradiation-side polarization plates 143 respectively disposed on a light incident side and a light irradiation side of the optical modulators 141; a cross dichroic prism 144 (as a color-combining optical device) and a support assembly 145 (FIG. 2). Among these components, the three optical modulators 141, the three irradiation-side polarization plates 143 (as optical converters that convert the optical characteristics of an incident light beam), the cross dichroic prism 144 and the support assembly 145 are integrated to constitute the optical device body 140A (FIG. 3). Note that, an arrangement of the optical device body 140A will be described below in detail. However, the optical device body 140A may have a different arrangement in which the three incident-side polarization plates 142 are also integrated with the three optical modulators 141, the three irradiation-side polarization plates 143, the cross dichroic prism 144 and the support assembly 145.

On the incident-side polarization plates 142, the color lights of which polarization directions have been aligned into substantially one direction by the polarization converter 114 are incident, the incident-side polarization plates 142 only transmitting the polarized light having substantially the same direction as the polarization axis of the light beam aligned by the polarization converter 114 out of the incident light beams, and the incident-side polarization plates 142 absorbing the other light beams. The incident-side polarization plates 142 may be arranged so as to have a light-transmissive substrate made of sapphire glass, crystal or the like with a polarization film thereon.

Though not particularly illustrated, the liquid crystal panels 1411, which constitute the optical modulators 141, each have a pair of transparent glass substrates with liquid crystal (electro-optic material) sealed therebetween. Orientation of the liquid crystals are controlled in accordance with drive signals that are output by the control substrate (not shown), so that the polarization directions of polarized light beams irradiated by the incident-side polarization plates 142 are modulated.

The irradiation-side polarization plates 143 have an arrangement substantially same as that of the incident-side polarization plate 142, the polarization plates 143 only transmitting the light beam having the polarization axis orthogonal to a transmission axis of the light beam in the incident-side polarization plate 142 out of the light beams irradiated by the optical modulator 141, and the polarization plates 143 absorbing the other light beams.

The cross dichroic prism 144 is an optical element that combines optical images modulated for each of the color lights irradiated from the irradiation-side polarization plates 143 in order to form the color image. The cross dichroic prism 144 has a square shape in plan view which is formed by four right-angle prisms being adhered with each other. And two dielectric multi-layer films are provided on boundaries on which the right-angle prisms are adhered together. The dielectric multi-layer films transmit the color light that irradiated by the optical modulator 141 disposed on the opposite side of the projection lens 160 and having passed through the irradiation-side polarization plate 143, and absorbs the color lights irradiated by the other two optical modulators 141 and having passed through the irradiation-side polarization plates 143. As described above, the color lights modulated by the optical modulators 141 are combined into the color image.

The projection lens 160 is a lens set that is constituted of a plurality of lenses housed in a cylindrical lens barrel 161, the projection lens 160 projecting the color image modulated by the optical device 140 in accordance with image information in an enlarged manner. The projection lens 160 also has a flange 162 of a substantially rectangular shape in plan view, which extends outward from the periphery of the lens barrel 161 on the base end side (see FIG. 1).

Though not illustrated, the lens barrel 161 is formed by a plurality of members connected with each other, the plurality of members supporting the plurality of lenses. Among the plurality of members, at least the two members are arranged so as to rotate in relation to the other members. The projection lens 160 is so arranged that relative positions of the plurality of lenses can be changed and the magnification and focus of the projection image can be adjusted by rotating at least the two members.

The optical component casing 170 is made of synthetic resin and formed by injection molding or the like, the casing 170 having a component housing member 171 in which the above-mentioned optical components 110, 120, 130, 140 are accommodated and a lid member (not shown) that closes an opening in an upper surface of the component housing member 171 (see FIG. 1).

The component housing member 171 has a light source housing 171A accommodating the light source device 111 and a container-shaped component housing 171B accommodating the other optical components 110, 120, 130, 140 except for the light source device 111.

The light source housing 171A has a substantially box shape and openings defined in a first end surface on the component housing 171B side and in a second end surface opposing the first end surface. The opening defined in the first end surface on the component housing 171B side is for transmitting the light beam irradiated by the light source device 111. The other opening defined in the second end surface opposing the first end surface on the component housing 171B side is for inserting the light source device 111 from a lateral side of the light source housing 171A in order to install the light source device 111 in the light source housing 171A.

The component housing 171B has a substantially rectangular-parallelepiped shape with an open upper surface, the component housing 171B being connected with the light source housing 171A at one end thereof. On a bottom surface of the other end side of the component housing 171B, an attachment (not shown) for attaching the support assembly 145 which constitutes the optical device body 140A is provided. On a lateral surface of the other end side of the component housing 171B, a lens attachment 171B1 for attaching the projection lens 160 is provided. By securing the flange 162 of the projection lens 160 to the lens attachment 171B1 with screws or the like, the projection lens 160 is attached to the optical component casing 170. Further, in an inner surface of the lateral surface of the component housing 171B, a plurality of grooves are defined, into which the optical components 112 to 115, 121 to 123, 131 to 134, 142 are slid and fitted from above.

Arrangement of Optical Device Body

FIG. 2 is an exploded perspective view showing an arrangement of the optical device body 140A.

As already described above, the optical device body 140A is formed by integrating the three optical modulators 141, the three irradiation-side polarization plates 143, the cross dichroic prism 144 and the support assembly 145.

As shown in FIG. 2, the support assembly 145 is a substantially rectangular-parallelepiped shaped component, the support assembly 145 mounting the cross dichroic prism 144 at a predetermined position of an upper surface thereof and supporting the entire optical device body 140A.

Also shown in FIG. 2, the three irradiation-side polarization plates 143 are fixed using an adhesive or the like on the light incident surfaces of the cross dichroic prism 144 that is mounted and fixed at the predetermined position of the support assembly 145. Note that, only the one irradiation-side polarization plate 143 fixed on one of the three light incident surfaces is exemplarily illustrated in FIG. 2, but the irradiation-side polarization plates 143 are also fixed on the other light incident surfaces.

As shown in FIG. 2, each of the three optical modulators 141 has an arrangement in which the liquid crystal panel 1411 is accommodated in a holder frame 1412. The liquid crystal panel 1411 is adhered and fixed on the light incident surface of the cross dichroic prism 144 by inserting pins 1413 with a ultraviolet curing adhesive into holes 1412A defined at four corners of the holder frame 1412.

In the optical device body 140A having the above explained arrangement, when each of the liquid crystal panels 1411 is adhered and fixed to the cross dichroic prism 144, the focus adjustment, alignment adjustment and fixing of the liquid crystal panel 1411 need to be performed substantially at the same time, which requiring a manufacturing apparatus capable of performing the focus and alignment adjustments of the liquid crystal panel 1411. Next, an arrangement of the manufacturing apparatus for manufacturing the optical device body 140A will be described.

Arrangement of Manufacturing Apparatus of Optical Device Body

Figure 4:
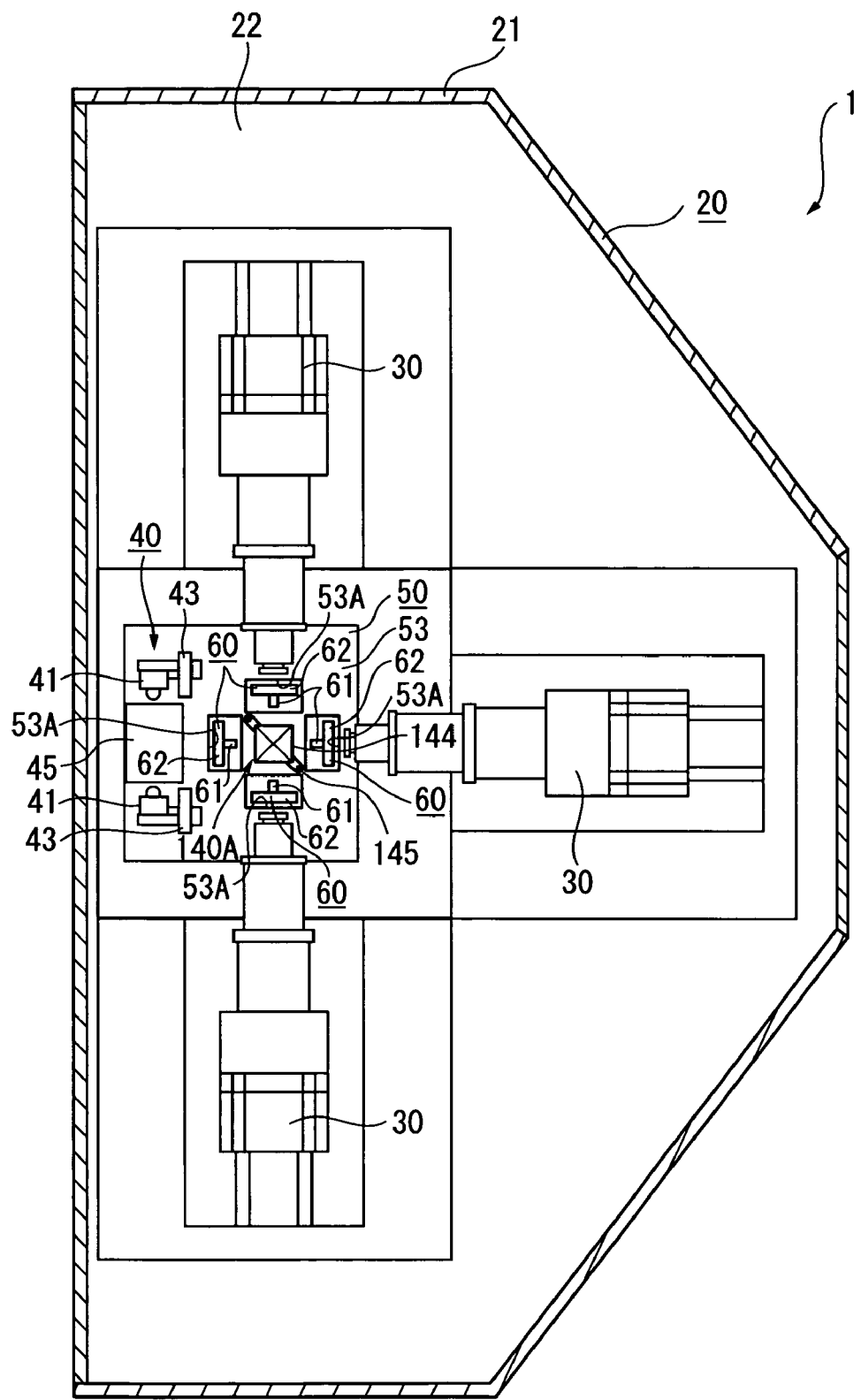
FIG. 4 is another view showing the manufacturing apparatus of the optical device body according to the first exemplary embodiment.

FIGS. 3 and 4 are views showing the manufacturing apparatus 1 of the optical device body 140A. Specifically, FIG. 3 is a side view of the manufacturing apparatus 1, and FIG. 4 is a plan view showing an upper side of the manufacturing apparatus 1.

As shown in FIGS. 3 and 4, the manufacturing apparatus 1 has a UV-light shielding cover 20, three six-axis position-adjusting devices 30 (as position adjusters), a light-beam detector 40, a mounting unit 50 (as a holding unit), and four dimension-measuring units 60, the manufacturing apparatus 1 further having the adjustment light-source device, a fixation light-source device and a control device that controls these devices and processes images (all not shown).

The UV-light shielding cover 20 has side plates 21 and a bottom plate 22 that enclose the six-axis position-adjusting devices 30, the light-beam detector 40, the mounting unit 50 and the dimension-measuring units 60; and a table 25 provided in a lower portion. The side plate 21 has a door that can be opened and closed (not shown). The door is provided such that the optical device body 140A can be assembled and disassembled, the door being made with, for instance, acrylic plates that transmit no UV light. And the table 25 is provided with casters 25A (FIG. 3) at the bottom thereof such that the manufacturing apparatus 1 can be easily transported.

The adjustment light-source device is a light source of position-adjusting light beams that are used when the position of the optical modulator 141 (liquid crystal panel 1411) is adjusted by the six-axis position-adjusting device, the adjustment light-source device including, for instance, an electric-discharge lamp such as a metal halide lamp, a self-luminous element or the like, and the adjustment light-source device being driven by a drive unit such as a light source drive circuit (not shown). The adjustment light-source device respectively supplies the three six-axis position-adjusting devices 30 with the color lights R, G and B, and irradiates the color lights to the liquid crystal panels 1411, the color lights respectively corresponding to the optical modulators 141 (liquid crystal panels 1411).

The fixation light-source device is a light source of fixing light beams (i.e., UV light) which are used for curing the ultraviolet curing adhesive when the optical modulator 141 (liquid crystal panel 1411) is fixed on the cross dichroic prism 144 side, the fixation light-source device being driven by the drive unit such as a light source drive circuit (not shown).

Arrangement of Six-Axis Position-Adjusting Device

Figure 5:
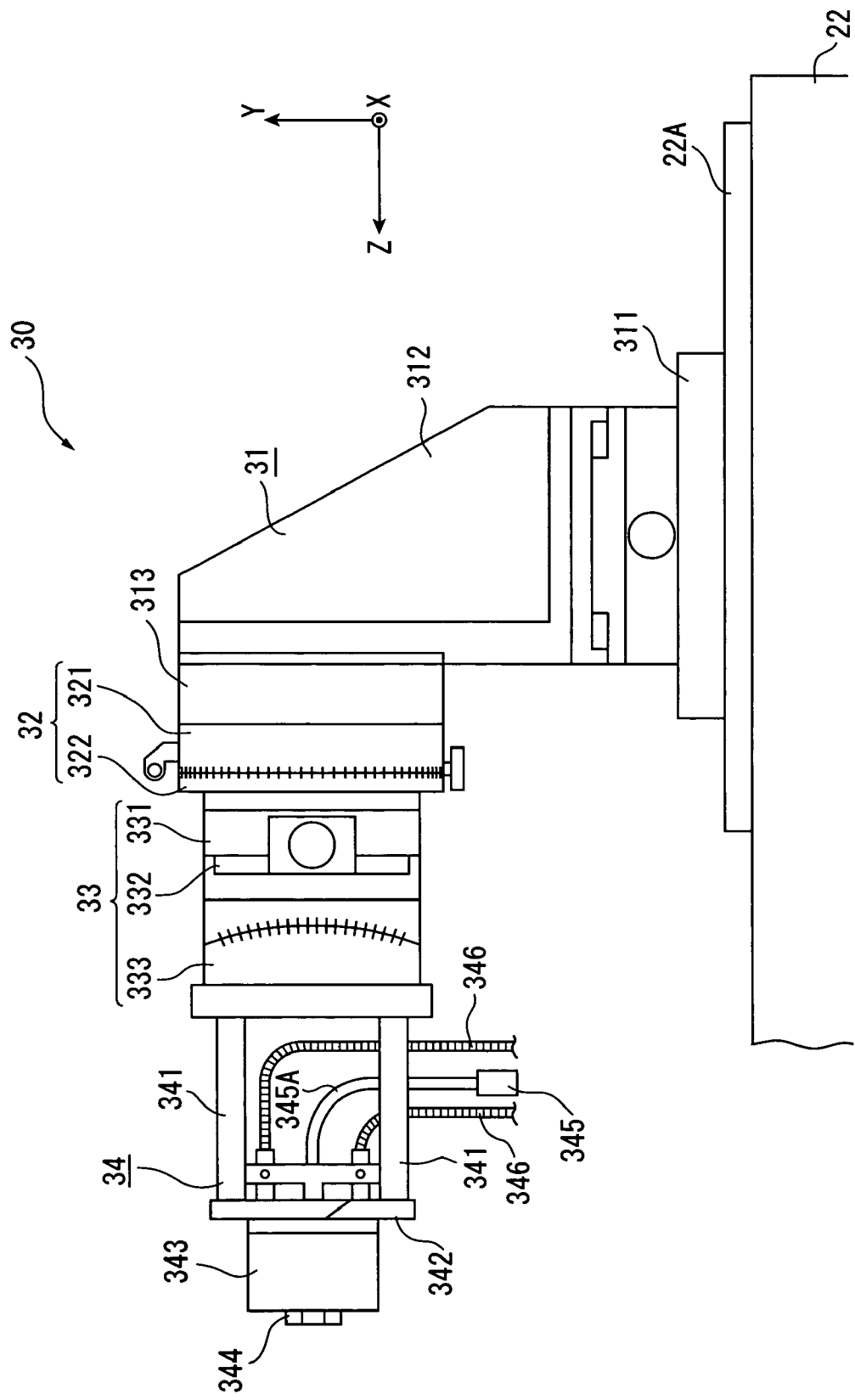
FIG. 5 is a view showing an arrangement of a six-axis position-adjusting device according to the first exemplary embodiment.

FIG. 5 is a view showing an arrangement of the six-axis position-adjusting device 30. In FIG. 5, it is assumed for clear explanation that the direction orthogonal to the paper surface of FIG. 5 is the X-axis, the horizontal direction in FIG. 5 is the Z-axis and the vertical direction in FIG. 5 is the Y-axis.

The three six-axis position-adjusting devices 30 adjust the positions of the optical modulators 141 (liquid crystal panels 1411) relative to the light incident surfaces of the cross dichroic prism 144.

As shown in FIG. 5, the six-axis position-adjusting device 30 has a planar-position-adjusting device 31 movably mounted along a rail 22A on the bottom plate 22 of the UV-light shielding cover 20, an in-plane rotary-position adjuster 32 provided at an end portion of the planar-position-adjusting device 31, an out-plane rotary-position adjuster 33 provided at an end portion of the in-plane rotary-position adjuster 32, and a liquid crystal panel holder 34 provided at an end portion of the out-plane rotary-position adjuster 33.

The planar-position-adjusting device 31 adjusts an advancement and retraction position and a planar position of the optical modulator 141 (liquid crystal panel 1411) relative to the light incident surface of the cross dichroic prism 144. As shown in FIG. 5, the planar-position-adjusting device 31 has a base 311 slidably provided on the bottom plate 22, a leg section 312 vertically standing on the base 311, and a connecting section 33 provided at an upper side of an end portion of the leg section 312 and connected with the in-plane rotary-position adjuster 32.

The base 311 is moved in the Z-axis direction on the bottom plate 22 by a drive unit (not shown) such as a motor. The leg section 312 is moved in the X-axis direction relative to the base 311 by a drive unit (not shown) provided on a side thereof such as a motor. The connecting section 313 is moved in the Y-axis direction relative to the leg section 312 by a drive unit (not shown) such as a motor.

The in-plane rotary-position adjuster 32 adjusts an in-plane rotation position of the optical modulator 141 (liquid crystal panel 1411) relative to the light incident surface of the cross dichroic prism 144. As shown in FIG. 5, the in-plane rotary-position adjuster 32 has a cylindrical base 321 fixed to the end portion of the planar-position-adjusting device 31 as well as a rotation adjuster 322 rotatably provided in a circumferential direction of the base 321.

The rotation adjuster 322 is rotated in an X-Y plane relative to the base 321 by a drive unit (not shown) provided on a side thereof such as a motor, the rotation adjuster 322 adjusting the in-plane rotation position of the optical modulator 141 (liquid crystal panel 1411) relative to the light incident surface of the cross dichroic prism 144.

The out-plane rotary-position adjuster 33 adjusts an out-plane rotation position of the optical modulator 141 (liquid crystal panel 1411) relative to the light incident surface of the cross dichroic prism 144. As shown in FIG. 5, the out-plane rotary-position adjuster 33 has a base 331, a first adjusting section 332 and a second adjusting section 333, the base 331 being fixed to the end portion of the in-plane rotary-position adjuster 32 and having a curved concave surface that forms a circular arc in a horizontal direction at an end portion thereof, the first adjusting section 332 provided so as to be slidable on the curved concave surface along the circular arc of the base 331 and having a curved concave surface that forms a circular arc in a vertical direction at an end portion thereof, and the second adjusting section 333 provided so as to be slidable on the curved concave surface along the circular arc of the first adjusting section 332.

When being driven by a drive unit (not shown) provided on a side of the base 331 such as a motor, the first adjusting section 332 starts sliding; and when being driven a drive unit (not shown) provided on a top side of the first adjusting section 332 such as a motor, the second adjusting section 333 starts sliding; thereby adjusting the out-plane rotation position of the optical modulator 141 (liquid crystal panel 1411) relative to the light incident surface of the cross dichroic prism 144.

The liquid crystal panel holder 34 holds the optical modulator 141 (liquid crystal panel 1411). As shown in FIG. 5, the liquid crystal panel holder 34 has four pole members 341 protruding from an end portion of the second adjusting section 333, a base member 342 fixed to the second adjusting section 333 via the pole members 341, a base 343 fixed to a distal end side of the base member 342 with screws, a pad 344 that is accommodated in the base 343 such that a distal end thereof protrudes out of the base 343 in order to abut to the liquid crystal panel 1411 constituting the optical modulator 141, and a suction unit 345 that vacuums to stick the liquid crystal panel 1411 via the pad 344. The base member 342 and base 343 of the liquid crystal panel holder 34 are connected to the adjustment light-source device and the fixation light-source device, which respectively supply the position-adjusting light beams and the fixing light beams to the liquid crystal panel 1411, via four optical fibers 346.

Figure 6:
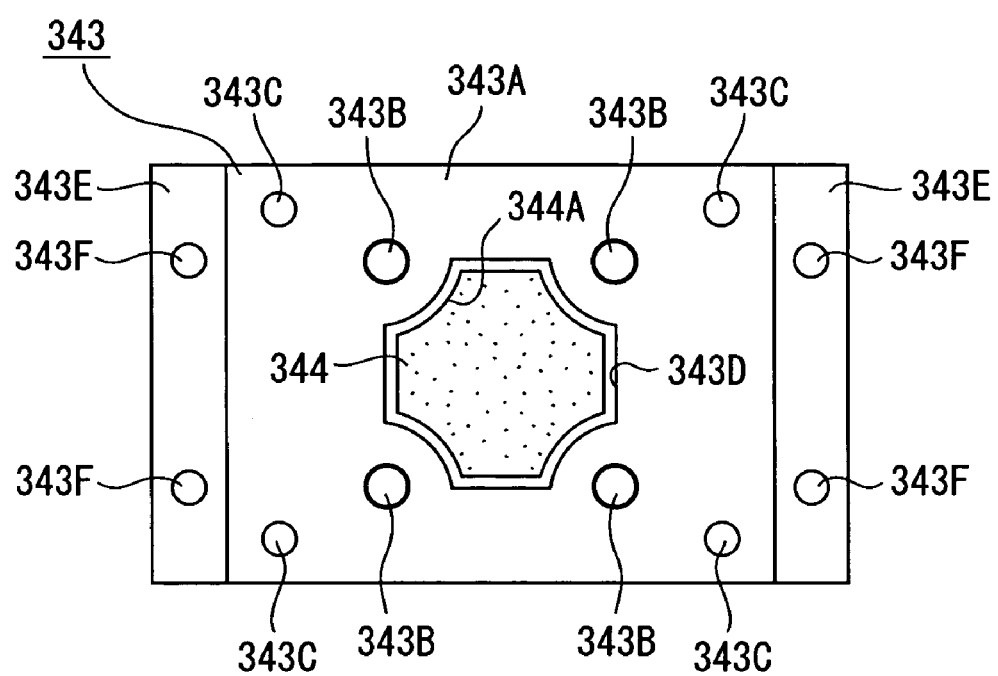
FIG. 6 is a front view of a base of a liquid crystal panel holder according to the first exemplary embodiment.

FIG. 6 is a front view of the base 343 of the liquid crystal panel holder 34.

The base 343 is a hollow member of which substantially center portion in plan view is protruding, this protruding part, i.e., a protruding portion 343A having a rectangular end surface. Formed in an substantially center portion in plan view of the end surface are adjustment light-source holes 343B defined in correspondence with corners of the image formation area of the liquid crystal panel 1411; fixation light-source holes 343C defined outside of the adjustment light-source holes 343B and in correspondence with the holes 1412A at the four corners of the holder frame 1412; and an aperture 343D having a substantially cross shape in plan view, which is for exposing the pad 344.

Protruding parts 343E, which are protruding outward in a back portion of the base 343, have four screw holes 343F, and by inserting screws into the four screw holes 343F, the base 343 is fixed to the base member 342.

The pad 344 is an elastic member that is porous and freely expansible, the pad 344 having a body section (not shown) accommodated in the base 343 and a cross portion 344A that protrudes from the body section by a predetermined length. And an end surface of the protruding part of the cross portion 344A is formed in a cross shape of a size corresponding to the aperture 343D. When the pad 344 is attached to the base 343, the cross portion 344A protrudes from the end surface of the base 343. Accordingly, the liquid crystal panel 1411 does not abut to the base 343 but only abuts to the cross portion 344A of the pad 344.

Though not specifically illustrated, the suction unit 345 vacuums to stick the liquid crystal panel 1411 via a predetermined air hose 345A, so that the liquid crystal panel 1411 is held by the pad 344.

Arrangement of Light-Beam Detector

Figure 7:
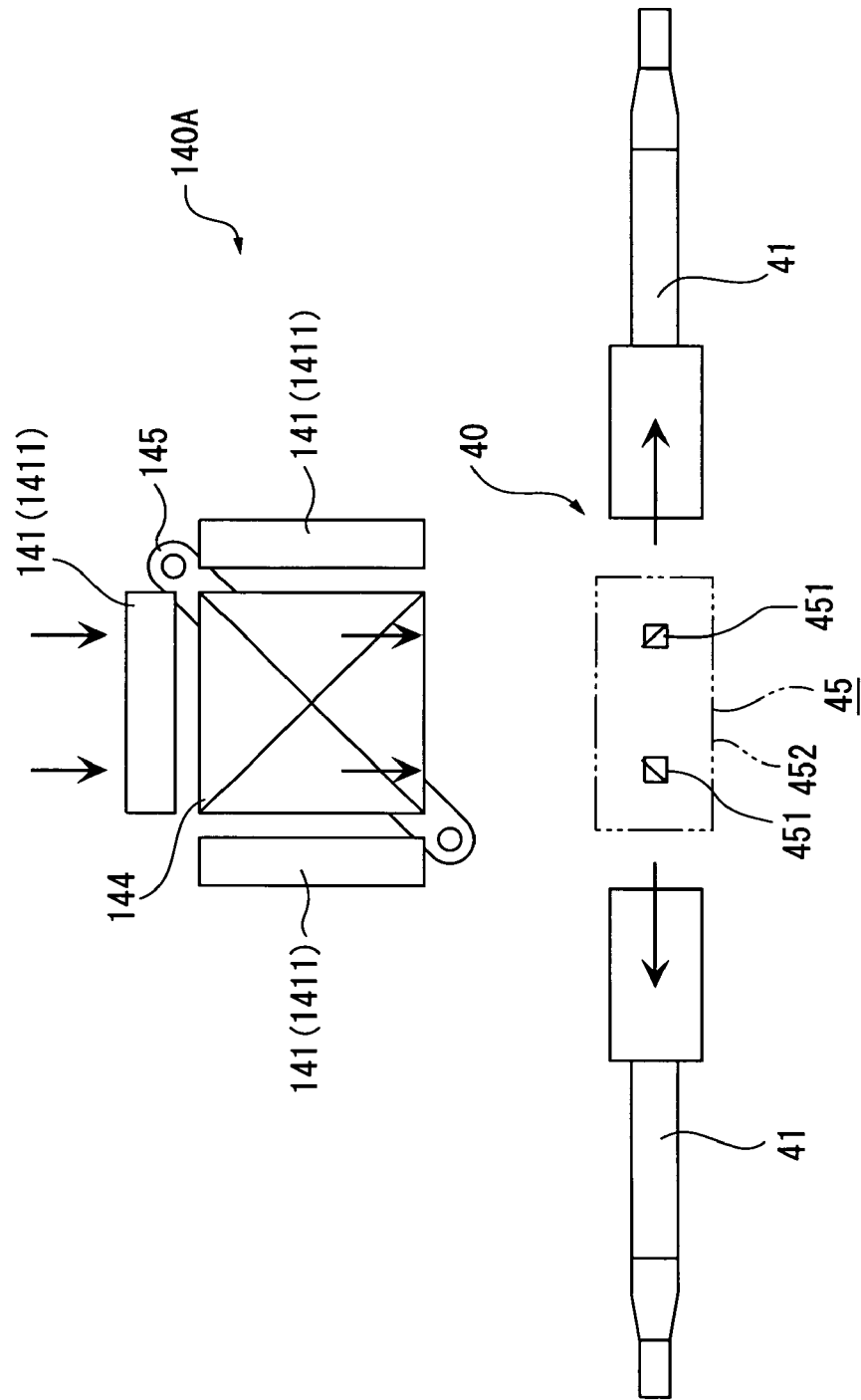
FIG. 7 is an illustration showing an arrangement of a light-beam detector according to the first exemplary embodiment.
Figure 8:
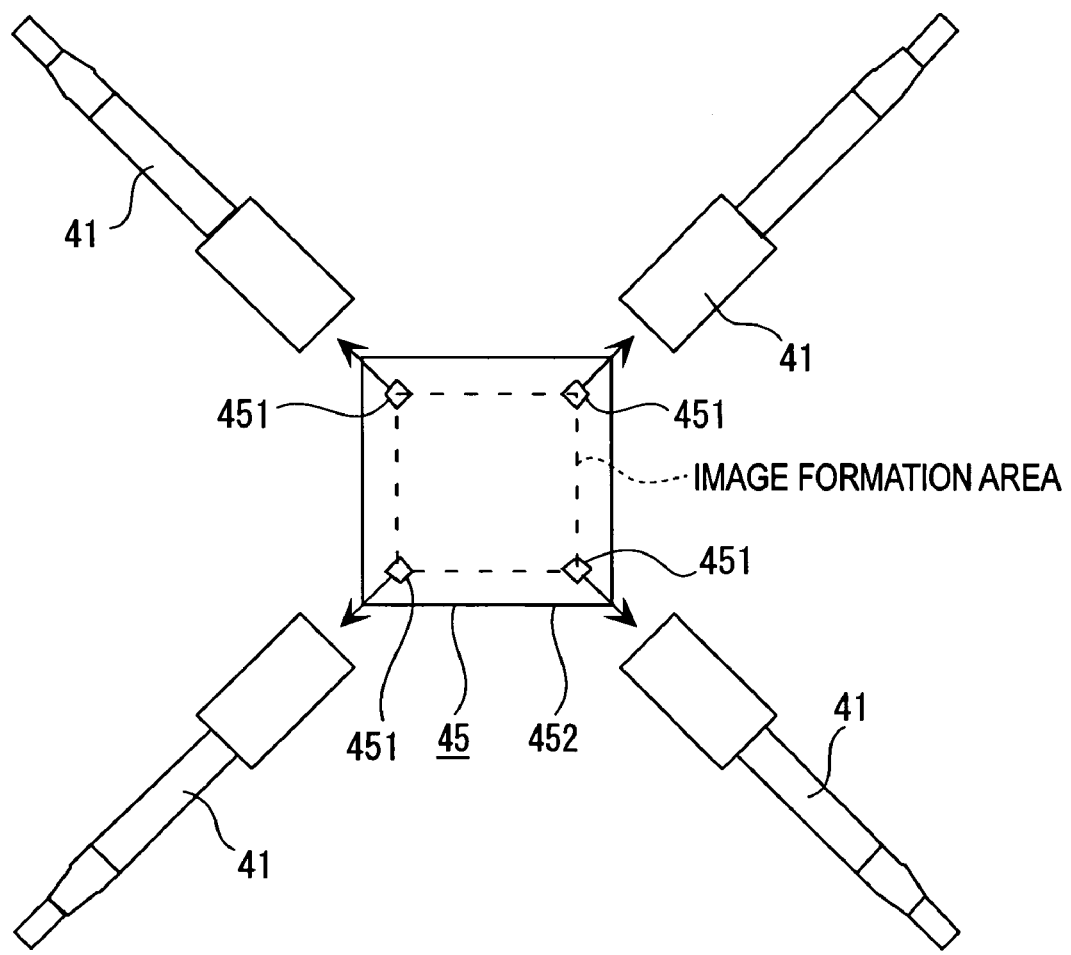
FIG. 8 is another illustration showing the arrangement of the light-beam detector according to the first exemplary embodiment.

FIGS. 7 and 8 are illustrations showing an arrangement of the light-beam detector 40. Specifically, FIG. 7 is an illustration showing upper sides of the optical device body 140A and the light-beam detector 40. FIG. 8 is an illustration showing the optical device body 140A and the light-beam detector 40 as seen from the light irradiation side of the cross dichroic prism 144.

As shown in FIG. 3 or 4, the light-beam detector 40 is disposed on the downstream of the light irradiation surface of the cross dichroic prism 144 surmounting on the mounting unit 50, the light-beam detector 40 being fixed on the mounting unit 50 and supported thereby. As shown in FIG. 3, 4, 7 or 8, the light-beam detector 40 has a CCD camera 41, a movement mechanism 43 (FIG. 3, FIG. 4) capable of moving the CCD camera 41 in the three dimensions and a light guide 45.

The CCD camera 41 is an area sensor that employs a CCD (Charge Coupled Device) as an image pickup element, the CCD camera 41 capturing the position-adjusting light beam irradiated by the cross dichroic prism 144 and outputting the light beam as electrical signals.

As shown in FIG. 7 or 8, the four CCD cameras 41 are provided at four positions around the light guide 45 via the movement mechanisms 43. Specifically, each of the CCD cameras 41 is disposed corresponding to a diagonal line of a rectangular-shaped image formation area of the liquid crystal panel 1411. And the zoom and focus of the CCD camera 41 can be adjusted by remote controlling such that the projection image can be precisely detected.

Although not shown, the movement mechanism 43 has a column vertically provided on the mounting unit 50, a plurality of shafts provided to the column, a camera attachment provided to one of the plurality of shafts, and the like. As shown in FIG. 8, the movement mechanism 43 can move the CCD camera 41 in the X-, Y- and Z-axis directions by the drive of a drive unit (not shown) such as a motor.

As shown in FIG. 7 or 8, the light guide 45 has four beam splitters 451 disposed at the four corners of the rectangular image formation area of the liquid crystal panel 1411 as well as a holding cover 452 for holding the beam splitters 451 at predetermined positions. The light guide 45 has a function of guiding the light beam that is irradiated by the adjustment light-source device to the liquid crystal panels 1411 and then irradiated by the cross dichroic prism 144 to the four corners, to the CCD cameras 41 by refracting by 90 degrees using the beam splitters 451.

The holder cover 452 has openings through which the light beams refracted outward can pass. Note that, FIG. 7 shows a case in which the light beam is irradiated to the liquid crystal panel 1411 disposed at the position opposing the projection lens 160. Due to the light guide 45, the light beam that is irradiated by the cross dichroic prism 144 to the four corners are not projected on the screen or the like, but directly detected by the CCD cameras disposed at the four positions (i.e., a direct-view method).

Arrangement of Mounting Unit

As shown in FIG. 3, the mounting unit 50 has a base plate 51 mounted on the bottom plate 22, a leg section 52 vertically standing on the base plate 51 and a setting plate 53 that is mounted on the top of the leg section 52 and on which the optical device body 140A and the light-beam detector 40 are attached.

Among these components, the setting plate 53 has an opening 53A penetrating from a front surface to a rear surface thereof as shown in FIG. 3 or 4. Consequently, the dimension-measuring unit 60 provided in the mounting unit 50 can protrude and retroject from the mounting unit 50 via the opening 53A.

Arrangement of Dimension-Measuring Unit

The four dimension-measuring units 60 measure an external dimension of the cross dichroic prism 144 constituting the optical device body 140A (i.e., distances from a planar center axis of the cross dichroic prism 144 to the light incident surface and to the light irradiation surface). As shown in FIG. 3 or 4, the four dimension-measuring units 60 are disposed so as to confront the light incident surfaces and the light irradiation surface of the cross dichroic prism 144 on the mounting unit 50. Note that, since all of the four dimension-measuring units 60 have the uniform arrangement, one of the dimension-measuring units 60 will be explained below as an example.

As shown in FIG. 3 or 4, the dimension-measuring unit 60 has a dimension-measuring unit body 61 and a movement mechanism 62.

Figure 9:
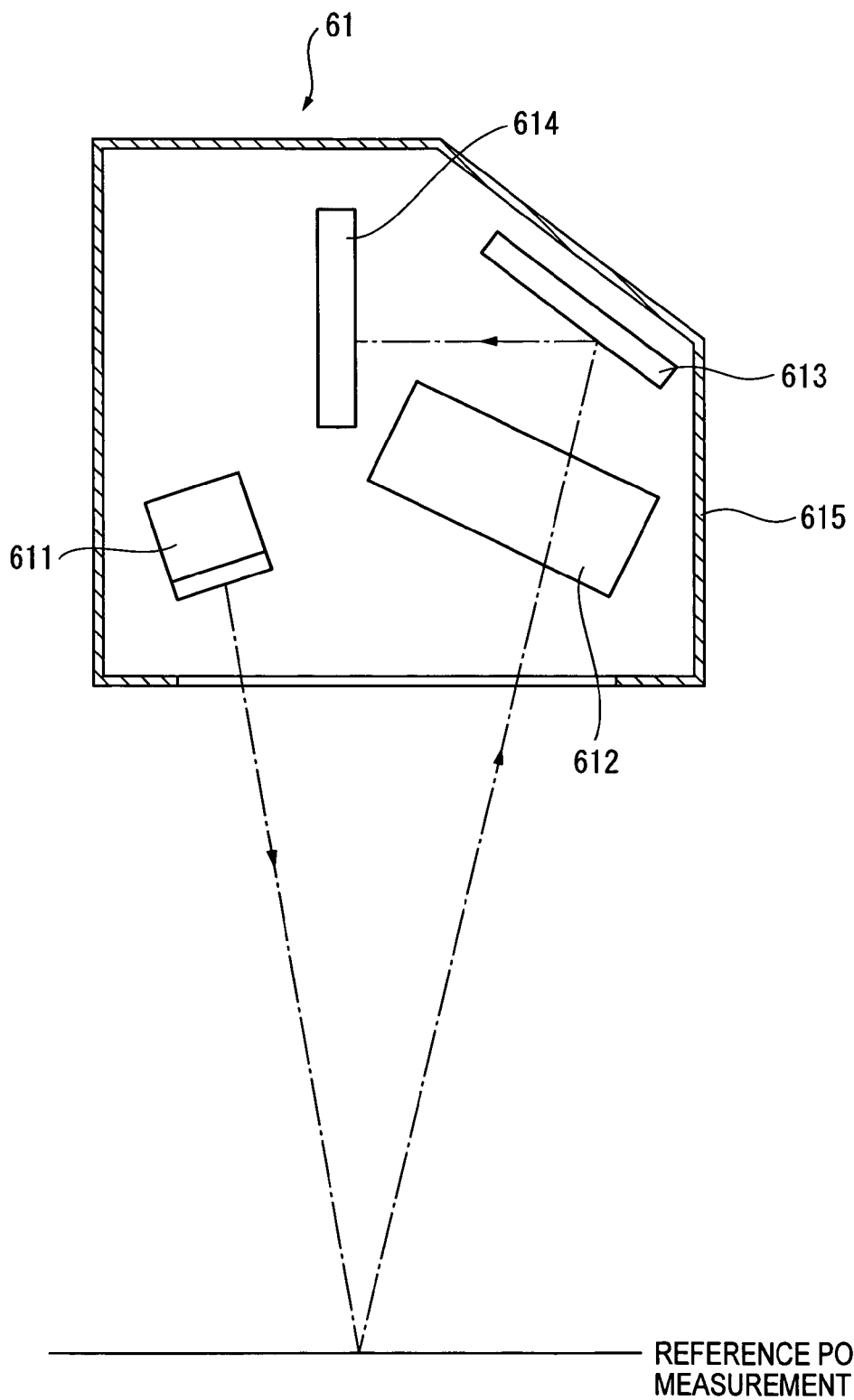
FIG. 9 is a schematic illustration showing an arrangement of a dimension-measuring unit body according to the first exemplary embodiment.

FIG. 9 is a schematic illustration showing an arrangement of the dimension-measuring unit body 61.

The dimension-measuring unit body 61 irradiates a laser beam to a reference position or a measurement position at a predetermined angle (the light incident surface or the light irradiation surface of the cross dichroic prism 144), receives the laser beam reflected by the reference position or the measurement position and outputs signals to the control device based on the position where the laser beam is received (hereinafter referred to as the light-receiving position). As shown in FIG. 9, the dimension-measuring unit body 61 has a laser-beam irradiation unit 611, a condenser lens 612, a reflection mirror 613, a laser-beam-receiving unit 614 and a casing 615 that houses the components 611 to 613 therein.

The laser-beam irradiation unit 611 irradiates the laser beam at the predetermined angle to the reference position or the measurement position under the control of the control device as shown in FIG. 9.

Also as shown in FIG. 9, the condenser lens 612 and the reflection mirror 613 guide the laser beam, which is irradiated by the laser-beam irradiation unit 611 and then reflected at the reference position or the measurement position, to the laser-beam-receiving unit 614.

The laser-beam-receiving unit 614 receives the laser beam guided by the condenser lens 612 and the reflection mirror 613. As the laser-beam-receiving unit 614, a two-dimensional CMOS (Complementary Metal-Oxide Semiconductor) image sensor may be used, for instance. The laser-beam-receiving unit 614 is electrically connected to the control device, captures the laser beam and outputs the laser beam as electrical signals to the control device.

As the above dimension-measuring unit body 61, Smart Sensor ZS-series (manufactured by OMRON Corporation) may be used, for instance.

The movement mechanism 62 supports the dimension-measuring unit body 61 such that the dimension-measuring unit body 61 confronts the cross dichroic prism 144 and the laser-beam irradiation unit 611 can irradiate the laser beam to the cross dichroic prism 144, the movement mechanism 62 moving the dimension-measuring unit body 61 in the Y-axis direction (FIGS. 3 and 4) so as to be protruded and retrojected from the mounting unit 50 via the opening 53A of the mounting unit 50. As shown in FIG. 3, the movement mechanism 62 has a base 621 attached on the base plate 51 of the mounting unit 50; rails 622 vertically provided on the base 621 and extending in the Y-axis direction; moving sections 623 that move in the Y-axis direction on the rails 622; and supporting plates 624 attached to the moving sections 623 and supporting the dimension-measuring unit body 61. The moving sections 623 move in the Y-axis direction on the rails 622 when being driven by a drive unit (not shown) such as motor.

Arrangement of Control Device

Figure 10:
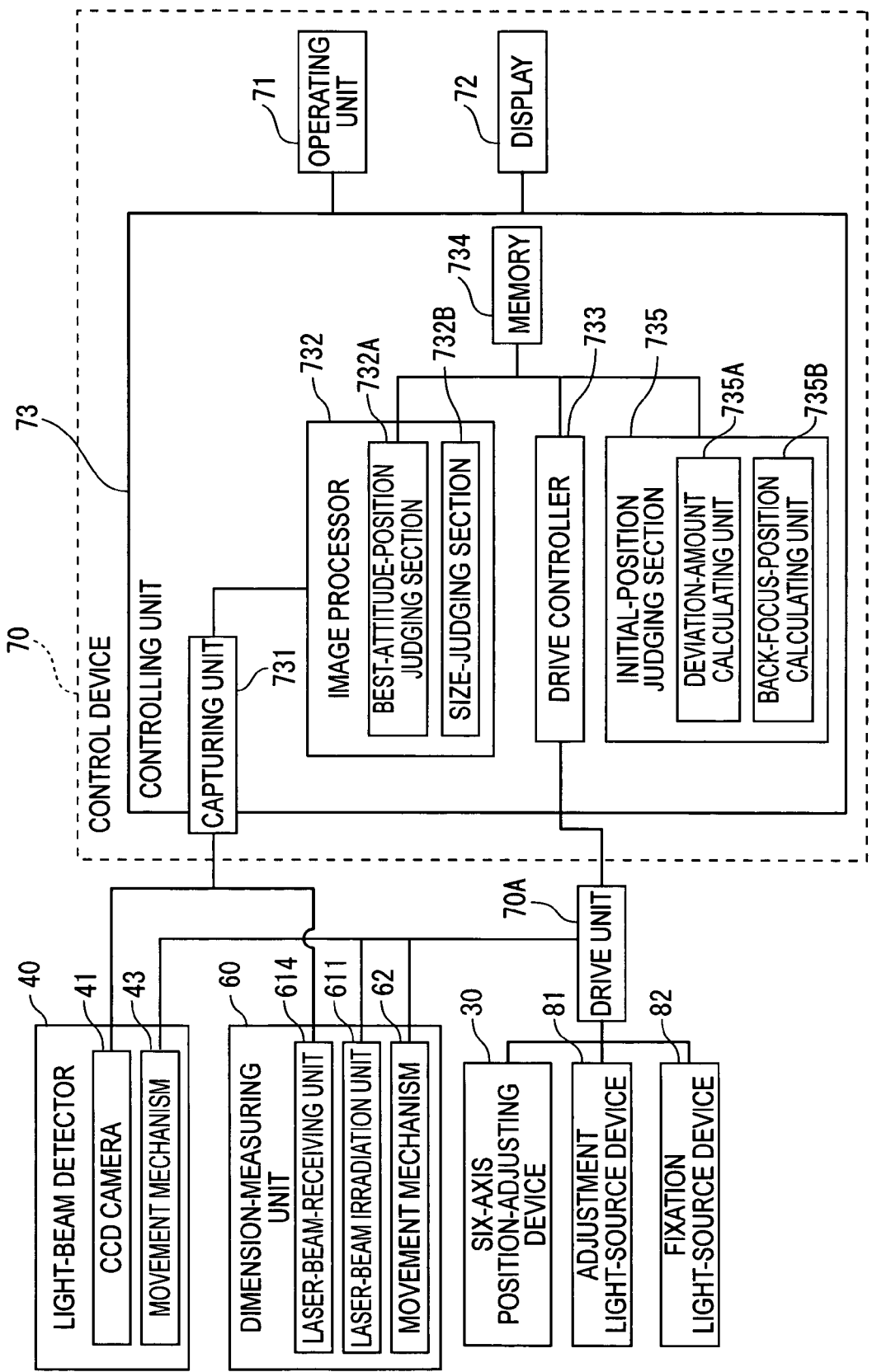
FIG. 10 is a block diagram showing a control structure of a control device according to the first exemplary embodiment.

FIG. 10 is a block diagram showing a control structure of the control device 70.

The control device 70 is constituted of a computer having a CPU (Central Processing Unit) and a hard disk and controls the entire manufacturing apparatus 1 by executing various programs. As shown in FIG. 10, the control device 70 has an operating unit 71, a display 72 and a controlling unit 73.

The operating unit 71 has a variety of operation buttons (not shown) that can be input with a keyboard, a mouse or the like. By inputting to the operation buttons, the control device 70 can be appropriately operated and operating conditions of the control device 70 can be set in correspondence with information shown on, e.g., the display 72. And based on the input to the operating unit 71 by an operator, the operating unit 71 outputs predetermined operation signals to the controlling unit 73.

The operating unit 71 may have a different arrangement in which the operating conditions thereof are set, for example, by inputting with a touch panel or by voice-inputting other than by inputting to the operation buttons.

The display 72 is controlled by the controlling unit 73 and displays predetermined images. For instance, the display 72 displays images processed by the controlling unit 73 as well as data that is output by the controlling unit 73 and stored in a below-described memory when information to be stored in the memory of the controlling unit 73 is set or updated by inputting to the operating unit 71. The display 72 may be a liquid crystal panel, an organic EL (Electroluminescence) display, a PDP (Plasma Display Panel) or a CRT (Cathode-Ray Tube).

The controlling unit 73 is constituted of programs run on an OS (Operating System) that controls the CPU, the controlling unit 73 executing a predetermined program in accordance with the operation signals from the operating unit 71, thereby driving the entire manufacturing apparatus 1. As shown in FIG. 10, the controlling unit 73 has a capturing unit 731, an image processor 732, a drive controller 733, the memory 734 (as a storage) and an initial-position judging section 735.

The capturing unit 731 has a video capture board or the like, inputs the signals output by the CCD cameras 41 of the light-beam detectors 40 or by the laser-beam-receiving units 614 of the dimension-measuring units 60, converts the input signals to image signals and outputs the converted signals to the image processor 732.

The image processor 732 reads the image signals output by the capturing unit 731 and performs image-processing based on the read image signals. As shown in FIG. 10, the image processor 732 has a best-attitude-position judging section 732A and a size-judging section 732B.

The best-attitude-position judging section 732A reads the image signals that are captured by the CCD cameras 41 and output via the capturing unit 731, performs the image-processing based on the read image signals, and judges a best attitude position of each of the liquid crystal panels 1411 based on the results of the image-processing. And the best-attitude-position judging section 732A outputs predetermined signals to the drive controller 733 based on the judged best attitude position.

The size-judging section 732B reads the image signals that are captured by the laser-beam-receiving units 614 of the dimension-measuring units 60 and output via the capturing unit 731; performs the image-processing based on the read image signals; and calculates, based on the results of the image-processing, the external dimension of the cross dichroic prism 144 (the distances from the planar center axis of the cross dichroic prism 144 to the light incident surface and to the light irradiation surface) which is measured by the four dimension-measuring units 60. Then, the size-judging section 732B stores the calculated external dimension in the memory 734.

The initial-position judging section 735 judges an initial position of the optical modulator 141 when the position of the optical modulator 141 is adjusted. As shown in FIG. 10, the initial-position judging section 735 has a deviation-amount calculating unit 735A and a back-focus-position calculating unit 735B.

The deviation-amount calculating unit 735A reads a thickness of the irradiation-side polarization plate 143, which is stored in the memory 734; refractive indexes of the irradiation-side polarization plate 143 and the cross dichroic prism 144; and the external dimension calculated by the size-judging section 732B, thereby calculating a deviation amount between an optical path length in a condition that the light beam passes through an air layer and an optical path length in a condition that the light beam passes through the cross dichroic prism 144 and the irradiation-side polarization plate 143.

The back-focus-position calculating unit 735B calculates a back focus position (initial position) of the projection lens 160 in correspondence with the deviation of the optical path length in a condition that the irradiation-side polarization plates 143 and the cross dichroic prism 144 are interposed between the optical modulators and the projection lens 160, based on distance information stored in the memory 734 which is about a back-focus distance defined in accordance with the specifications of the projection lens 160 and on the deviation amount between the optical path lengths which is calculated by the deviation-amount calculating unit 735A. Then, the back-focus-position calculating unit 735B stores information about the calculated initial position in the memory 734.

The drive controller 733 outputs control signals to the drive unit 70A based on a predetermined control program or the signals output by the image processor 732, so that the six-axis position-adjusting device 30, the light-beam detector 40, the dimension-measuring unit 60, the adjustment light-source device 81 and the fixation light-source device 82 are driven by the drive unit 70A. As mentioned above, the drive unit 70A may be a motor or a light source drive circuit.

The memory 734 stores the predetermined control program, model data, the external dimension of the cross dichroic prism 144 which is output by the image processor 732, and the data on the initial positions or the like which is output by the initial-position judging section 735.

The model data may include the followings.

The model data may include data on a reference pattern image obtained by a master optical device (not shown) and the reference position of the CCD camera 41, which become a reference of the optical device body 140A to be manufactured.

The model data may also include data on a reference light-receiving position of the laser-beam-receiving unit 614 of the dimension-measuring unit 60.

The model data may also include the distance information on the back-focus distance defined in accordance with the specifications of the projection lens 160 corresponding to the optical device body 140A to be manufactured (including a distance from a lens vertex on the uppermost steam of the projection lens 160 to the planar center axis of the cross dichroic prism 144 in addition to the back-focus distance). The model data may further include data on the thickness in a direction of the optical axis of the irradiation-side polarization plate 143 constituting the optical device body 140A to be manufactured.

The model data may further include data on the refractive index of the cross dichroic prism 144 constituting the optical device body 140A to be manufactured and the refractive index of the irradiation-side polarization plate 143.

Manufacturing Method of Optical Device Body

The manufacturing method of the optical device body 140A according to the above explained manufacturing apparatus 1 will be described next with reference to the drawings. Note that, in the optical device body 140A and the master optical device, in which the cross dichroic prism 144 has the three light incident surfaces, the green-light optical modulator 141 is disposed on the light incident surface opposing the projection lens 160 and the red-light optical modulator 141 the blue-light optical modulator 141 are disposed on the other two light incident surfaces.

Figure 11:
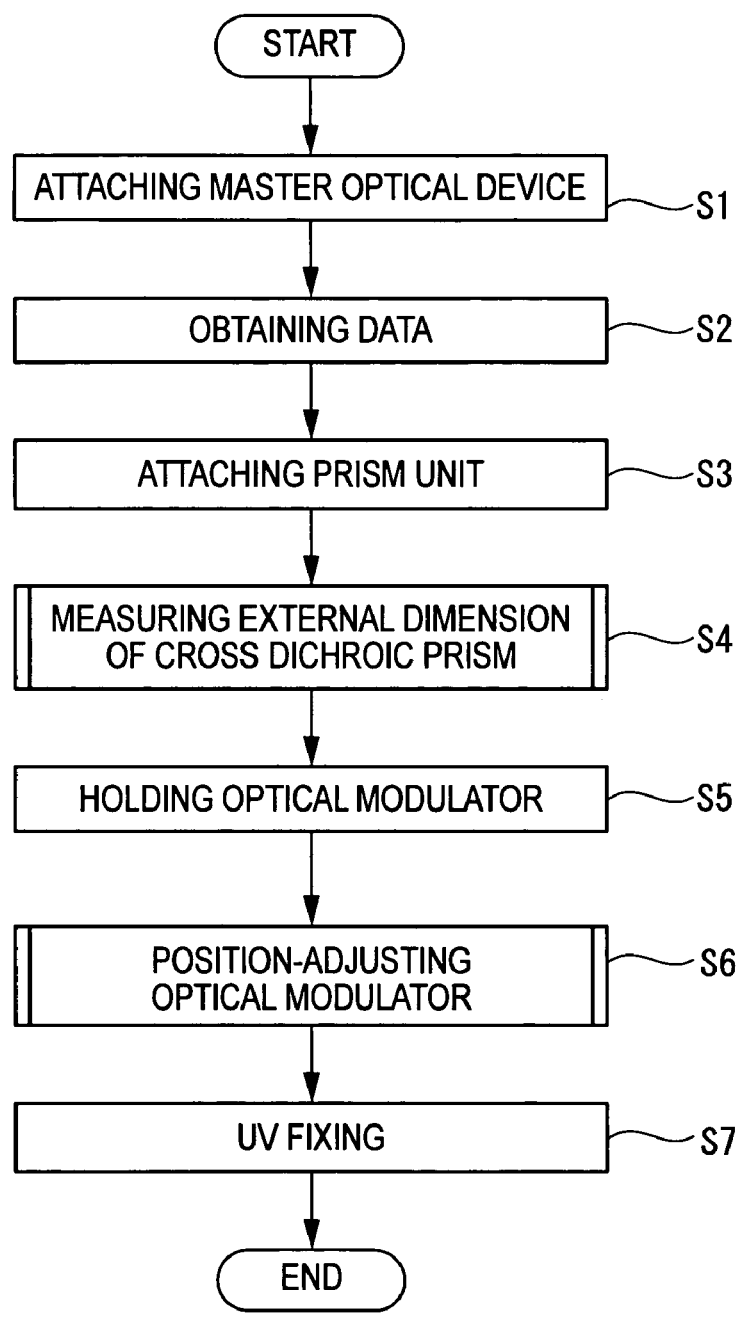
FIG. 11 is a flowchart to explain a manufacturing method of the optical device body according to the first exemplary embodiment.

FIG. 11 is a flowchart to explain the manufacturing method of the optical device body 140A.

Firstly, as a preparation before manufacturing the optical device body 140A, the reference pattern for image-processing and the reference position of the CCD camera 41 in accordance with the model of the projector are obtained in advance (Steps S1 and S2).

Specifically, the operator attaches the master optical device of which focus position and alignment position have been adjusted in advance and the light guide 45 in which the positions of the beam splitters 451 have been set based on the size of the image formation area of the master optical device, on the mounting unit 50 (Step S1). Here, the master optical device, which is selected in accordance with the model, integrally has a reference support assembly that has an external dimension of designed value not containing a manufacturing error, a reference cross dichroic prism, a reference irradiation-side polarization plate and three reference optical modulators (liquid crystal panels).

Next, the operator operates the operating unit 71 of the control device 70 in order to invoke the predetermined program for registering the model data in accordance with the model of the projector. The controlling unit 73 of the control device 70 invokes the program stored in the memory 734 and performs the following process.

The controlling unit 73 operates the adjustment light-source device 81 in order to introduce the position-adjusting light beam (green light) to the reference liquid crystal panel for green light of the master optical device from the tip end of the six-axis position-adjusting device 30. The light beam irradiated by the master optical device is directly captured by the CCD camera 41 via the beam splitter 451. Herein, the controlling unit 73 operates the movement mechanism 43 to move each of the CCD cameras 41 to a position ensuring that the CCD camera 41 can receive the light beam (Step S2).

Figure 12:
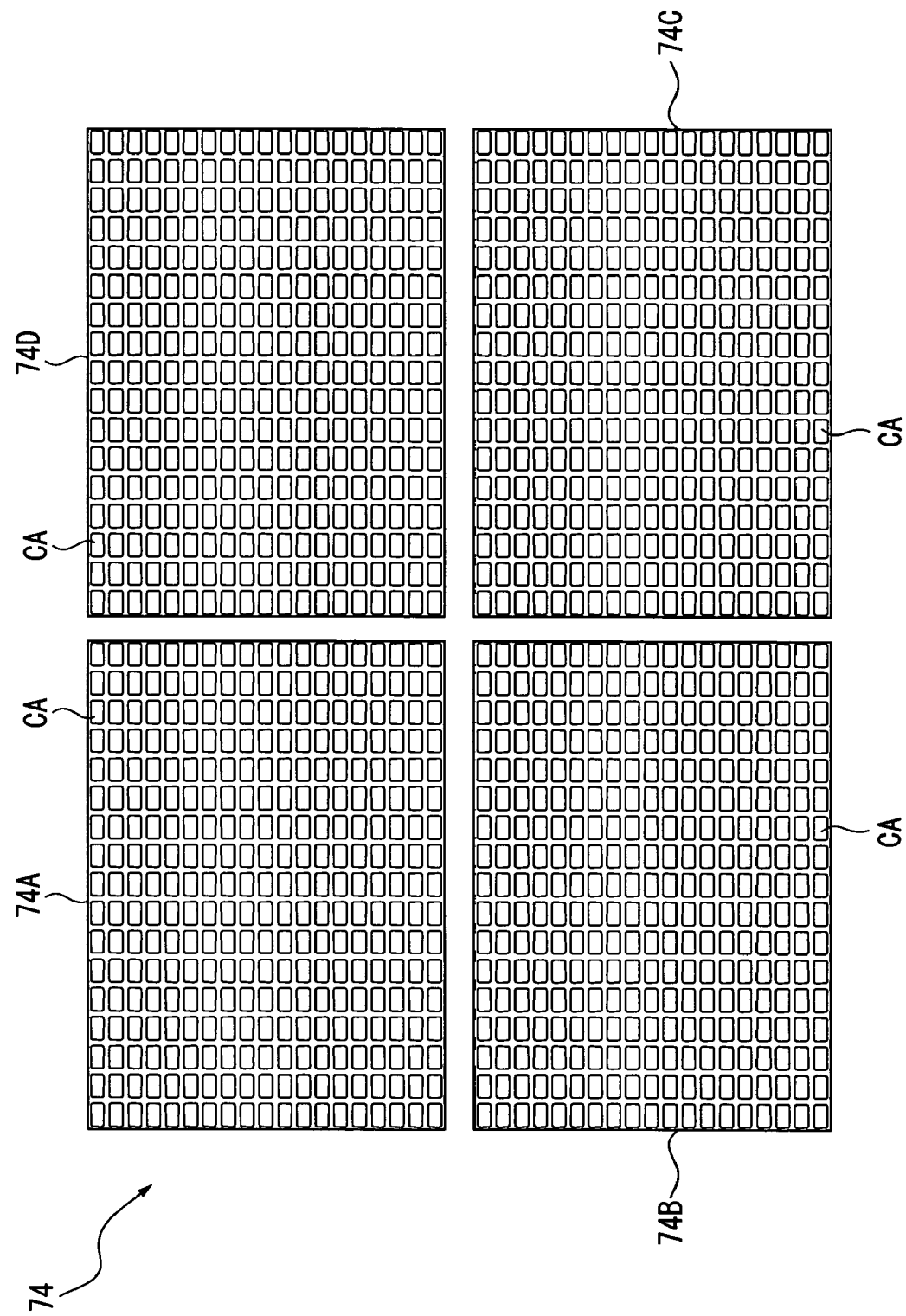
FIG. 12 is an illustration showing an example of images captured by CCD cameras according to the first exemplary embodiment.
Figure 13:
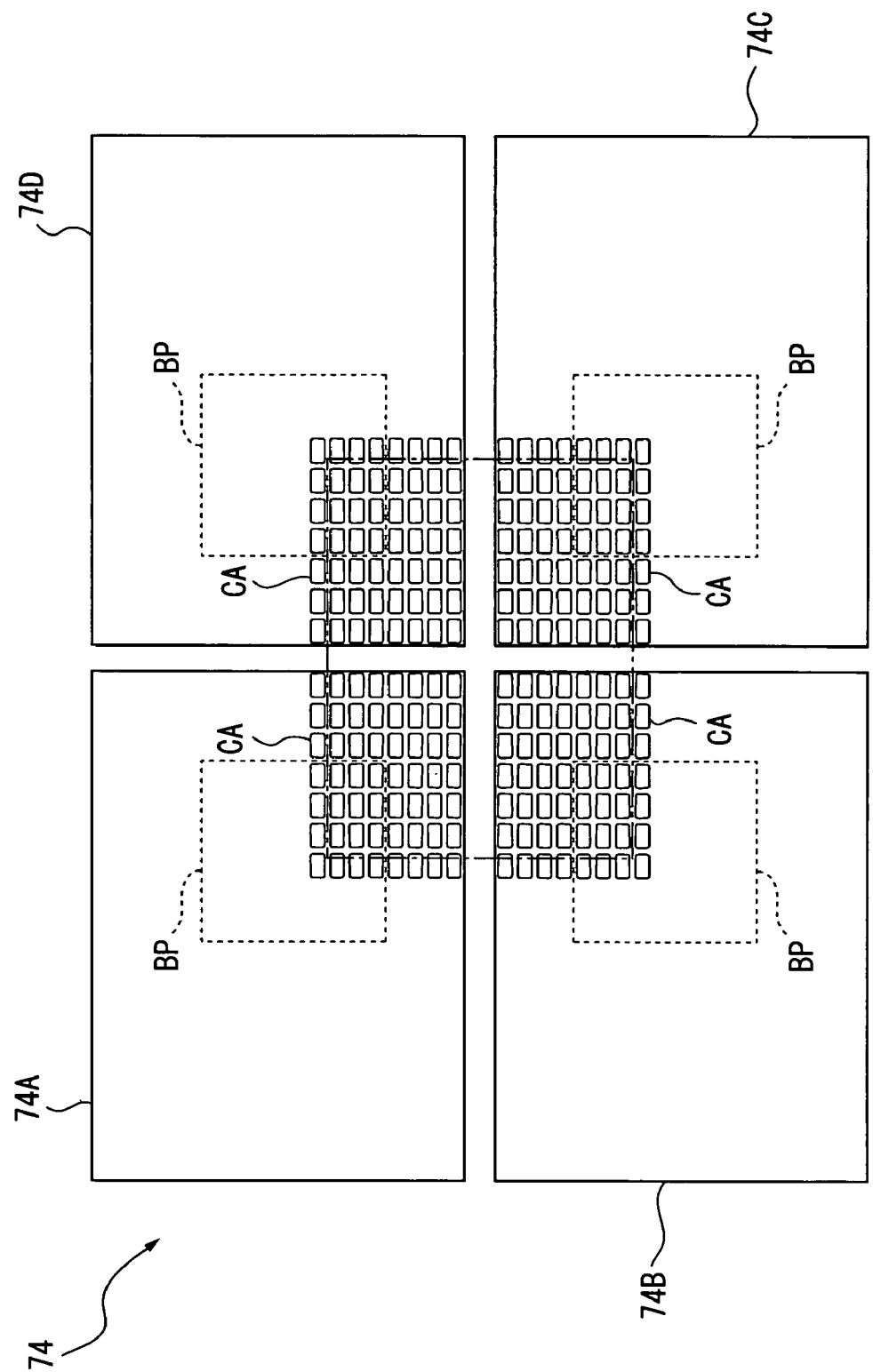
FIG. 13 is another illustration showing another example of the images captured by the CCD cameras according to the first exemplary embodiment.

FIG. 12 or 13 are illustrations showing an example of images captured by each of the CCD cameras 41.

As shown in FIGS. 12 and 13 for instance, the image 74 captured by the four CCD cameras 41 is constituted of four images 74A, 74B, 74C, 74D and displays a plurality of pixel areas CA in correspondence with the four corners of the reference liquid crystal panel. Also as shown in FIG. 12, a position moved inward from the corner positions in correspondence with the four corners of the reference liquid crystal panel along the diagonal lines and capable of only displaying the pixel areas CA in the images 74A to 74D is a reference position for focus-adjusting of the CCD camera 41 (hereinafter referred to as a focus adjustment reference position). As shown in FIG. 13, a substantially square shaped area in which the corner positions in correspondence with the four corners of the reference liquid crystal panel are displayed and a ratio of the pixel areas CA to the remaining area not occupied by the pixel areas CA are set at a predetermined value is the reference pattern BP for alignment-adjusting of the liquid crystal panel 1411. And here, a position of the CCD camera 41 is a reference position for alignment-adjusting in accordance with the model (hereinafter referred to as an alignment adjustment reference position). The controlling unit 73 stores the data of the above-described reference patterns BP as well as the reference positions of the CCD camera 41 (the focus adjustment reference position and the alignment adjustment reference position) in the memory 734 as the model data in correspondence with the model.

The above Steps S1 and S2 are performed in advance for a plurality of models, so that the reference patterns BP and the reference position of the CCD camera 41 (the focus adjustment reference position and the alignment adjustment reference position) for each model are registered as the model data.

Subsequent to the above Steps S1 and S2, the optical device body 140A is manufactured.

The operator removes the master optical device mounted on the mounting unit 50 and attaches a prism unit integrally formed by the cross dichroic prism 144 to which the irradiation-side polarization plates 143 are attached at the predetermined positions and the support assembly 145 (Step S3: device-attaching process).

Subsequent to the Step S3, the external dimension of the cross dichroic prism 144 is measured (Step S4: dimension-measuring process).

Figure 14:
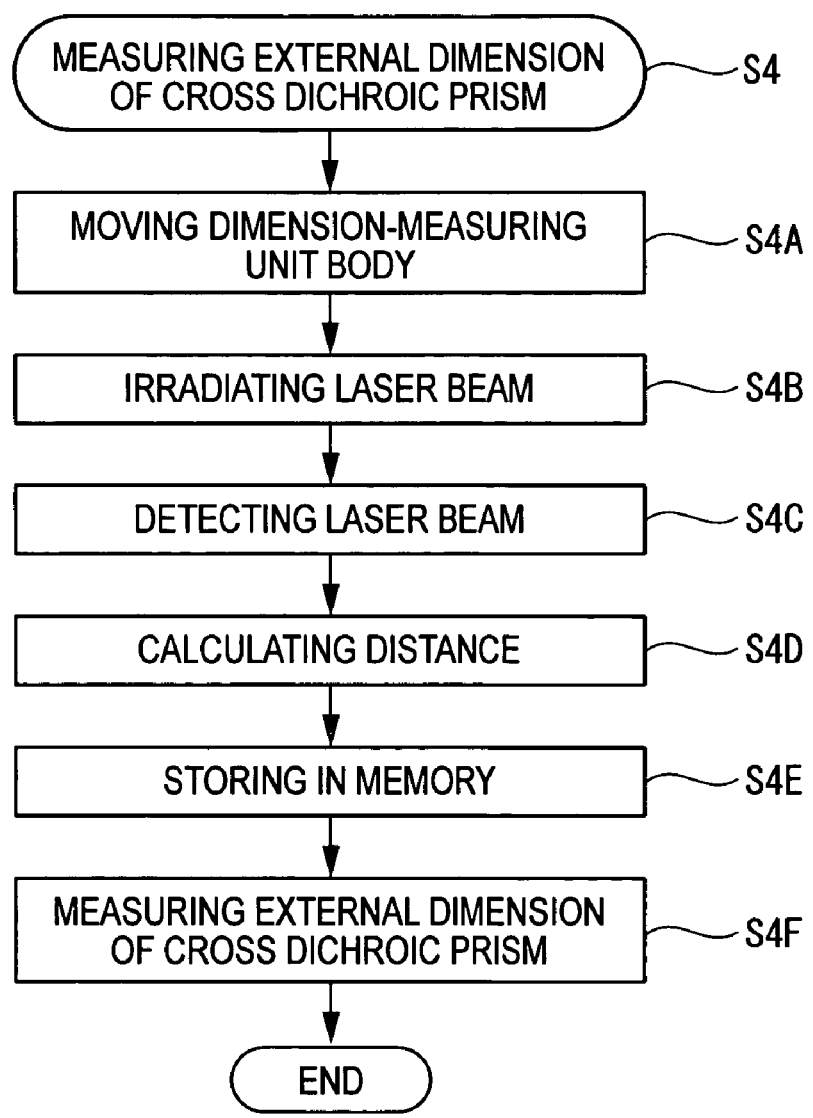
FIG. 14 is a flowchart to explain a measuring method of an external dimension of a cross dichroic prism according to the first exemplary embodiment.
Figure 15:
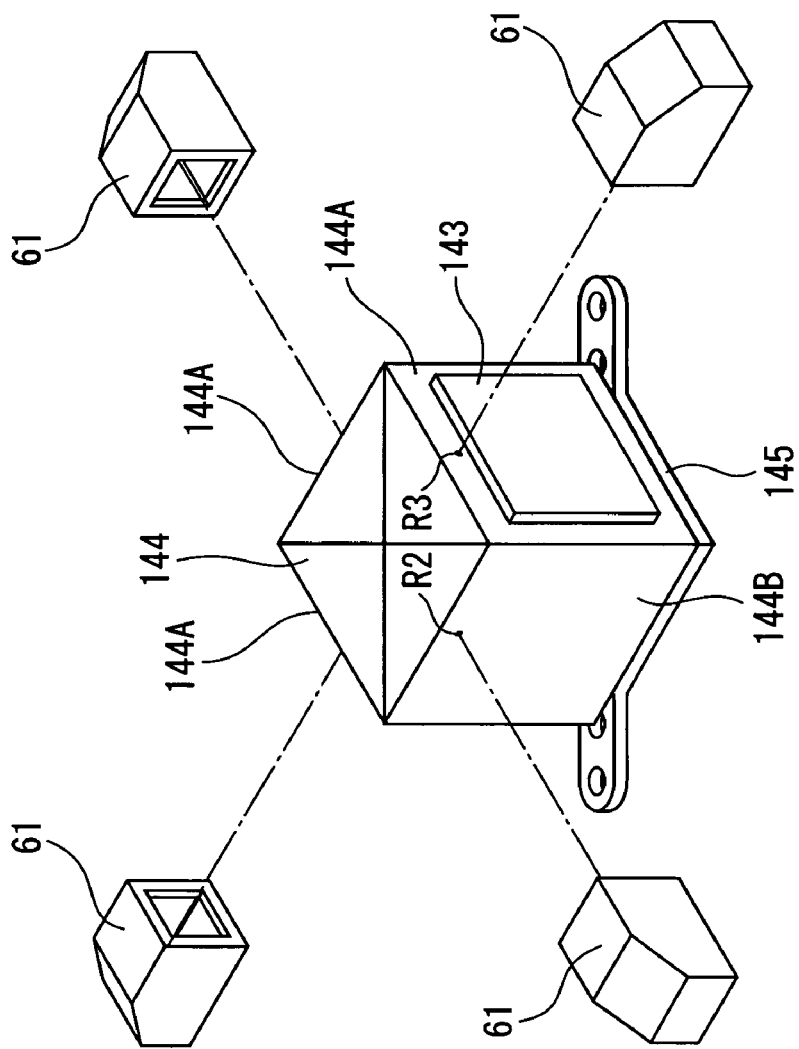
FIG. 15 is an illustration to explain the measuring method of the external dimension of the cross dichroic prism according to the first exemplary embodiment.
Figure 16:
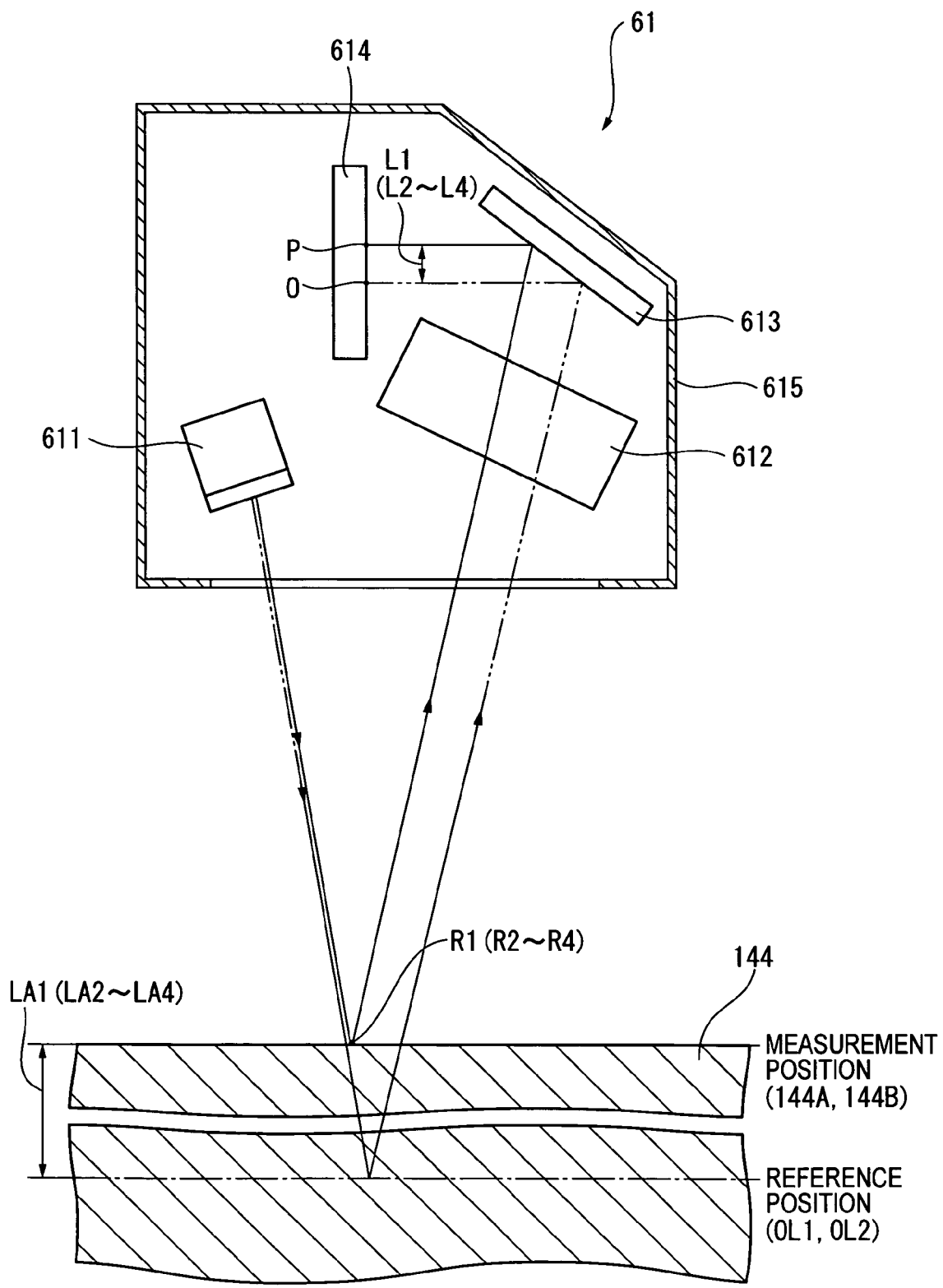
FIG. 16 is another illustration to explain the measuring method of the external dimension of the cross dichroic prism according to the first exemplary embodiment.
Figure 17:
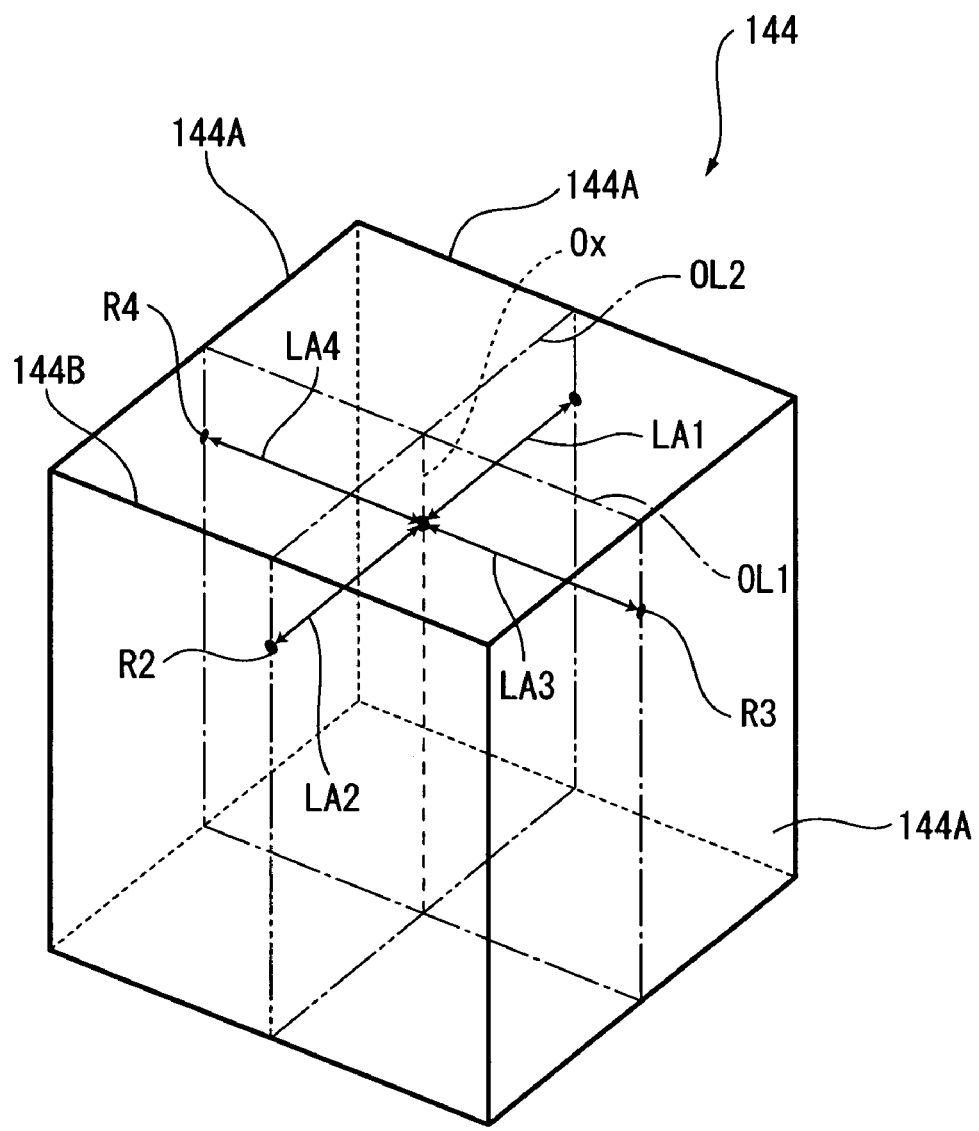
FIG. 17 is still another illustration to explain the measuring method of the external dimension of the cross dichroic prism according to the first exemplary embodiment.

FIG. 14 is a flowchart to explain the measuring method for the external dimension of the cross dichroic prism 144. FIGS. 15 through 17 are illustrations to explain the measuring method of the external dimension of the cross dichroic prism 144.

The operator operates the operating unit 71 of the control device 70 in order to input for requesting the measurement of the external dimension of the cross dichroic prism 144. The controlling unit 73 of the control device 70 invokes the program stored in the memory 734 and performs the following process.

The drive controller 733 outputs predetermined control signals to the drive unit 70A in order to operate the movement mechanisms 62 and moves each of the dimension-measuring unit bodies 61 out of the mounting unit 50 such that the dimension-measuring unit bodies 61 respectively confront the light incident surfaces and the light irradiation surface of the cross dichroic prism 144 as shown in FIG. 15 (Step S4A).

Subsequent to the Step S4A, the drive controller 733 outputs predetermined control signals to the drive unit 70A in order to operate the dimension-measuring unit bodies 61, so that the laser-beam irradiation units 611 irradiate the laser beams (Step S4B). Herein, as shown in FIG. 15 or 17, the laser beams irradiated by the laser-beam irradiation units 611 are irradiated at upper and substantially-center positions (irradiation positions R1 to R4) of the light incident surfaces 144A and the light irradiation surface 144B of the cross dichroic prism 144.

Subsequent to the Step S4B, the controlling unit 73 controls the laser-beam-receiving units 614 to capture the laser beams irradiated by the light incident surfaces 144A and the light irradiation surface 144B of the cross dichroic prism 144 (Step S4C).

Subsequent to the Step S4C, the size-judging section 732B of the controlling unit 73 reads the image signals captured by the laser-beam-receiving units 614 and then output thereby via the capturing units 731 and recognizes each light-receiving position P (FIG. 16) of the laser beams captured by the laser-beam-receiving units 614. And then, the size-judging section 732B calculates each of deviation amounts L1 to L4 between the reference light-receiving position O stored in the memory 734 and the light-receiving position P as shown in FIG. 16. Note that, as shown in FIG. 17, the reference light-receiving position O is a light-receiving position at which the laser beams, which are irradiated to reference planes OL1 and OL2 (reference positions) that pass the planar center axis Ox of the cross dichroic prism 144 and the planar center axes Ox of the light incident surface and the light irradiation surface of the reference cross dichroic prism and then reflected by the reference planes OL1 and OL2, are received, the reference light-receiving position O being stored in the memory 734 in advance. Subsequently, the size-judging section 732B calculates, based on the deviation amounts L1 to L4, the distances LA1 to LA4 (FIG. 17) respectively from the reference plane OL1 or OL2 of the irradiation positions R1 to R4 to the light incident surfaces 144A and the light irradiation surface 144B of the cross dichroic prism 144 (Step S4D). Next, the size-judging section 732B stores the calculated distances LA1 to LA4 in the memory 734 (Step S4E).

Subsequent to the Step S4E, the drive controller 733 outputs predetermined control signals to the drive unit 70A in order to operate the movement mechanism 62, thereby moving the dimension-measuring unit 60 into the mounting unit 50 (Step S4F).

Subsequent to the Step S4, the operator operates such that the optical modulator 141 is vacuumed to be held by the liquid crystal panel holder 34 of the six-axis position-adjusting device 30 with the pins 1413 being inserted in the holes 1412A at the four corners of the holder frame 1412, the pins 1413 being applied with the ultraviolet curing adhesive (Step S5: optical-modulator-holding process).

Subsequent to the Step S5, the operator operates the operating unit 71 of the control device 70 in order to input for requesting a position adjustment of the optical modulators 141 The controlling unit 73 invokes the program stored in the memory 734 and performs the position adjustment of each of the optical modulators 141 (Step S6).

Figure 18:
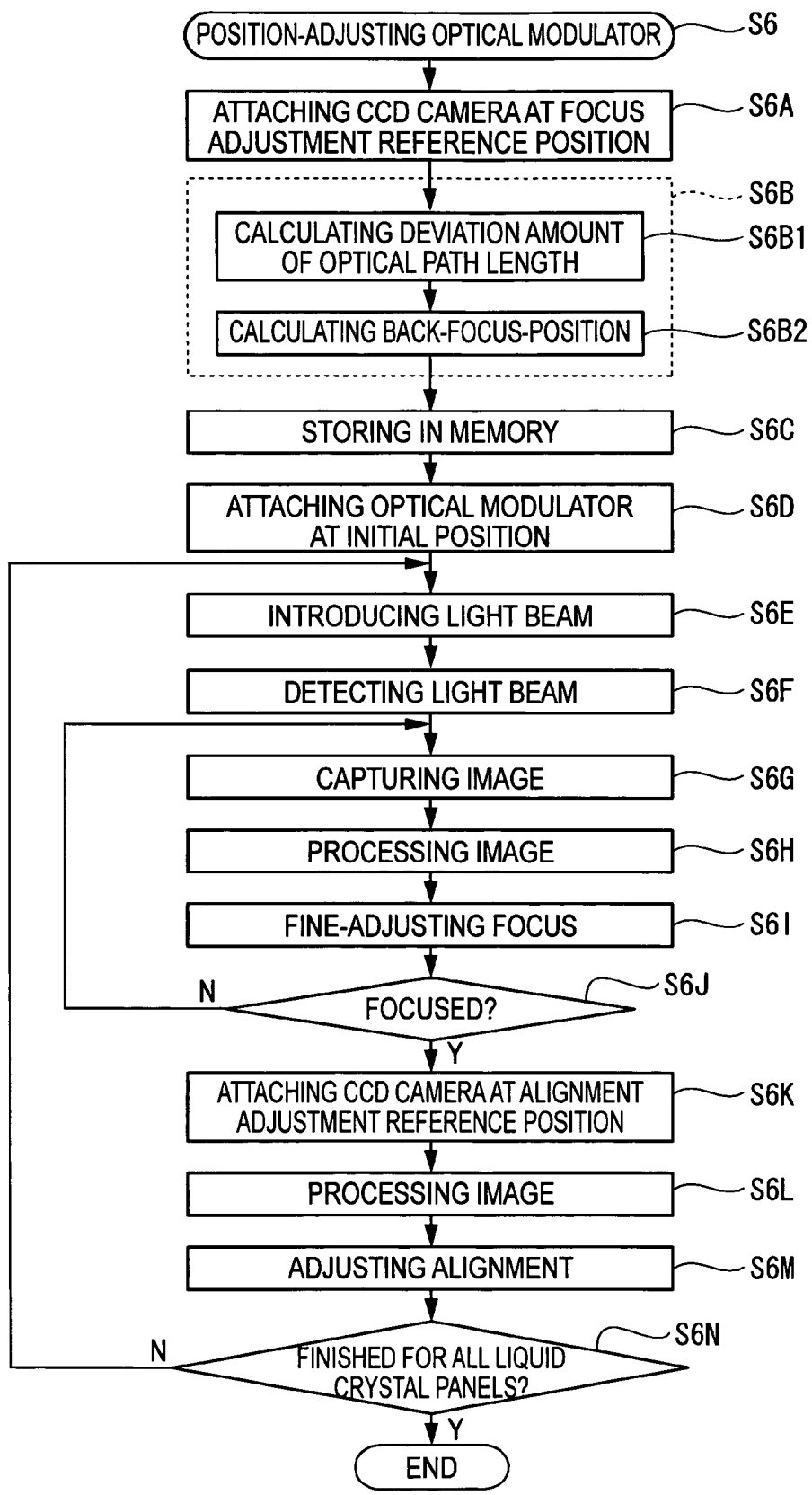
FIG. 18 is a flowchart to explain a position-adjusting method for the optical modulators.

FIG. 18 is a flowchart to explain the position-adjusting method of the optical modulators 141.

Firstly, the drive controller 733, based on the model data stored in the memory 734, outputs predetermined control signals to the drive unit 70A in order to drive the movement mechanism 43, thereby locating the four CCD cameras 41 at the focus adjustment reference positions (Step S6A).

Subsequent to the Step S6A, the initial-position judging section 735 of the controlling unit 73 judges the initial positions of the optical modulators 141 (liquid crystal panels 1411) in a below described manner (Step S6B).

Figure 19:
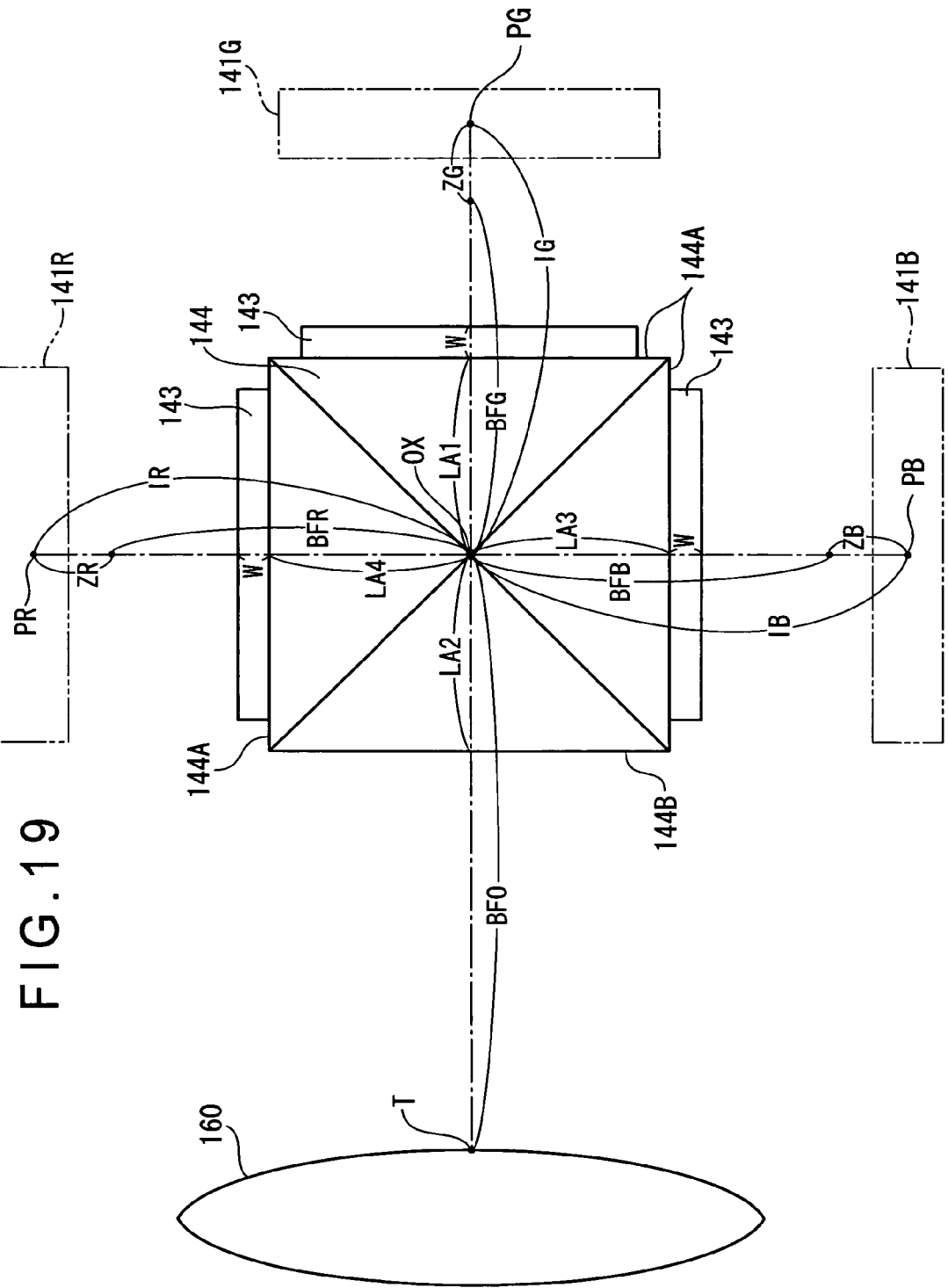
FIG. 19 is an illustration to explain a judging method of an initial position according to the first exemplary embodiment.

FIG. 19 is an illustration to explain a judging method of the initial positions. In FIG. 19, the red-light optical modulator, the green-light optical modulator and the blue-light optical modulator are respectively denoted as 141R, 141G and 141B in order to simplify the explanation.

Note that, when the light beam passes through an object having a predetermined refractive index, the optical path length of the light beam is different from the optical path length in a condition that the light beam passes through the air layer. When assuming that the refractive index of the object is n and the size of the object to be passed is D, the deviation amount Z of the optical path length is calculated by the following equation (1). In the equation (1), the refractive index of the air layer is 1.

$$Z=(1-1/n)*D \quad (1)$$

Specifically, since the cross dichroic prism 144 and the irradiation-side polarization plate 143, which both have a predetermined refractive index, are interposed between the projection lens 160 and the optical modulators 141 (liquid crystal panels 1411), the back-focus surface of the projection lens 160 is slightly deviated from the designed back-focus position that is deviated from the lens vertex of the projection lens 160 merely by the back-focus distance (geometrical distance). The initial-position judging section 735 calculates the deviation amount of the optical path length based on the distances LA1 to LA4 that pass the cross dichroic prism 144 and the irradiation-side polarization plate 143 and the thickness W of the irradiation-side polarization plate 143, which are stored in the memory 734 (Step S6B1: deviation-amount-calculating process), and calculates the back-focus position (initial position) of the projection lens 160 in correspondence with the calculated deviation in the optical path length (Step S6B2: back-focus-position-calculating process).

For instance, the initial-position judging section 735 judges the initial position of the green-light optical modulator 141G as described below.

As shown in FIG. 19, the light beam, which passes through the green-light optical modulator 141G and reaches the projection lens 160, passes through the irradiation-side polarization plate 143 having the thickness W and the cross dichroic prism 144 having the distances LA1 and LA2.

Hence, in the Step S6B1, the deviation-amount calculating unit 735A reads the distances LA1 and LA2, the thickness W of the irradiation-side polarization plate 143, the refractive index nA of the cross dichroic prism 144 and the refractive index nB of the irradiation-side polarization plate 143, which are stored in the memory 734, and calculates the deviation amount ZG of the optical path length of green light by the equation (1). That is, the deviation amount ZG of the optical path length of green light is calculated as: $(1-1/nA)(LA1+LA2)+(1-1/nB)*W$.

Subsequently, in the Step S6B2, the back-focus-position calculating unit 735B reads the back-focus distance BF defined in accordance with the specifications of the projection lens 160 and the distance BF0 from the lens vertex T on the uppermost steam of the projection lens 160 to the planar center axis Ox of the cross dichroic prism 144, which are stored in the memory 734; calculates the distance BFG from the planar center axis Ox of the cross dichroic prism 144 to the back-focus position of green light defined in accordance with the specifications of the projection lens 160; calculates the distance IG by adding the calculated deviation amount ZG of the optical path length to the distance BFG; and judges a coordinate value of the back-focus position of green light PG (initial position), in which the distance on from the planar center axis Ox to the deviation amount ZG of the optical path length is taken into account.

As described below, the initial-position judging section 735 also judges the initial position of the blue-light optical modulator 141B in the substantially same manner as the above.

As shown in FIG. 19, the light beam, which passes through the blue-light optical modulator 141B and reaches the projection lens 160, passes through the irradiation-side polarization plate 143 having the thickness W and the cross dichroic prism 144 having the distances LA3 and LA2.

Hence, in the Step S6B1, the deviation-amount calculating unit 735A reads the distances LA2 and LA3, the thickness W of the irradiation-side polarization plate 143, the refractive index nA of the cross dichroic prism 144 and the refractive index nB of the irradiation-side polarization plate 143, which are all stored in the memory 734, and calculates the deviation amount ZB of the optical path length of blue light by the equation (1). That is, the deviation amount ZB of the optical path length of blue light is calculated as: $(1-1/nA)(LA3+LA2)+(1-1/nB)*W$.

Subsequently, in the Step S6B2, the back-focus-position calculating unit 735B reads the back-focus distance BF defined in accordance with the specifications of the projection lens 160 and the distance BF0 from the lens vertex T on the uppermost steam of the projection lens 160 to the planar center axis Ox of the cross dichroic prism 144, which are stored in the memory 734; calculates the distance BFB from the planar center axis Ox of the cross dichroic prism 144 to the back-focus position of blue light defined in accordance with the specifications of the projection lens 160; calculates the distance IB by adding the calculated deviation amount ZB of the optical path length to the distance BFB; and judges a coordinate value of the back-focus position of blue light PB (initial position), in which the distance on from the planar center axis Ox to the deviation amount ZB of the optical path length is taken into account.

As described below, the initial-position judging section 735 also judges the initial position of the red-light optical modulator 141R in the substantially same manner as the above.

As shown in FIG. 19, the light beam, which passes through the red-light optical modulator 141R and reaches the projection lens 160, passes through the irradiation-side polarization plate 143 having the thickness W and the cross dichroic prism 144 having the distances LA4 and LA2.

Hence, in the Step S6B1, the deviation-amount calculating unit 735A reads the distances LA2 and LA4, the thickness W of the irradiation-side polarization plate 143, the refractive index nA of the cross dichroic prism 144 and the refractive index nB of the irradiation-side polarization plate 143, which are all stored in the memory 734, and calculates the deviation amount ZR of the optical path length of red light by the equation (1). That is, the deviation amount ZR of the optical path length of red light is calculated as: $(1-1/nA)(LA4+LA2)+(1-1/nB)*W$.

Subsequently, in the Step S6B2, the back-focus-position calculating unit 735B reads the back-focus distance BF defined in accordance with the specifications of the projection lens 160 and the distance BF0 from the lens vertex T on the uppermost steam of the projection lens 160 to the planar center axis Ox of the cross dichroic prism 144, which are stored in the memory 734; calculates the distance BFR from the planar center axis Ox of the cross dichroic prism 144 to the back-focus position of red light defined in accordance with the specifications of the projection lens 160; calculates the distance IR by adding the calculated deviation amount ZR of the optical path length to the distance BFR; and judges a coordinate value of the back-focus position of the red light PR (initial position), in which the distance on from the planar center axis Ox to the deviation amount ZR of the optical path length is taken into account.

The back-focus-position calculating unit 735B stores the coordinate values of the back-focus positions PR, PG, PB judged in the Step S6B (information about the initial positions) in the memory 734 (Step S6C).

Subsequent to the Step S6C, the drive controller 733 reads the coordinate values of the back-focus positions PR, PG, PB stored in the memory 734 and outputs predetermined control signals to the drive unit 70A to move the six-axis position-adjusting devices 30, thereby positioning the optical modulators 141 at the back-focus positions PR, PG, PB (Step S6D: positioning process). Herein, the pins 1413 applied with the ultraviolet curing adhesive are abutting on the light incident surfaces of the cross dichroic prism 144. Note that, in the Step S6D, while each of the optical modulators 141 is located at a predetermined position in a direction toward and away from the cross dichroic prism 144, an inclination direction relative to the optical axis and a rotation direction around the optical axis of the optical modulator 141 are positioned at designed predetermined positions.

Subsequent to the Step S6D, the drive controller 733 outputs predetermined control signals to the drive unit 70A in order to drive the adjustment light-source device 81, thereby introducing the position-adjusting light beam (green light) to the green-light optical modulator 141G (liquid crystal panel 1411) (Step S6E).

The controlling unit 73 controls the CCD cameras 41 of the light-beam detector 40 to detect the light beam (green light) irradiated by the light irradiation surface of the cross dichroic prism 144 (Step S6F).

Subsequent to the Step S6F, the capturing unit 731 of the controlling unit 73 inputs the signals output by the CCD cameras 41 and converts the input signals to the image signals (Step S6G). And then, the capturing unit 731 outputs the converted image signals to the image processor 732.

The best-attitude-position judging section 732A of the image processor 732 reads the image signals output by the capturing unit 731 and, for instance in FIG. 12, calculates specific index values (edge strength) at peripheries of the pixel areas CA from the images 74 at the four corners of the liquid crystal panel 1411 (Step S6H). The best-attitude-position judging section 732A then stores the calculated index values in the memory 734 and outputs predetermined signals to the drive controller 733.

The drive controller 733 outputs predetermined control signals to the drive unit 70A based on the signals output by the best-attitude-position judging section 732A in order to drive the six-axis position-adjusting devices 30, thereby performing a focus-fine-adjustment of the green-light optical modulator 141G (liquid crystal panel 1411) (i.e., a fine-adjustment in the direction toward and away from the cross dichroic prism 144) (Step S6I).

The best-attitude-position judging section 732A judges whether or not the calculated index values of the four corners become substantially equal to each other and largest after performing the focus-fine-adjustment of the green-light optical modulator 141G (liquid crystal panel 1411) in the Step S6I, i.e., whether or not being in a focused condition (Step S6J). If the best-attitude-position judging section 732A judges not being in the focused condition, the Steps S6G to 6J are repeatedly performed.

Subsequent to the Step S6J, the drive controller 733, based on the model data stored in the memory 734, outputs predetermined control signals to the drive unit 70A in order to drive the movement mechanism 43, thereby locating the four CCD cameras 41 at the alignment adjustment reference positions (Step S6K).

Subsequent to the Step S6K, the best-attitude-position judging section 732A reads the reference pattern of the optical modulator 141 stored in the memory 734 and compares the reference pattern image with the detected pattern image at the four corners of the liquid crystal panel 1411 that is in the focused condition, thereby calculating the deviation amount of the detected pattern image relative to the reference pattern image (Step S6L). And then, the best-attitude-position judging section 732A outputs predetermined signals to the drive controller 733 based on the calculated deviation amount.

The drive controller 733 outputs predetermined control signals to the drive unit 70A based on the signals output by the best-attitude-position judging section 732A in order to drive the six-axis position-adjusting device 30, thereby performing the alignment adjustment of the green-light optical modulator 141G (liquid crystal panel 1411) (i.e., the adjustment of plan position, in-plane rotation position and out-plane rotation position) (Step S6M). And the liquid crystal panel 1411 is located at best alignment position.

Subsequent to the Step S6M, the above described the Steps S6E to S6M are performed for the other red-light optical modulator 141R and blue-light optical modulator 141B (Step S6N).

When performing the Steps S6E to S6M for the red-light optical modulator 141R and the blue-light optical modulator 141B, in the Step S6E, the drive controller 733 outputs predetermined control signals to the drive unit 70A in order to drive the adjustment light-source device 81, thereby introducing the position-adjusting light beam in correspondence with the red-light optical modulator 141R and the blue-light optical modulator 141B (i.e. red light and blue light) to the red-light optical modulator 141R and the blue-light optical modulator 141B respectively.

After the positions of the optical modulators 141 (liquid crystal panels 1411) are adjusted in the Step S6, the controlling unit 73 outputs predetermined control signals to the drive unit 70A in order to drive the fixation light-source device 82, thereby irradiating the position-fixing light beams (ultraviolet rays) to the pins 1413. Accordingly, the ultraviolet curing adhesive between the peripheries of the pins 1413 and the holes 1412A of the holder frames 1412 and between the ends of the pins 1413 and the light incident surfaces of the cross dichroic prism 144 is cured, thereby fixing the optical modulators 141 on the cross dichroic prism 144.

Through the above described processes, the optical device body 140A is manufactured.

In the above-described first exemplary embodiment, since the manufacturing apparatus 1 has the above-explained arrangement, the external dimension in the optical-axis direction of the cross dichroic prism 144 is measured (Step S4); the deviation amount of the optical path length in the condition that the cross dichroic prism 144 and the irradiation-side polarization plates 143 are interposed between the optical modulators 141 and the projection lens 160 is calculated (Step S6B1); the back-focus positions PR, PG, PB of the projection lens 160 in correspondence with the deviation of the optical path length (Step S6B2) are respectively calculated; and the optical modulators 141 are respectively located at the back-focus positions PR, PG, PB (Step S6D); in the manufacturing of the optical device body 140A. Thus, unlike the related arts, it is not necessary to detect the light beams, which pass through the optical modulator 141 (liquid crystal panel 1411) and the cross dichroic prism 144, at many positions in the direction toward and away from the cross dichroic prism 144, but the back-focus positions PR, PG, PB can be quickly judged. Accordingly, the optical device body 140A can be quickly manufactured without spending a lot of time in the position-adjusting of the optical modulator 141 (liquid crystal panel 1411). In addition, thus quickly manufacturing the optical device body 140A can decrease the unit cost of the optical device body 140A, and consequently, the unit cost of the entire projector 100 can be decreased.

Since the external dimension in the optical-axis direction of the cross dichroic prism 144 is actually measured (Step S4) and the deviation amount of the optical path length (Step S6B1) and the back-focus position are calculated based on the measured external dimension (Step S6B2), the back-focus position can be accurately calculated even if the cross dichroic prism 144 to be a product has a manufacturing error, so that the optical modulators 141 can be located at the accurate back-focus positions PR, PG, PB, thereby precisely manufacturing the optical device body 140A as compared with the arrangement in which the deviation amount of the optical path length and the back-focus position are calculated based on the designed external dimension of the cross dichroic prism 144.

In the Step S6B1, not only the external dimension in the optical-axis direction of the cross dichroic prism 144 but also the thickness W of the irradiation-side polarization plate 143 is taken into account in the calculation of the deviation amount of the optical path length, so that each of the optical modulators 141 can be more accurately located at the back-focus positions PR, PG, PB.

Since the four dimension-measuring units 60 are provided and the distances LA1 to LA4 from the planar center axis Ox of the cross dichroic prism 144 to the light incident surfaces 144A and the light irradiation surface 144B are measured, even if the four right-angle prisms forming the cross dichroic prism 144 have a manufacturing error, the external dimension in the optical-axis direction of the cross dichroic prism 144 can be accurately calculated. Hence, the back-focus positions can be accurately calculated and the optical modulators 141 can be located at such accurate back-focus positions, thereby precisely manufacturing the optical device body 140A.

The controlling unit 73 has the capturing unit 731 and the best-attitude-position judging section 732A, the controlling unit 73 capturing the images detected by the light-beam detector 40, performing the image-processing, and judging the best attitude positions of the optical modulators 141 (liquid crystal panels 1411). And the drive controller 733 locates the optical modulators 141 at the back-focus positions PR, PG, PB (Step S6D), and then drives the six-axis position-adjusting devices 30 based on the best attitude positions judged by the best-attitude-position judging section 732A to finely adjust the positions of the optical modulators 141 (liquid crystal panels 1411) (Step S61). Accordingly, the optical modulators 141 can be respectively located at the best positions relative to the cross dichroic prism 144, thereby precisely manufacturing the optical device body 140A.

Further, since the focus-fine-adjustment of each of the optical modulators 141 (liquid crystal panels 1411) is performed (Step S61) after the optical modulators 141 (liquid crystal panels 1411) are located at the back-focus positions PR, PG, PB of the projection lens 160 which are corresponding to the deviations of the optical path lengths (Step S6D), the optical modulators 141 (liquid crystal panels 1411) do not need to be moved a long distance in the direction toward and away from the cross dichroic prisms 144 unlike the related arts. Consequently, the optical device body 140A can be quickly and precisely manufactured without spending a lot of time in the focus adjustment of the optical modulators 141 (liquid crystal panels 1411).

The dimension-measuring unit 60 has the laser-beam irradiation unit 611 and the laser-beam-receiving unit 614 and has the arrangement in which the external dimension of the cross dichroic prism 144 in the optical-axis direction is measured in a non-contact method, so that the external dimension of the cross dichroic prism 144 in the optical-axis direction can be measured more speedy as compared with the arrangement employing a contact-type dimension-measuring unit 60 in which the thickness of the cross dichroic prism 144 in the optical-axis direction is measured by bringing a probe into contact with the cross dichroic prism 144.

The manufacturing apparatus 1 has the arrangement in which the image light having passed through the optical modulators 141 (liquid crystal panels 1411) and the cross dichroic prism 144 is directly detected by the CCD cameras 41, so that the image light is not to be projected on the screen or the like, thereby omitting components such as the screen to downsize the manufacturing apparatus.

2 Second Exemplary Embodiment

A second exemplary embodiment of the invention will be described below. In the following description, the same reference numeral will be attached to the same components as the above to omit the description thereof.

In the first exemplary embodiment, the manufacturing apparatus 1 of direct-view method is employed for manufacturing the optical device body 140A, in which the light beam that is introduced to the optical device body 140A and then irradiated by the optical device body 140A is directly detected by the CCD camera 41.

On the other hand, in the second exemplary embodiment, a projection-type manufacturing apparatus 2 is employed for manufacturing the optical device body 140A, in which the light beam that is introduced to the optical device body 140A and then irradiated by the optical device body 140A is projected on a screen in an enlarged manner by a master lens ML, so that the projection image on the screen is detected.

Arrangement of Manufacturing Apparatus

Figure 20:
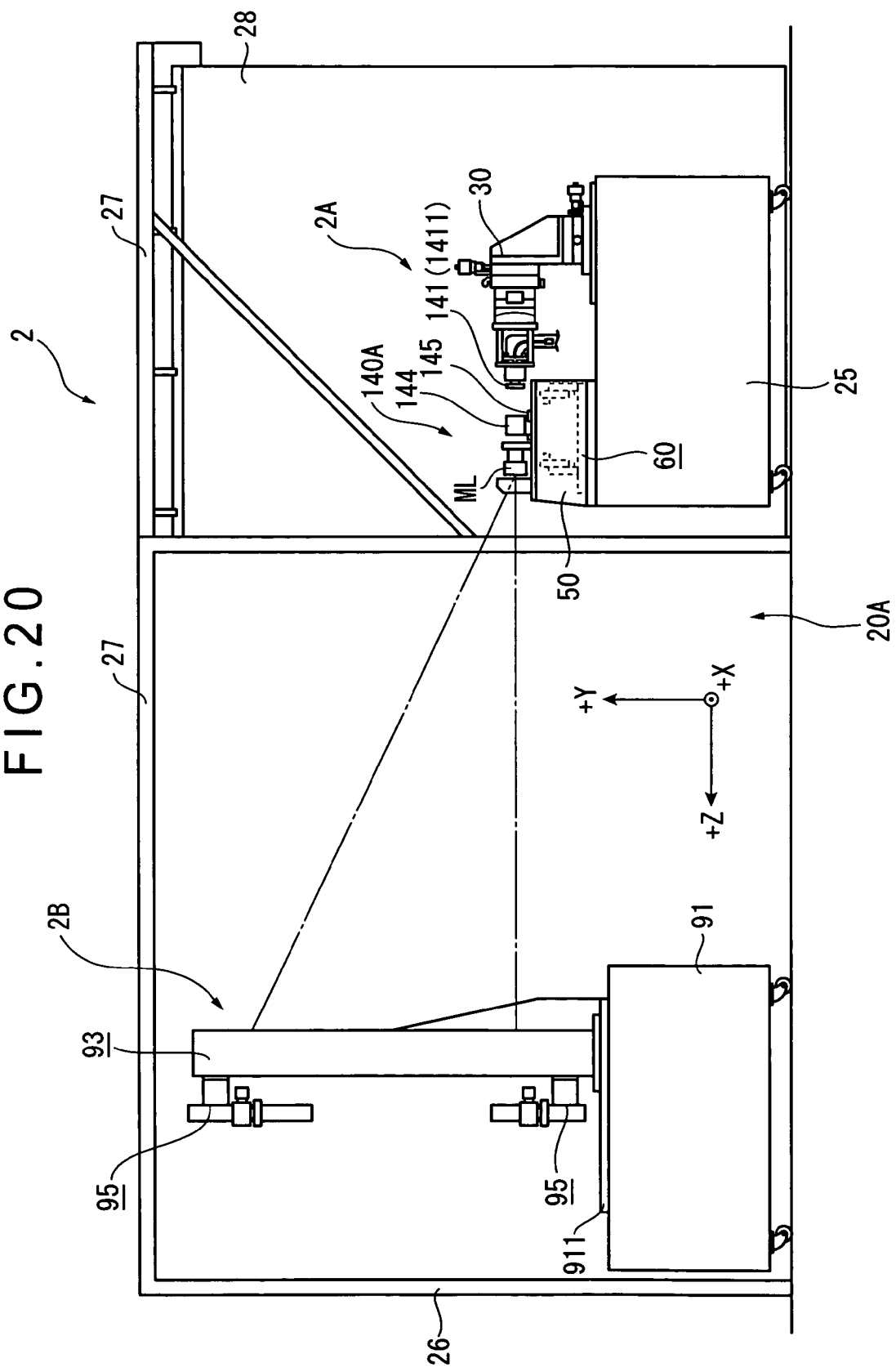
FIG. 20 is a view showing a manufacturing apparatus of an optical device body according to a second exemplary embodiment.
Figure 21:
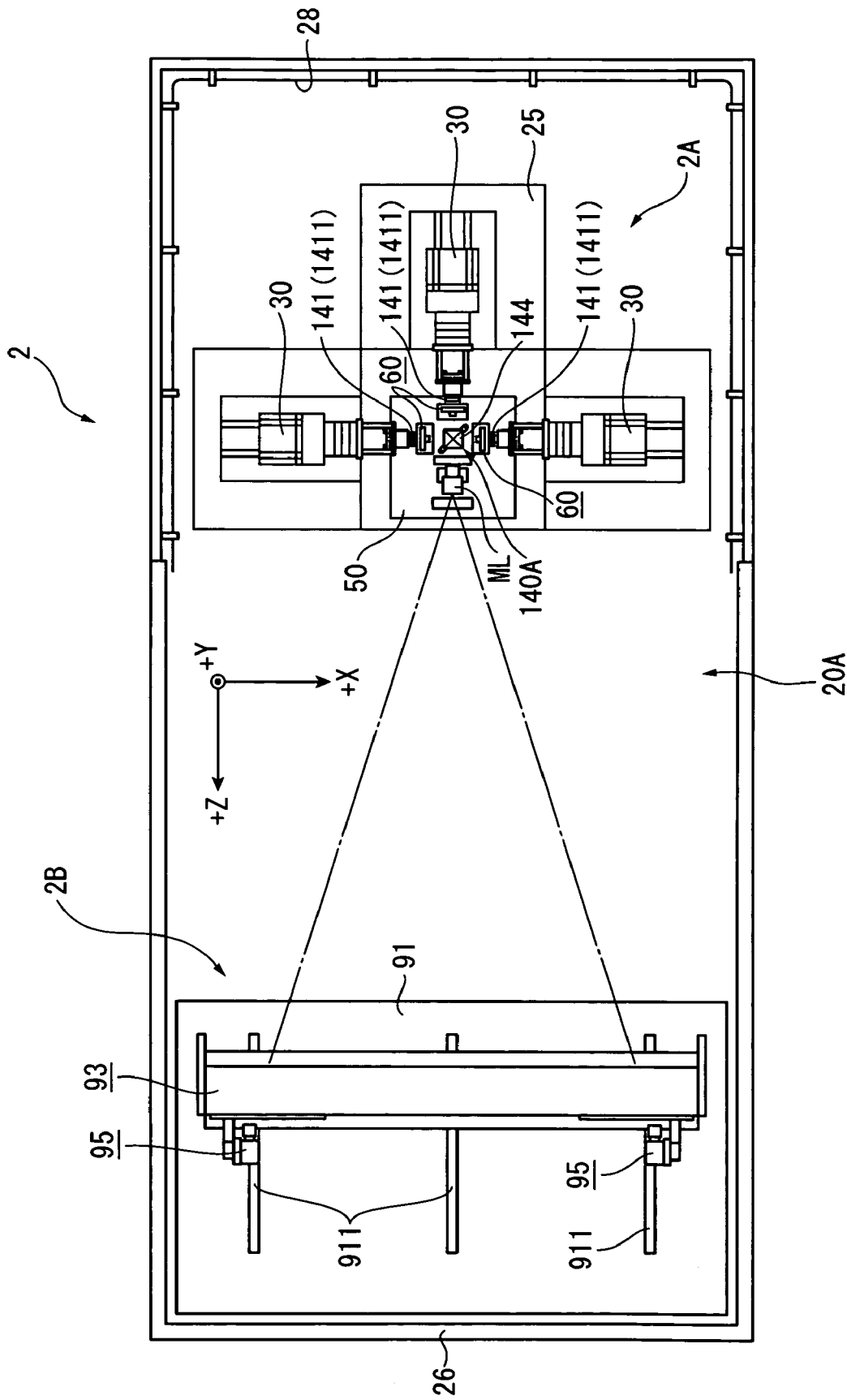
FIG. 21 is another view showing the manufacturing apparatus of the optical device body according to the second exemplary embodiment.

FIGS. 20 and 21 are views showing the manufacturing apparatus 2 of the optical device body 140A according to the second exemplary embodiment. Specifically, FIG. 20 is a side view of the manufacturing apparatus 2, and FIG. 21 is a plan view showing an upper side of the manufacturing apparatus 2. In FIGS. 20 and 21, it is assumed for clear explanation that the direction of the optical axis of the light beam irradiated by the optical device body 140A to be manufactured is the Z-axis and the two axes orthogonal to the Z-axis are the X- and Y-axes.

As shown in FIG. 20 or 21, the manufacturing apparatus 2 has a manufacturing apparatus body 2A, a screen unit 2B and the control device (see FIG. 25) that controls the entire manufacturing apparatus 2 and performs image-processing. Among these components, the manufacturing apparatus body 2A and the screen unit 2B are disposed in a dark room 20A, the dark room 20A having side plates 26 and top plates 27 that enclose the manufacturing apparatus body 2A and the screen unit 2B as well as a curtain 28 that encloses the manufacturing apparatus body 2A. The optical device body 140A is manufactured in the dark room 20A.

Arrangement of Manufacturing Apparatus Body

The manufacturing apparatus body 2A is a component on which the optical device body 140A to be manufactured is mounted and the optical modulators 141 are position-adjusted and fixed on the light incident surfaces of the cross dichroic prism 144. Also shown in FIG. 20 or 21, the manufacturing apparatus body 2A further has the three six-axis position-adjusting devices 30, the mounting unit 50, the dimension-measuring units 60, the table 25 on which the components 30, 50, 60 are mounted, the adjustment light-source device 81 and the fixation light-source device 82 that are all explained above in the first exemplary embodiment, the latter two not being shown in the figures here. And the mounting unit 50 according to the second exemplary embodiment is arranged such that the master lens ML corresponding to the optical device body 140A to be manufactured can be mounted thereon.

Arrangement of Screen Unit

Figure 22:
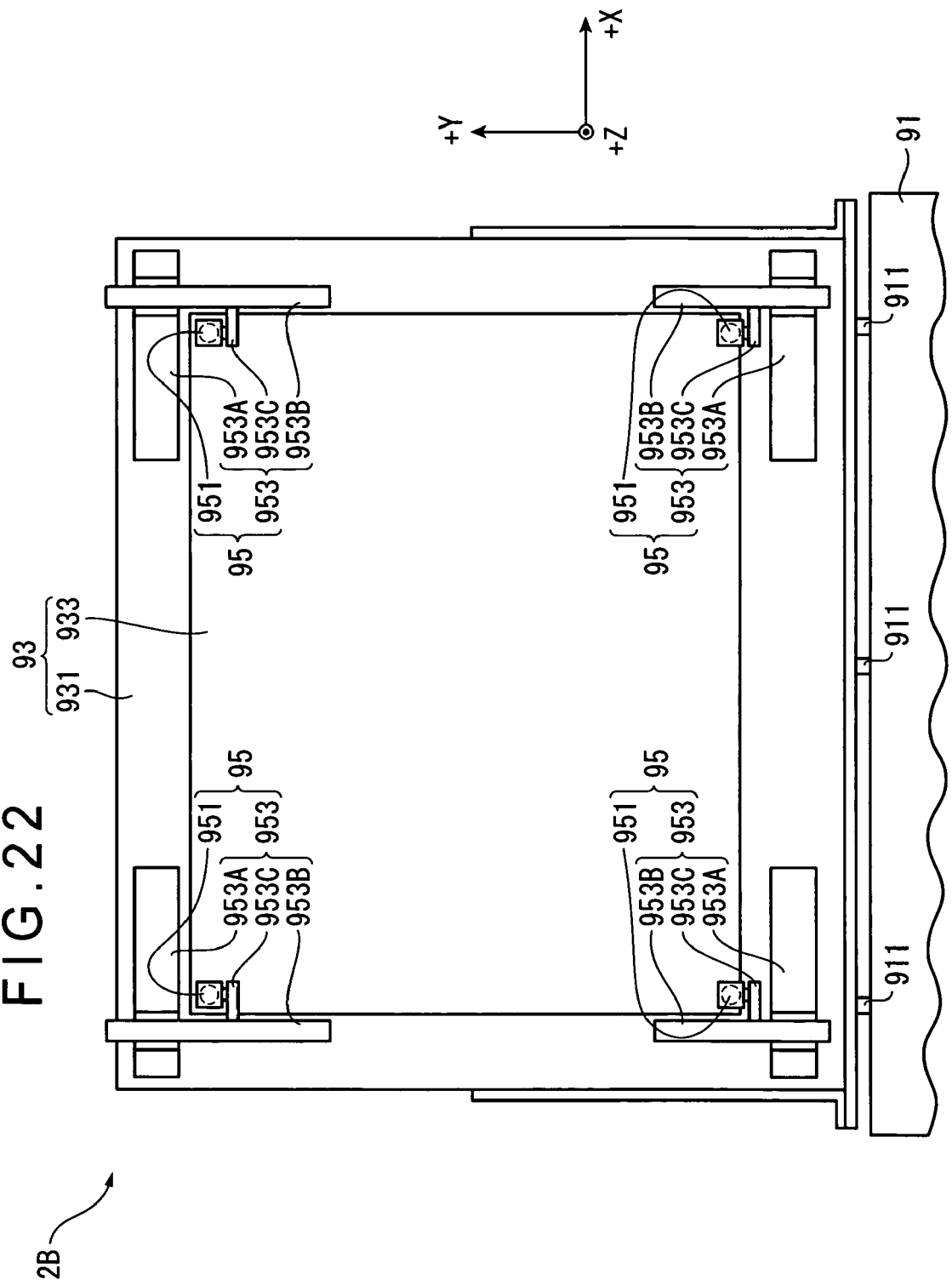
FIG. 22 is a plan view showing a rear side of a screen unit according to the second exemplary embodiment.

FIG. 22 is a plan view showing a rear side of the screen unit 2B. Also in FIG. 22 like in FIGS. 20 and 21, it is assumed that the direction of the optical axis of the light beam irradiated by the optical device body 140A to be manufactured is the Z-axis and the two axes orthogonal to the Z-axis are the X- and Y-axes.

On the screen unit 2B, the light beam that is irradiated by the optical device body 140A to be manufactured and projected in an enlarged manner by the master lens ML (FIGS. 20 and 21) is projected, the projected light beam being detected. The screen unit 2B has a table 91, a transmissive screen 93 (as an image formation section) and a light-beam detector 95 as shown in FIGS. 20 through 22.

The table 91 is disposed apart from the manufacturing apparatus body 2A by a predetermined distance and has the transmissive screen 93 and the light-beam detectors 95 that are mounted thereon as shown in FIG. 20 or 21. On the top surface of the table 91, three rails 911 extending in the Z-axis direction (horizontal direction in FIGS. 20 and 21) are provided.

The transmissive screen 93 is engaged with the rails 911 on the table 91 so as to be movable along the Z-axis direction (horizontal direction in FIGS. 20 and 21), and the light beam that is irradiated by the optical device body 140A to be manufactured and is projected in an enlarged manner by the master lens ML is projected on the tranmissive screen 93. Note that, the transmissive screen 93 is moved by the drive of the drive unit (not shown) such as a motor. The transmissive screen 93 has a rectangular frame 931 provided around thereof and a screen body 933 provided in the frame 931 as shown in FIG. 22. The screen body 933 may be formed by uniformly dispersing optical beads on an opaque resin. When the light beam is incident on the surface on which the optical beads are arranged, the optical beads work as a lens, so that the light beam is irradiated to the rear side of the screen body 933.

The light-beam detectors 95 are arranged on the rear surface of the transmissive screen 93 and detect the projection image formed on the rear surface side of the screen body 933. The light-beam detector 95 has 3CCD cameras 951 and movement mechanisms 953 as shown in FIGS. 20 through 22.

Figure 23:
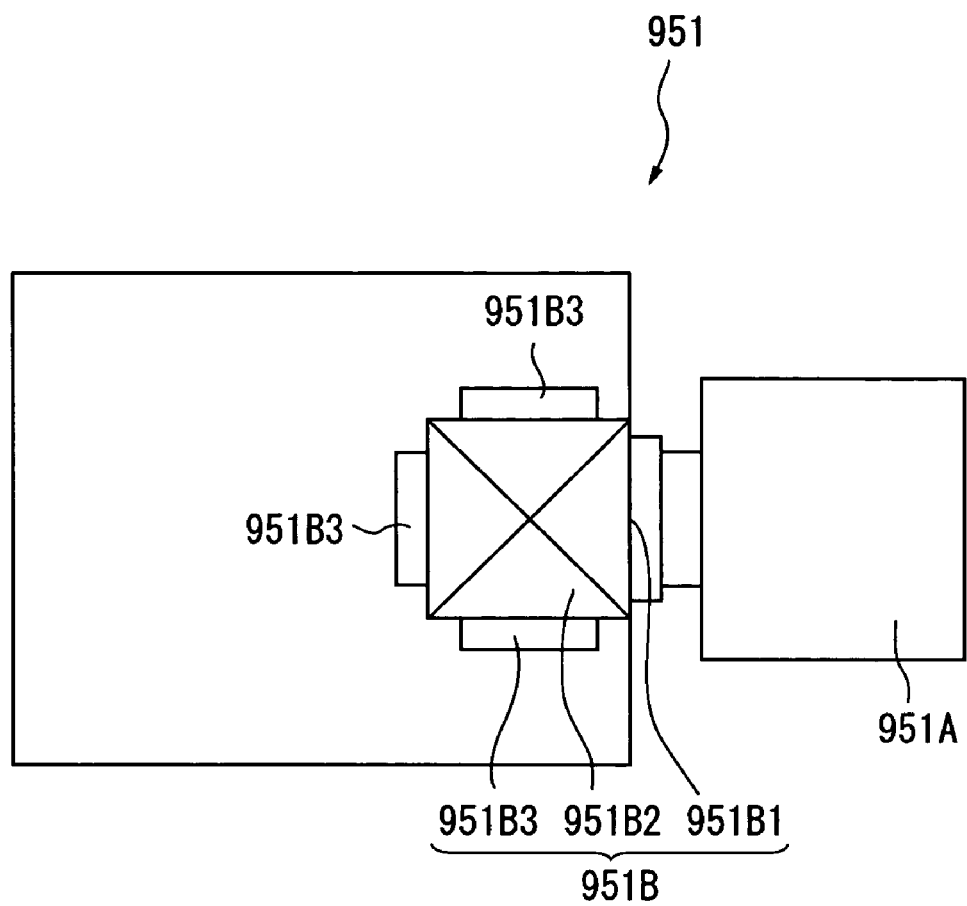
FIG. 23 is a schematic illustration showing an arrangement of a 3CCD camera according to the second exemplary embodiment.

FIG. 23 is a schematic illustration showing an arrangement of the 3CCD camera 951.

The 3CCD camera 951 detects the projection image formed on the rear surface side of the screen body 933 and outputs the image as electrical signals, the four 3CCD cameras being disposed via the movement mechanisms 953 near the four corners of the rectangular projection image displayed on the transmissive screen 93. As shown in FIG. 23, the 3CCD camera 951 has a condenser lens 951A that condenses the light beam from outside at the inside thereof and an image pickup 951B disposed at the back-focus position of the condenser lens 951.

Figure 24:
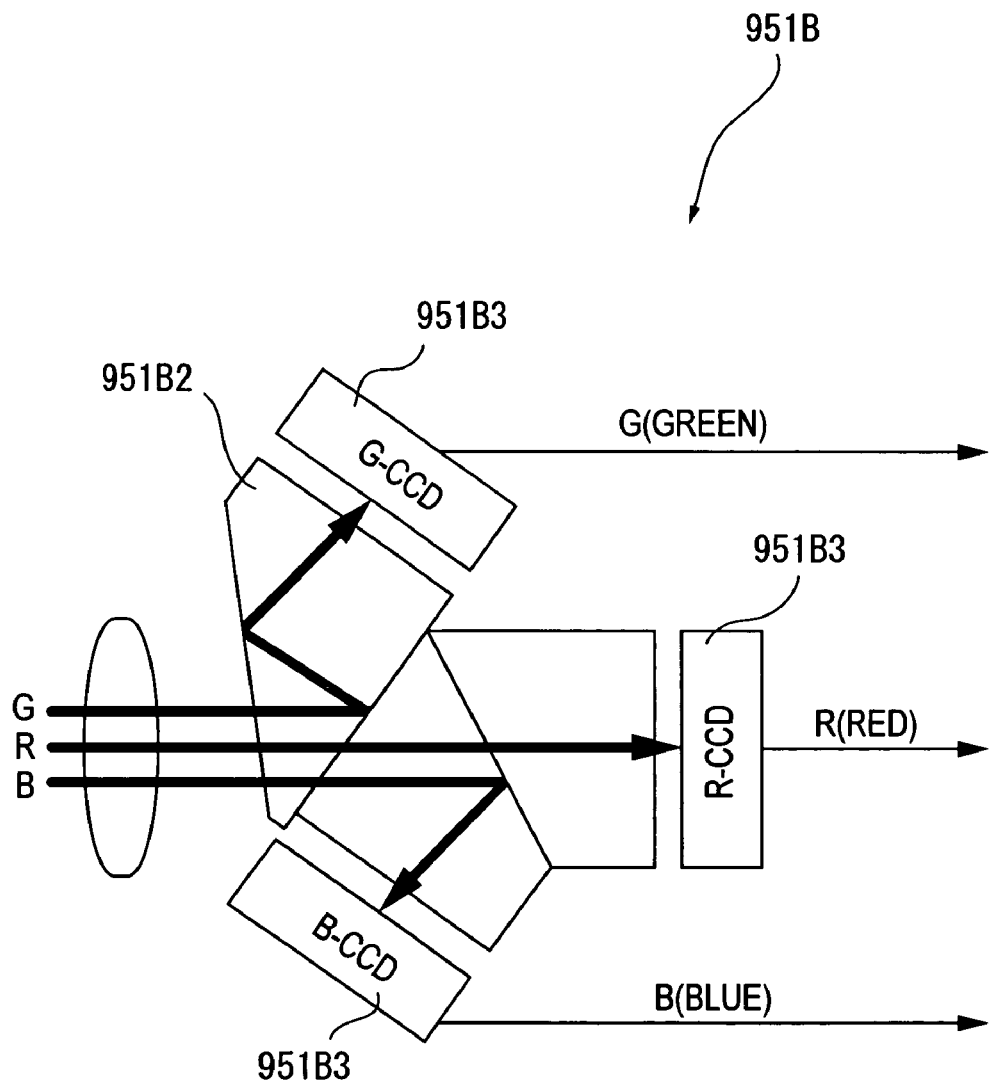
FIG. 24 is an illustration showing a modification according to the second exemplary embodiment.

The image pickup 951B has an image plane 951B1 formed at the back-focus position of the condenser lens 951A, a dichroic prism 951B2 that splits the pixels on the image plane 951B1 into three colors (red, blue, green) and three CCDs 951B3 by which each of the irradiated color lights are superposed. However, the image pickup 951B may not have the above-described arrangement, but have a different arrangement as shown in FIG. 24 for instance.

Specifically, the dichroic prism 951B2 is constituted of three prisms. Between the three prisms, a blue light reflection film and a green light reflection film are formed. Due to the films, the incident light beam is split into the color lights of R, G, B. Herein, the blue light reflection film and green light reflection film are formed between the three prisms, but the arrangement may be different and the blue light reflection film and red light reflection film or the red light reflection film and green light reflection film may be alternatively formed.

The three CCDs 951B3 are electrically connected to the control device of the manufacturing apparatus body 2A, and the image signals of the color lights converted by the CCDs 951B3 (R, G and B signals) are input to the control device, thereby performing the image-processing.

The movement mechanism 953 has bases 953A provided near the four corners of the frame 931, four shafts 953B slidably provided in the X-axis direction (horizontal direction in FIG. 22) and camera attachments 953C that are respectively provided to the shafts 953B slidably in the Y-axis direction (vertical direction in FIG. 2) and support and fix the 3CCD cameras 951. Note that, the shafts 953B and the camera attachments 953C are moved by the drive of the drive unit (not shown) such as a motor.

Arrangement of Control Device

Figure 25:
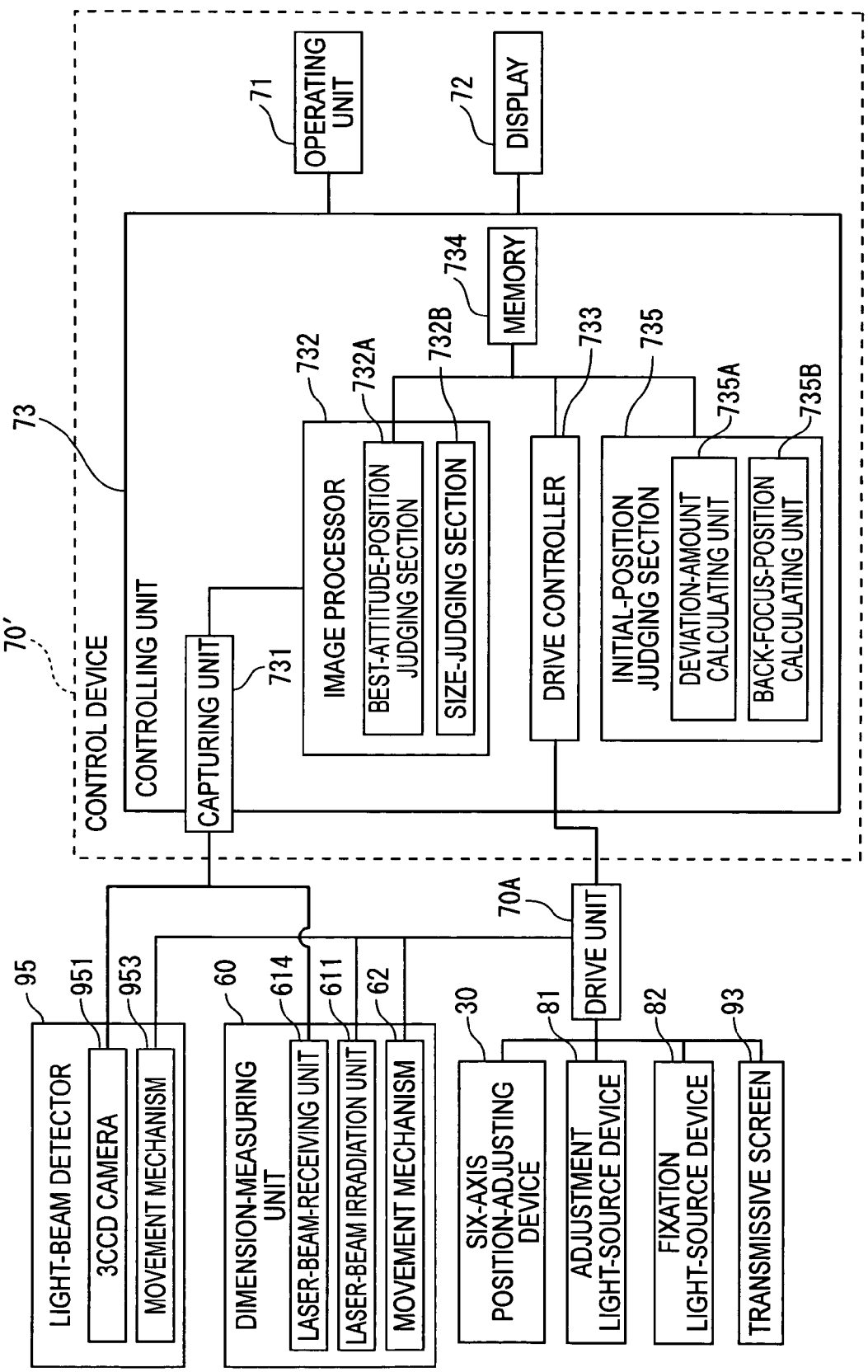
FIG. 25 is a block diagram showing a control structure of a control device according to the second exemplary embodiment.

FIG. 25 is a block diagram showing a control structure of a control device 70'.

Like the control device 70 that is described above in the first exemplary embodiment, the control device 70' is constituted of a computer having a CPU and a hard disk, and controls the entire manufacturing apparatus 2 by executing various programs. As shown in FIG. 25, the control device 70' differs from the first exemplary embodiment only in terms of an object to be controlled, but like the above-described control device 70 of the first exemplary embodiment, the control device 70' has the operating unit 71, the display 72, the controlling unit 73 (including the capturing unit 731, the image processor 732 (having the best-attitude-position judging section 732A and the size-judging section 732B), the drive controller 733, the memory 734 and the initial-position judging section 735 (having the deviation-amount calculating unit 735A and the back-focus-position calculating unit 735B)).

Also as shown in FIG. 25, the control device 70' of the second exemplary embodiment controls the six-axis position-adjusting devices 30, the dimension-measuring units 60, the adjustment light-source device 81, the fixation light-source device 82, the transmissive screen 93 and the light-beam detector 95.

The memory 734 of the second exemplary embodiment stores the predetermined control program; the model data; the external dimension of the cross dichroic prism 144 that is output by the image processor 732; and the data about the initial position or the like, which is output by the initial-position judging section 735.

The model data is the substantially same as the above-described model data of the first exemplary embodiment, but alternatively includes data on the reference positions of the 3CCD cameras 951 (the focus adjustment reference position and the alignment adjustment reference position) instead of the data on the reference positions of the CCD cameras 41.

Manufacturing Method of Optical Device Body

The manufacturing method of the optical device body 140A according to the above-explained manufacturing apparatus 2 will be described next with reference to the drawings.

Figure 26:
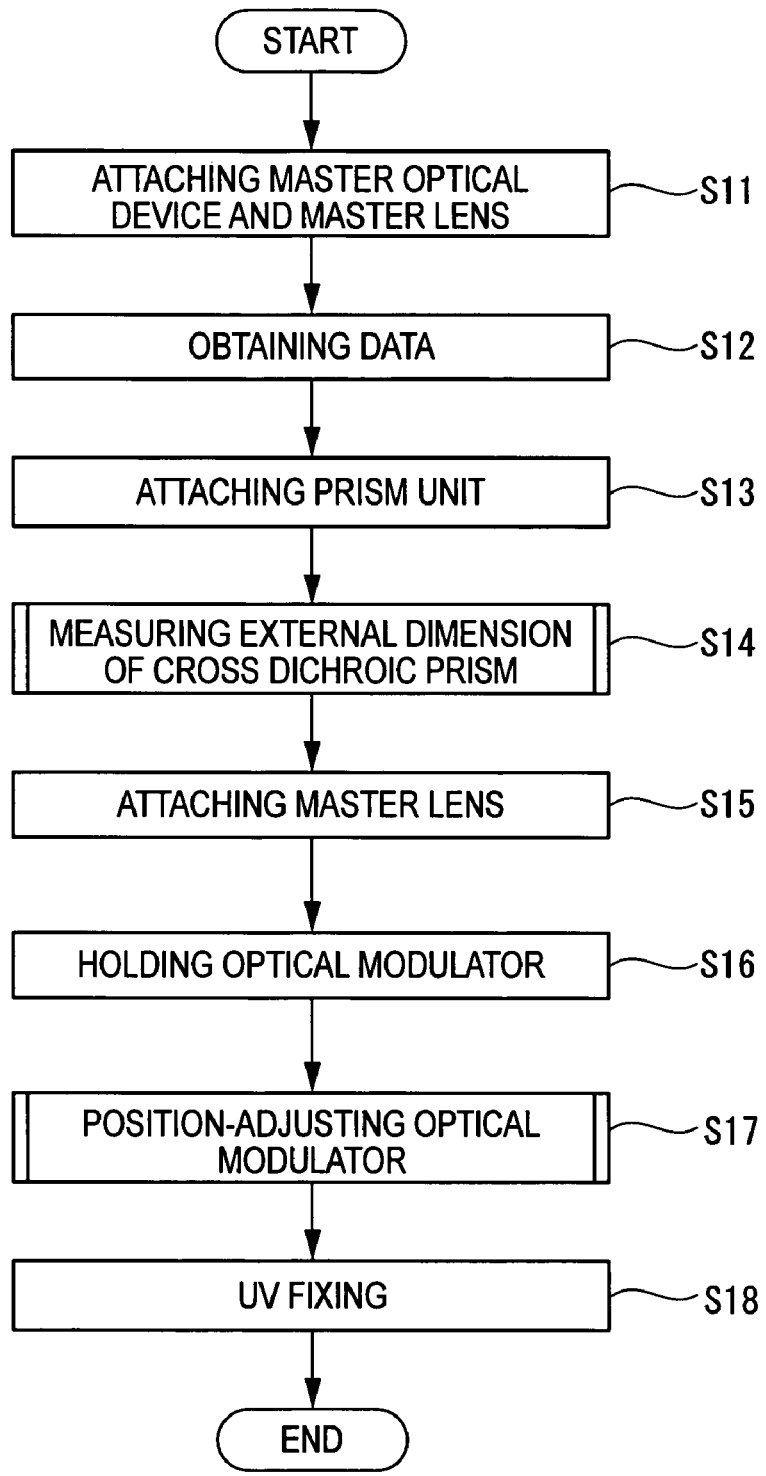
FIG. 26 is a flowchart to explain a manufacturing method of the optical device body according to the second exemplary embodiment.

FIG. 26 is a flowchart to explain the manufacturing method of the optical device body 140A.

Firstly, as a preparation before manufacturing the optical device body 140A, the reference pattern for image-processing and the reference positions of the 3CCD cameras 951 according to the model of the projector are obtained in advance (Steps S11 and S12), which is the substantially same as the Steps S1 and S2 in the first exemplary embodiment.

Specifically, the operator attaches the master optical device and the master lens ML, which are described in the first exemplary embodiment, on the mounting unit 50 (Step S11).

Next, the operator operates the operating unit 71 of the control device 70' in order to invoke a predetermined program for registering the model data (reference pattern and reference positions of the 3CCD cameras 951) in accordance with the model of the projector. The controlling unit 73 of the control device 70' invokes the program stored in the memory 734 and performs the following process.

The controlling unit 73 operates the adjustment light-source device 81 in order to introduce the position-adjusting light beam to the reference liquid crystal panels of the master optical device from the tip ends of the six-axis position-adjusting devices 30. The projection image that is projected on the transmissive screen 93 in an enlarged manner by the master lens ML via the master optical device is captured by the 3CCD cameras 951 of the light-beam detector 95. Herein, the controlling unit 73 operates the movement mechanism 953 of the light-beam detector 95 to move the 3CCD cameras 951 to positions ensuring that the 3CCD cameras can receive the light beams (Step S2). The image captured by the 3CCD camera 951 is split into the three colors of red, green and blue and output to the controlling unit 73 as the R, G and B signals.

Note that, the image captured by the 3CCD camera 951 is the substantially same as the image captured by the CCD camera 41 (FIG. 12 or 13) as explained in the first exemplary embodiment.

The controlling unit 73 stores the reference patterns BP and the reference positions of the 3CCD cameras 951 (the focus adjustment reference position and the alignment adjustment reference position) in the memory 734 as model data in correspondence with the model in the same manner as the first exemplary embodiment (Step S12).

The above Steps S11 and S12 are performed for each of a plurality of models in advance, so that the reference patterns BP as well as the reference position of the 3CCD cameras 951 for each model (i.e. the focus adjustment reference position and the alignment adjustment reference position) are registered as the model data.

The above Steps S11 and S12 are firstly performed, and then the optical device body 140A is manufactured.

The operator removes the master optical device and the master lens ML that are mounted on the mounting unit 50 and attaches the prism unit on the mounting unit 50 in the substantially same manner as the Step S3 explained in the first exemplary embodiment (Step S13: device-attaching process).

Subsequent to the Step S13, the external dimension of the cross dichroic prism 144 is measured (Step S14: dimension-measuring process).

Since the Step S14 is the same as the Step S4 described in the first exemplary embodiment, explanation and detail illustration thereof are omitted, the Step S14 containing the Steps S4A to S4F (FIG. 14) like the Step S4 that is described in the first exemplary embodiment.

Subsequent to the Step S14, the operator attaches the master lens ML corresponding to the prism unit on the mounting unit 50 (Step S15).

Next to the Step S15, in the same manner as the Step S5 described in the first exemplary embodiment, the operator operates such that the optical modulators 141 are respectively vacuumed to be held by the liquid crystal panel holders 34 of the six-axis position-adjusting devices 30 with the pins 1413, which are applied with the ultraviolet curing adhesive, being inserted in the holes 1412A respectively at the four corners of the holder frame 1412 (Step S16: optical-modulator-holding process).

Subsequent to the Step S16, the operator operates the operating unit 71 of the control device 70' in order to input for requesting position adjustment of the optical modulators 141 The controlling unit 73 invokes the program stored in the memory 734 and performs the position adjustment of each of the optical modulators 141 (Step S17).

Figure 27:
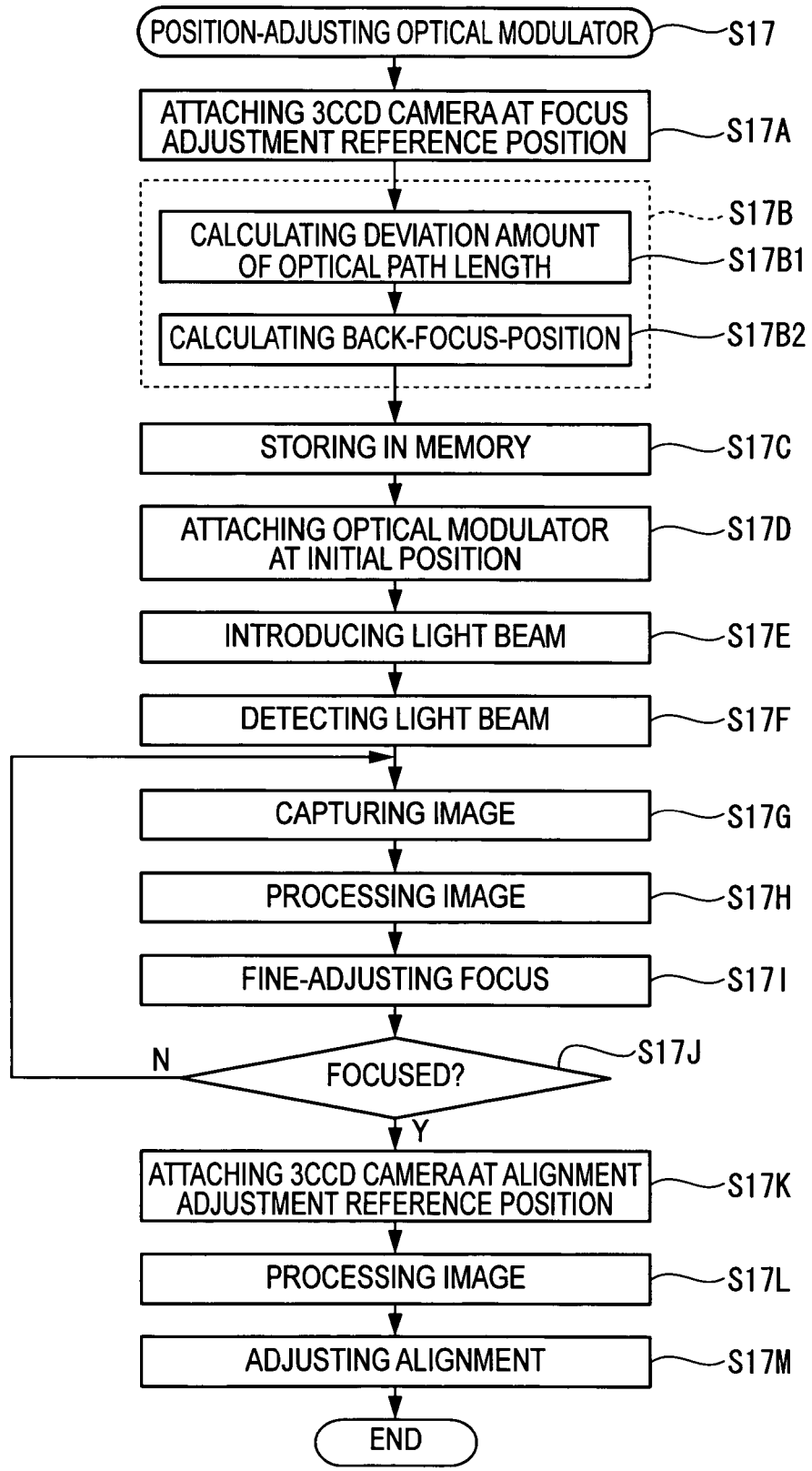
FIG. 27 is another flowchart to explain a position-adjusting method of optical modulators according to the second exemplary embodiment.

FIG. 27 is a flowchart to explain the position-adjusting method of the optical modulators 141.

Firstly, the drive controller 733, based on the model data stored in the memory 734, outputs predetermined control signals to the drive unit 70A in order to drive the movement mechanism 953, thereby locating the 3CCD cameras 951 at the focus adjustment reference positions (Step S17A).

Subsequent to the Step S17A, the controlling unit 73 performs the followings in the same manner as the Steps S6B to S6D described in the first exemplary embodiment: judging of the initial positions for calculating the deviation amount of the optical path length (Step S17B1: deviation-amount-calculating process) and calculating the back-focus positions PR, PG, PB (Step S17B2: back-focus-position-calculating process) (Step S17B); storing the coordination values of the back-focus positions PR, PG, PB in the memory 734 (Step S17C); and moving the optical modulators 141 respectively to the back-focus positions PR, PG, PB (Step S17D: positioning process).

Subsequent to the Step S17D, the drive controller 733 outputs predetermined control signals to the drive unit 70A in order to drive the adjustment light-source device 81, thereby introducing the position-adjusting light beam (R, G and B color lights) to the optical modulators 141 (liquid crystal panels 1411) from the tip ends of the six-axis position-adjusting devices 30 (Step S17E).

Next, the controlling unit 73 controls the 3CCD cameras 951 to detect the projection image that is projected by the master lens ML in an enlarged manner via the optical device body 140A and then projected on the transmissive screen 93 (Step S17F). The image captured by the 3CCD camera 951 is split into the three colors of red, green and blue and output to the controlling unit 73 as the R, G and B signals.

Subsequent to the Step S17F, the controlling unit 73 performs the followings simultaneously in each of the optical modulators 141 (liquid crystal panels 1411) based on the R, G and B signals output by the 3CCD cameras 951 in the same manner as the Steps S6G to S6J that are explained in the first exemplary embodiment: capturing the image (Step S17G), calculating the index value (Step S17H), finely adjusting the focus of the optical modulators (Step S17I) and judging the presence of focused condition (Step S17J).

Subsequent to the Step S17J, the drive controller 733, based on the model data stored in the memory 734, outputs predetermined control signals to the drive unit 70A in order to drive the movement mechanism 953, thereby locating the 3CCD cameras 951 at the alignment adjustment reference positions (Step S17K).

Subsequent to the Step S17K, the controlling unit 73 performs the followings simultaneously in each of the optical modulators 141 (liquid crystal panels 1411) in the same manner as the Steps S6L and S6M that are described in the first exemplary embodiment: calculating the deviation amount of the detected pattern image relative to the reference pattern image (Step S17L); and alignment adjustment of the optical modulators 141 (Step S17M).

After the positions of each of the optical modulators 141 (liquid crystal panels 1411) are adjusted in the Step S17, the controlling unit 73, in the same manner as the Step S17 described in the first exemplary embodiment, outputs predetermined control signals to the drive unit 70A in order to drive the fixation light-source device 82, thereby fixing the optical modulators 141 to the cross dichroic prism 144 (Step S118).

Through the above-explained Steps S11 to S18, the optical device body 140A is manufactured.

According to the second exemplary embodiment, even when the projection-type manufacturing apparatus 2 that detects the projection image projected on the transmissive screen 93 is employed, the same advantages as the manufacturing apparatus 1 described in the first exemplary embodiment can be attained.

Since the light-beam detector 95 is arranged to include the 3CCD cameras 951, the 3CCD cameras 951 can detect the projection image having passed through the optical modulators 141 and the cross dichroic prism 144 and projected on the transmissive screen 93 by the master lens ML, and the focus-fine-adjustment (Step S17I) and alignment adjustment (Step S17M) of the optical modulators 141 can be simultaneously performed based on the image detected by the 3CCD cameras 951. Therefore, the optical device body 140A can be quickly manufactured.

3 Third Exemplary Embodiment

A third exemplary embodiment of the invention will be described below. In the following description, the same reference numeral will be attached to the same components as the above to omit the description thereof.

The third exemplary embodiment differs from the first exemplary embodiment only in terms of the arrangement of the dimension-measuring unit. The arrangements of the other components are the same as the first exemplary embodiment.

Arrangement of Manufacturing Apparatus

Figure 28:
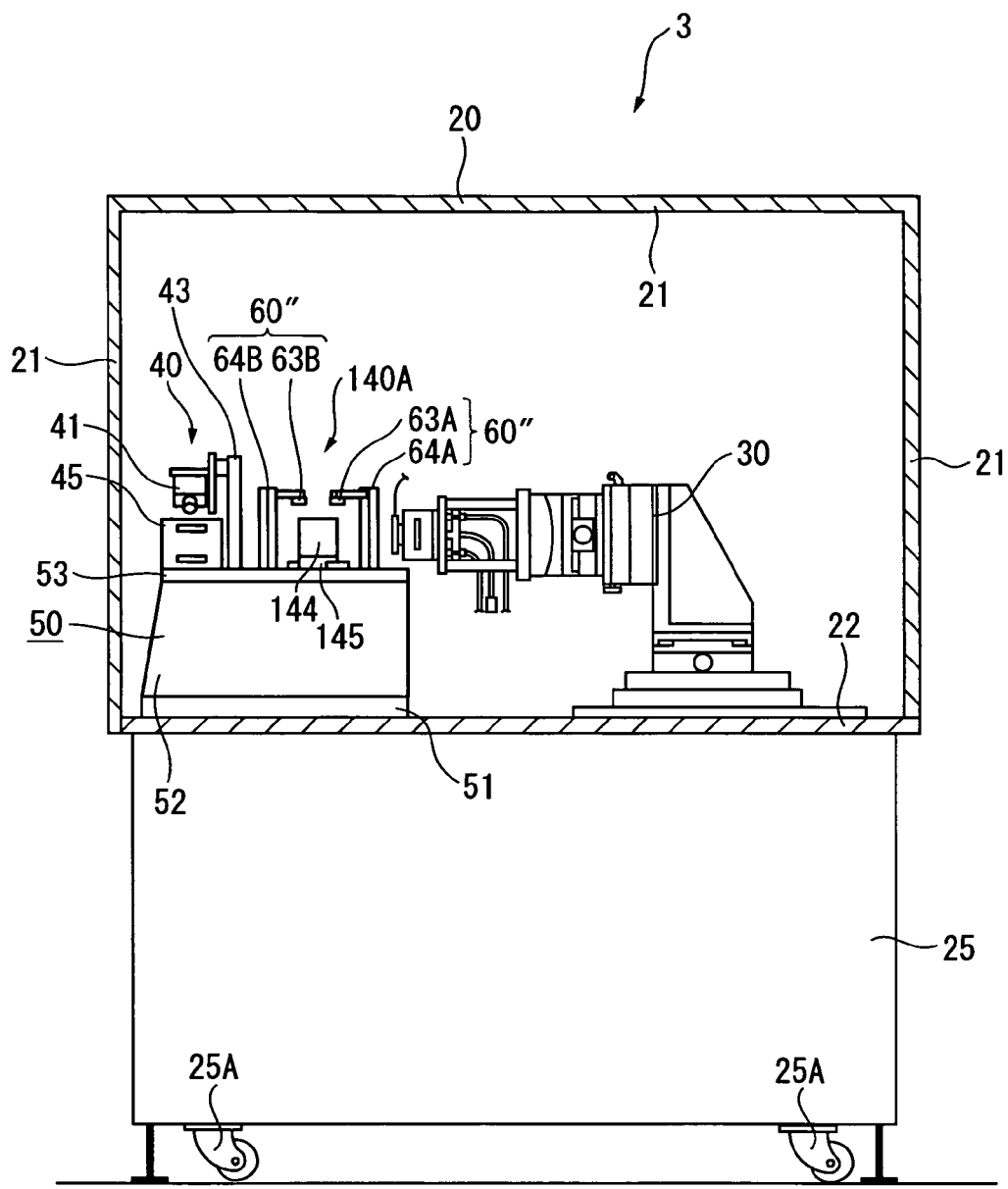
FIG. 28 is a view showing a manufacturing apparatus of an optical device body according to a third exemplary embodiment.
Figure 29:
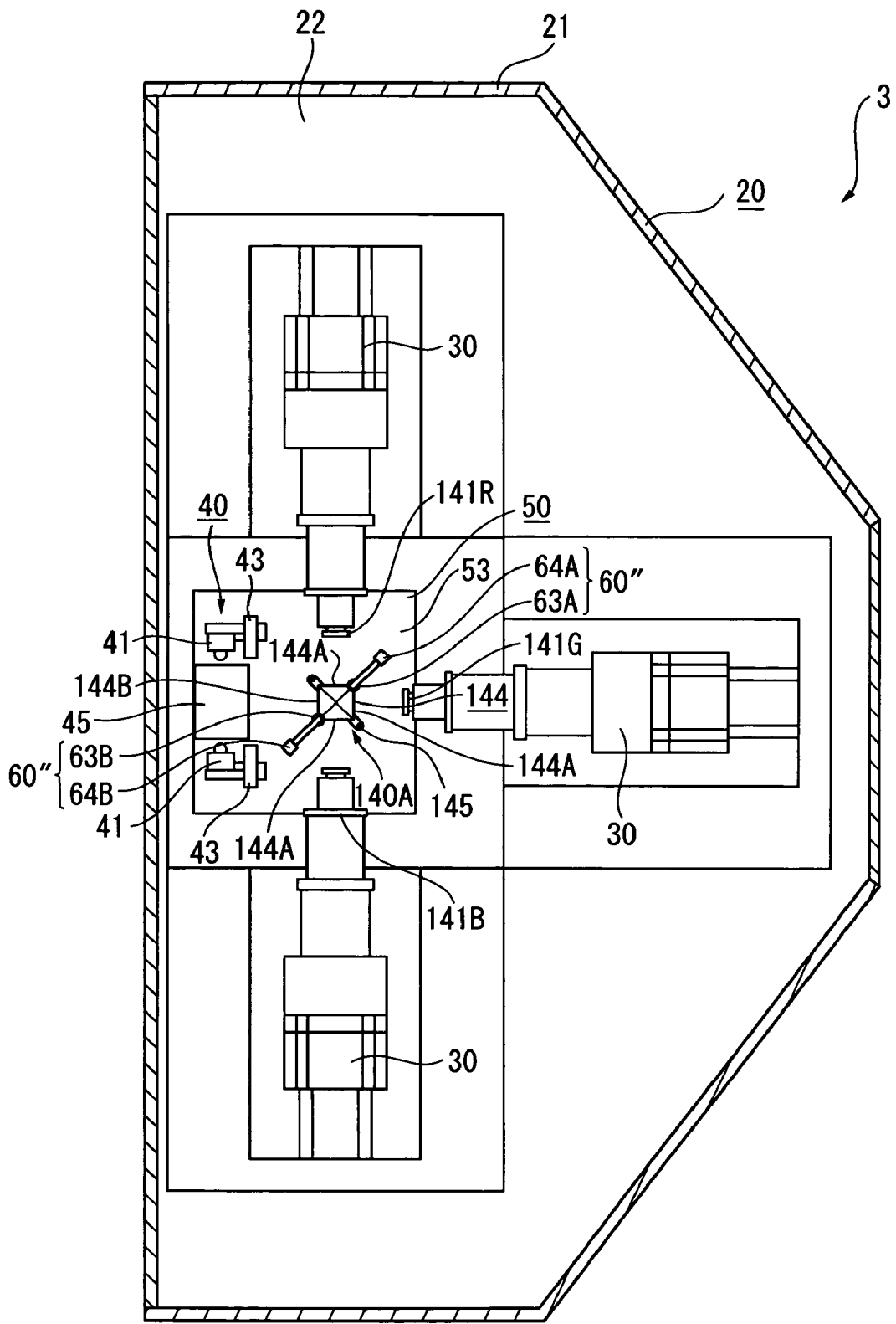
FIG. 29 is another view showing the manufacturing apparatus of the optical device body according to the third exemplary embodiment.

FIGS. 28 and 29 are views showing the manufacturing apparatus 3 of the optical device body 140A according to the third exemplary embodiment. Specifically, FIG. 28 is a side view of the manufacturing apparatus 3, and FIG. 29 is a plan view showing an upper side of the manufacturing apparatus 3.

Figure 30:
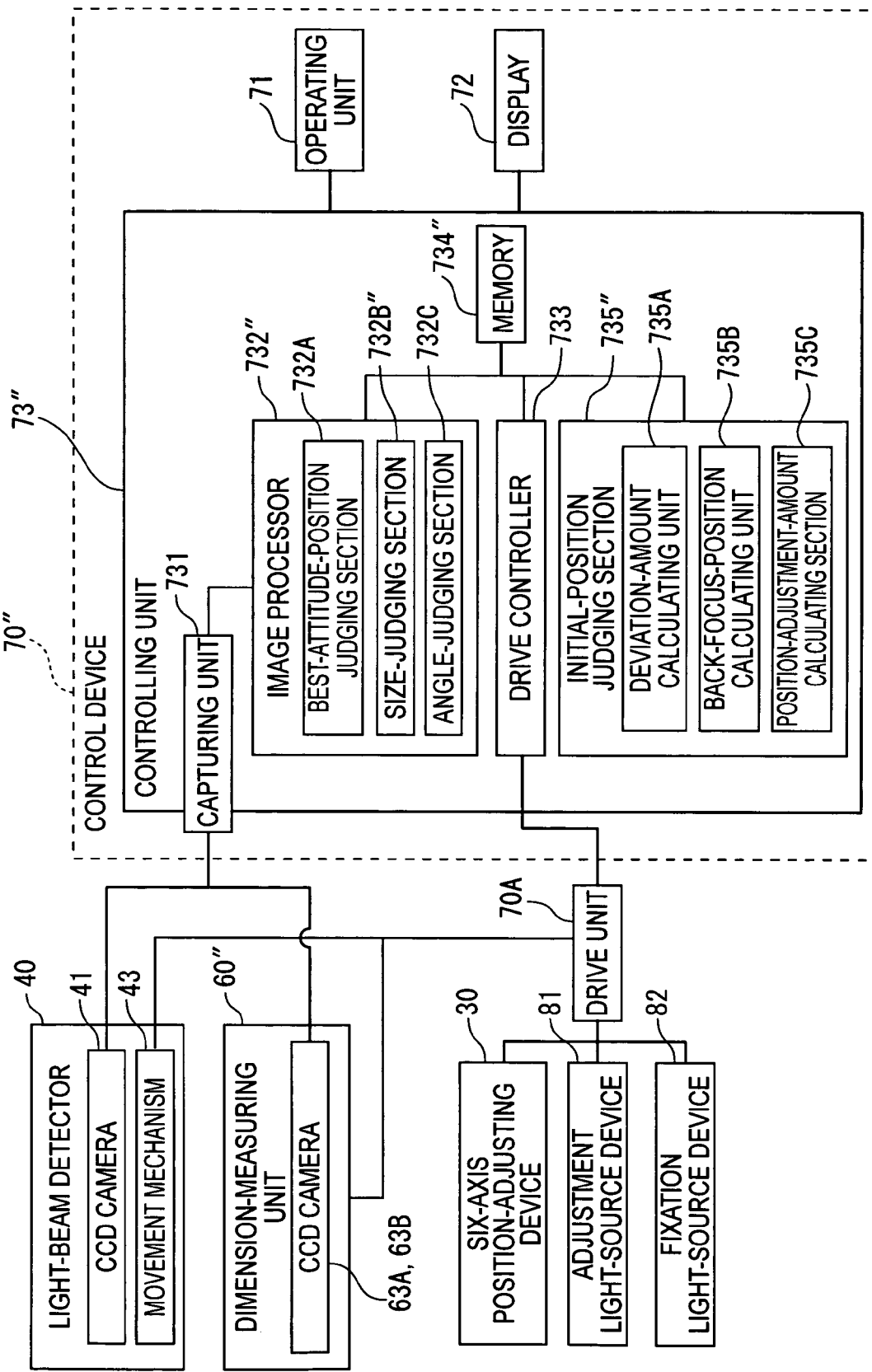
FIG. 30 is a block diagram showing a control structure of a control device according to the third exemplary embodiment.

FIG. 30 is a block diagram showing a control structure of a control device 70" according to the third exemplary embodiment.

As shown in FIGS. 28 through 30, the dimension-measuring unit 60" constituting the manufacturing apparatus 3 has the two CCD cameras 63A and 63B as an image pickup, two support members 64A and 64B, the size-judging section 732B" constituting the control device 70", an angle-judging section 732C and a position-adjustment-amount calculating section 735C.

The two CCD cameras 63A and 63B are the area sensor that employs a CCD as the image pickup element like the CCD cameras 41 described in the first exemplary embodiment, the two CCD cameras 63A and 63B capturing each diagonal area of upper surfaces of the cross dichroic prism 144 and outputting the captured images as electrical signals.

Specifically, as shown in FIG. 29, the CCD camera 63A captures an angle area formed by the light incident surface 144A and the light irradiation surface 144B on the red-light optical modulator 141R side. On the other hand, also as shown in FIG. 29, the CCD camera 63B captures an angle area formed by the light irradiation surface 144B and the light incident surface 144A that is on the blue-light optical modulator 141B side.

The two support members 64A and 64B vertically surmount on the mounting unit 50 and support the two CCD cameras 63A and 63B such that the two CCD cameras 63A and 63B can capture the angle areas. The support members 64A and 64B may be capable of adjusting, for instance, three-dimensional positions of the CCD cameras 63 supported thereby.

In the third exemplary embodiment, the memory 734" (FIG. 30) constituting the controlling unit 73" of the control device 70" stores the same data that the memory 734 of the first exemplary embodiment stores as well as data such as other model data and reference diagonal area data.

The reference diagonal area data is data on the reference diagonal area in which the upper surfaces of the reference cross dichroic prism 144 are captured by the CCD cameras

63A and 63B in a state that the reference cross dichroic prism, which is a reference of the cross dichroic prism to be manufactured, is at a designed position. The reference diagonal area data may be data in which edges of the upper surfaces of the reference cross dichroic prism in the reference diagonal areas are represented as coordinate values (e.g., pixel positions in the images of the reference diagonal areas).

The model data may include the followings.

The model data may include data on a horizontal dimension (lateral direction orthogonal to the optical axis) of the reference optical modulator that is a reference of the optical device body 140A to be manufactured, which is hereinafter referred to as a panel dimension.

The model data may also include data on a designed maximum distance in the optical-axis direction from the reference optical modulator to a boundary of the reference cross dichroic prism, which is hereinafter referred to as a focus-direction dimension.

Further, the model data may include data on a distance in the optical-axis direction of the reference cross dichroic prism, that is, a distance between the light incident surface and the light irradiation surface which are opposing to each other and a distance between the opposing light incident surfaces, which is hereinafter referred to as a designed prism dimension.

The size-judging section 732B" constituting an image processor 732" of the controlling unit 73" reads the image signals of the image captured by the two CCD cameras 63A and 63B which are output via the capturing unit 731 and recognizes the image of the diagonal areas captured by the two CCD cameras 63A and 63B. The size-judging section 732B" detects the edge of the upper surface of the cross dichroic prism 144 in the diagonal areas based on the recognized image. The size-judging section 732B" calculates a deviation between an intersection point of the detected edges (top point of the upper surface of the cross dichroic prism 144) and a reference intersection point (reference top point) based on the reference diagonal area data stored in the memory 734" and calculates the external dimension of the cross dichroic prism 144 (distances between the opposing surfaces of the light incident surfaces 144A and between the light incident surface 144A and the light irradiation surface 144B of the cross dichroic prism 144) based on the calculated deviation and the designed prism dimension stored in the memory 734". Then, the size-judging section 732B" stores the calculated external dimension in the memory 734".

The angle-judging section 732C constituting the image processor 732" of the controlling unit 73" calculates a rotation angle of the cross dichroic prism 144 relative to the designed reference position based on the edges of the upper surface of the cross dichroic prism 144 in the diagonal areas that are detected by the size-judging section 732B" and the edges of the reference diagonal area data stored in the memory 734". Then, the angle-judging section 732C stores the calculated rotation angle in the memory 734".

The position-adjustment-amount calculating section 735C constituting the initial-position judging section 735" of the controlling unit 73" calculates a position adjustment amount for positioning the optical modulator 141 at a position in accordance with the rotation of the cross dichroic prism 144 based on the rotation angle of the cross dichroic prism 144 stored in the memory 734" and the like. Then, the position-adjustment-amount calculating section 735C stores the calculated position adjustment amount in the memory 734".

Manufacturing Method of Optical Device Body

The manufacturing method of the optical device body 140A according to the above-explained manufacturing apparatus 3 will be described next. The third exemplary embodiment differs from the first exemplary embodiment in terms of the measuring method of the external dimension of the cross dichroic prism 144 (Step S4) and the position-adjusting method of the optical modulator 141 (Step S6). Hence, only a measuring method of the external dimension of the cross dichroic prism (Step S41) and a position-adjusting method of the optical modulator 141 (Step S61) will be described below.

Measuring Method of External Profile of Cross Dichroic Prism

Figure 31:
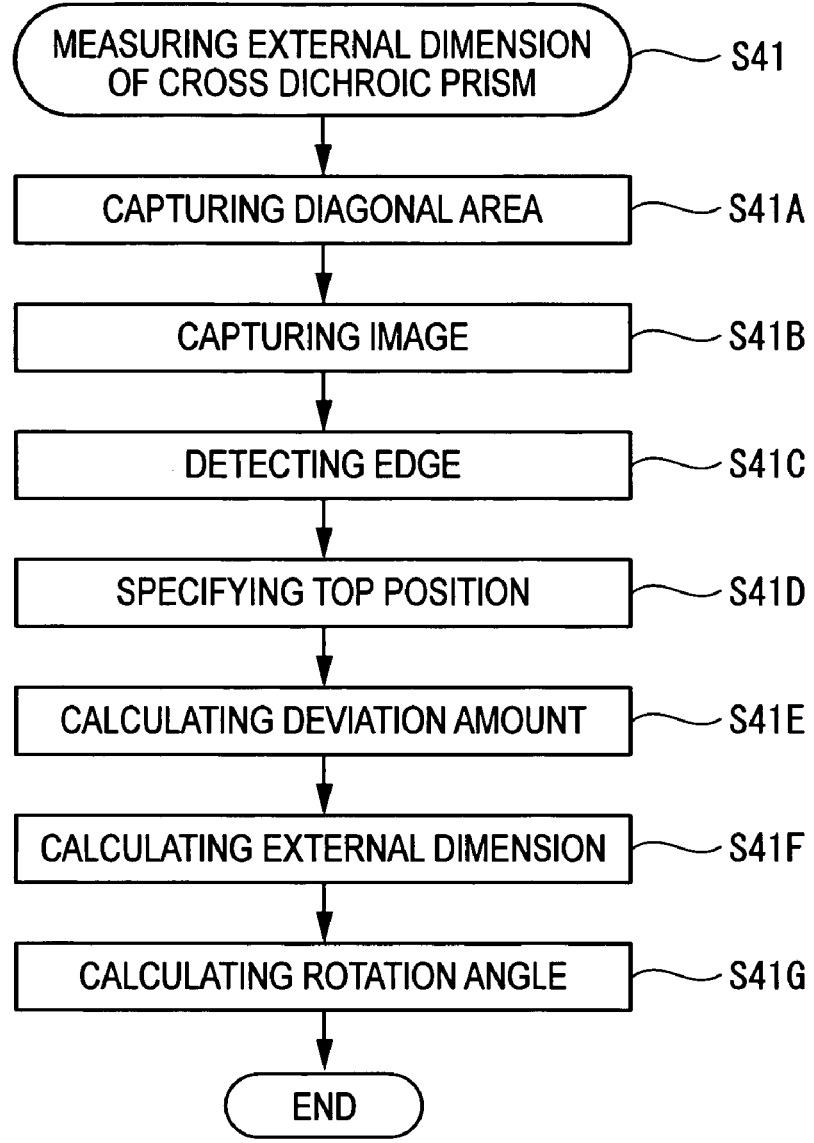
FIG. 31 is a flowchart to explain a measuring method of an external dimension of a cross dichroic prism according to the third exemplary embodiment.

FIG. 31 is a flowchart to explain a measuring method (Step S41) for the external dimension of the cross dichroic prism 144.

The operator operates the operating unit 71 of the control device 70" in order to input for requesting a measurement of the external dimension of the cross dichroic prism 144. The controlling unit 73" of the control device 70" invokes the program stored in the memory 734" and performs the following process.

The controlling unit 73" controls the CCD cameras 63A and 63B to capture the diagonal areas of the upper surface of the cross dichroic prism 144 (Step S41A).

Figure 32A:
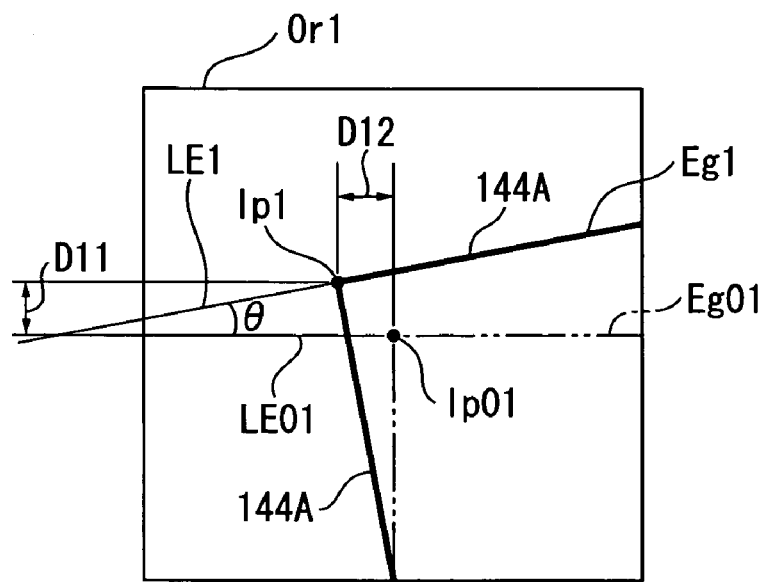
FIGS. 32A and 32B are illustrations showing examples of images captured by CCD cameras according to the third exemplary embodiment.
Figure 32B:
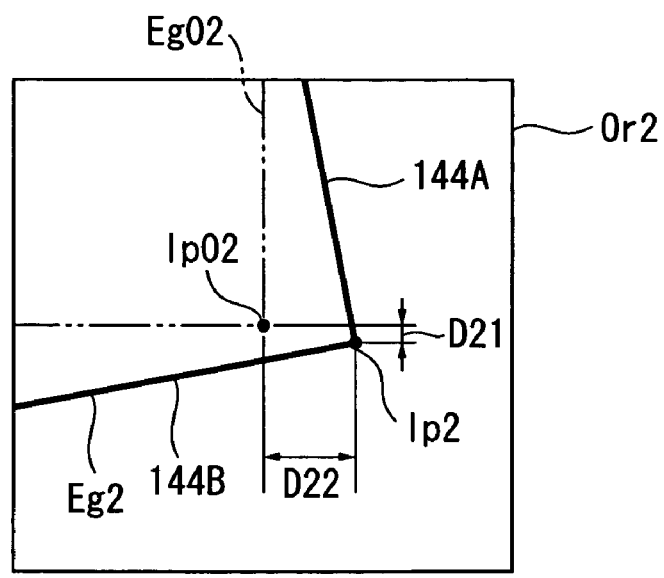

FIGS. 32A and 32B are illustrations showing examples of the images captured by the CCD cameras 63A and 63B. Specifically, FIG. 32A is an illustration showing an example of the image captured by the CCD camera 63A, and FIG. 32B is an illustration showing an example of the image captured by the CCD camera 63B.

Subsequent to the Step S41A, the capturing unit 731 of the controlling unit 73" inputs the signals output by the CCD cameras 63A and 63B and converts the input signals to the image signals (Step S41B). And then, the capturing unit 731 outputs the converted image signals to the image processor 732".

Subsequent to the Step S41B, the size-judging section 732B" of the image processor 732" reads the images signals output by the capturing unit 731, detects the edges Eg1 and Eg2 of the upper surfaces of the cross dichroic prism 144 in the diagonal areas Or1 and Or2 and calculates the edges Eg1 and Eg2 as coordinate values as shown, e.g., in FIGS. 32A and 32B (Step S41C). The edges Eg1 and Eg2 may be calculated based on, for instance, a difference in the luminance of the adjacent pixels of the images of the diagonal areas Or1 and Or2, and the coordinate values of the edges Eg1 and Eg2 may be the calculated pixel positions of the edges Eg1 and Eg2. Then, the size-judging section 732B" stores the calculated coordinate values of the edges Eg1 and Eg2 in the memory 734".

Subsequent to the Step S41C, the size-judging section 732B" specifies the positions (coordinate values) of the intersection points Ip1 and Ip2 (top points) of the edges Eg1 and Eg2 based on the coordinate values of the edges Eg1 and Eg2 stored in the memory 734" (Step S41D).

Subsequent to the Step S41D, the size-judging section 732B" calculates, based on the reference diagonal area data stored in the memory 734", deviation amounts D11, D12, D21, D22 respectively between the reference intersection points Ip01 and Ip02 (reference top points) of the edges Eg01 and Eg02 and the recognized intersection points Ip1 and Ip2 in the two directions of the axes along edges Eg01 and Eg02 (vertical and horizontal directions in FIGS. 32A and 32B) as shown, e.g., in FIGS. 32A and 32B (Step S41E). Note that, the edges Eg01 and Eg02 that are based on the reference diagonal area data stored in the memory 734" are calculated in advance by the same manner as the above described edges Eg1 and Eg2.

The deviation amount D11 becomes a negative value when the intersection point Ip1 is below the reference intersection point Ip01 in FIG. 32A. The deviation amount D12 becomes a negative value when the intersection point Ip1 is on the right side of the reference intersection point Ip01 in FIG. 32A. The deviation amount D21 becomes a negative value when the intersection point Ip2 is above the reference intersection point Ip02 in FIG. 32B. The deviation amount D22 becomes a negative value when the intersection point Ip2 is on the left side of the reference intersection point Ip02 in FIG. 32B.

Thus, in the examples shown in FIGS. 32A and 32B, the deviation amounts DI1, D12, D21, D22 are all positive values.

Subsequent to the Step S41E, the size-judging section 732B" reads the designed prism dimension stored in the memory 734" and calculates the external dimension in the optical-axis direction of the cross dichroic prism 144 by the quotations (2) and (3) (Step S41F). Then, the size-judging section 732B" stores the calculated external dimension in the memory 734".

$$X = A1 + (D11 + D21) \quad (2)$$

$$Y = A2 + (D12 + D22) \quad (3)$$

In the quotation (2), X is the distance between the light incident surface 144A and the light irradiation surface 144B that are opposite to each other of the cross dichroic prism 144. In other words, X is equal to (LA1+LA2) described in the first exemplary embodiment. A1 is the distance between the light incident surface and the light irradiation surface that are opposite to each other of the reference cross dichroic prism based on the designed prism dimension.

In the equation (3), Y is the distance between the opposing light incident surfaces of the cross dichroic prism 144. In other words, Y is equal to (LA3+LA4) described in the first exemplary embodiment. A2 is the distance between the opposing light incident surfaces of the reference cross dichroic prism based on the designed prism dimension.

Subsequent to the Step S41F, the angle-judging section 732C calculates a rotation angle of the cross dichroic prism 144 relative to the designed reference position based on the edges Eg1 and Eg2 stored in the memory 734" and the edges Eg01 and Eg02 based on the reference diagonal areas (Step S41G). As shown in FIG. 32A, the angle-judging section 732C calculates an angle θ formed by a straight line LE1 horizontally extending on the edge Eg1 and the straight line Le01 vertically extending on the edge Eg01 as the rotation angle of the cross dichroic prism 144 relative to the designed reference position. However, the measuring method of the rotation angle is not limited the above explained method and the rotation angle may be calculated by a different method as long as the rotation angle is calculated based on the edges Eg1 and Eg01 or based on the edges Eg2 and Eg02.

Position-Adjusting Method of Optical Modulator

Figure 33:
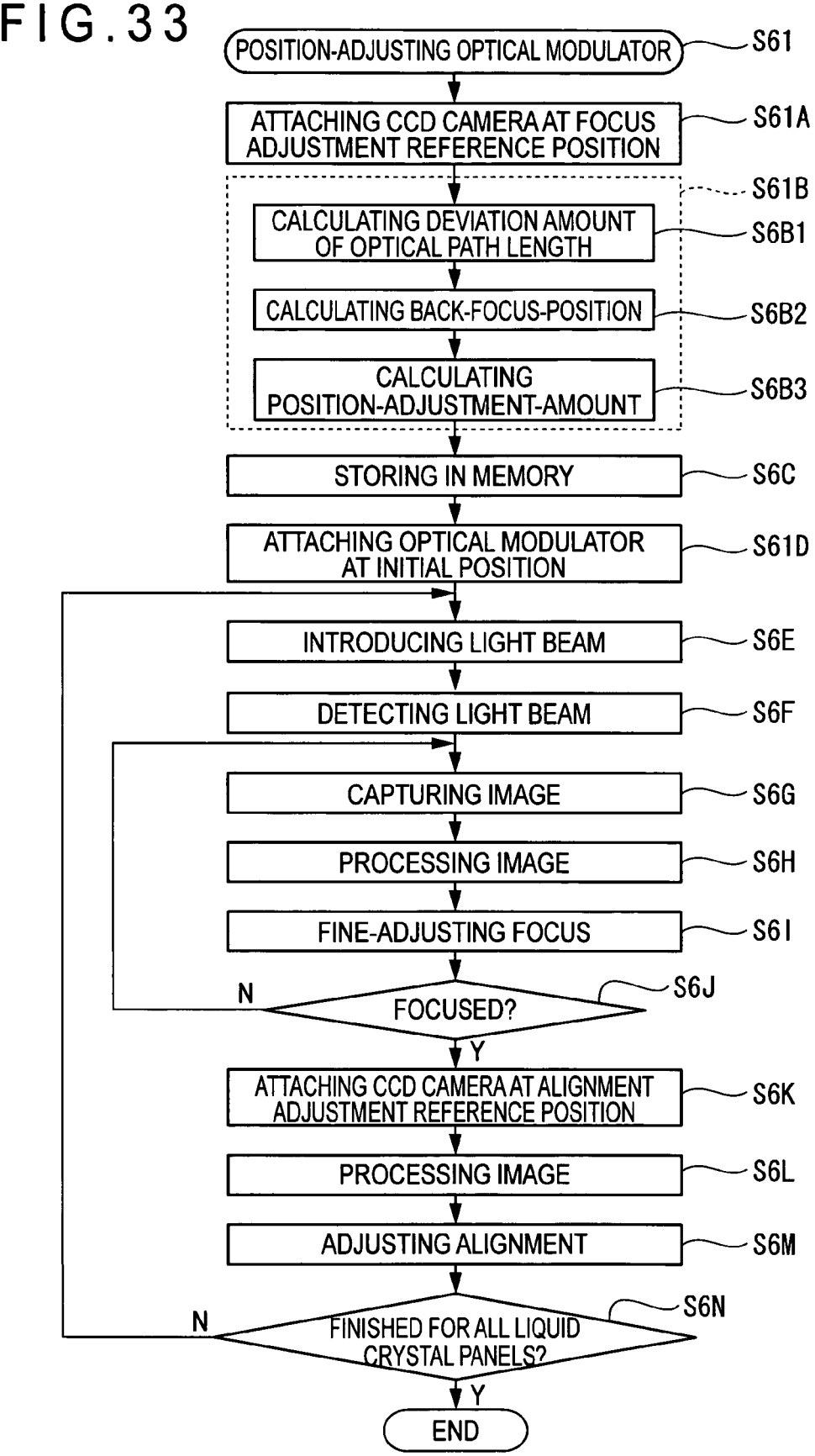
FIG. 33 is another flowchart to explain a position-adjusting method of optical modulators according to the third exemplary embodiment.

FIG. 33 is a flowchart to explain a position-adjusting method (Step S61) of the optical modulator 141.

The position-adjusting method (Step S61) of the optical modulator 141 according to the third exemplary embodiment differs from the first exemplary embodiment in terms of the judging method of the initial position (Step S6B) and the positioning process (Step S6D) in the position-adjusting method (Step S6). Hence, only a judging method of the initial position (Step S61B) and a positioning process (Step S61D) will be described below.

Judging Method of Initial Position

In the judging method of the initial position (Step 61B), the calculation of the deviation amount of the optical path length (Step S6B1) and the calculation of the back-focus position of the projection lens 160 (Step S6B2) are performed by the initial-position judging section 735" of the controlling unit 73" in the substantially same manner as the first exemplary embodiment. Note that, in the Steps S6B1 and S6B2 of the third exemplary embodiment, the initial-position judging section 735" calculates and uses the distances LA1 to LA4 based on the external dimension (X, Y) of the cross dichroic prism 144 stored in the memory 734".

Subsequent to the Step S6B2, the position-adjustment-amount calculating section 735C calculates a position adjustment amount (rotation amount and position-shift amount) for positioning the optical modulator 141 at a position in accordance with the rotation of the cross dichroic prism 144 based on the rotation angle θ of the cross dichroic prism 144 stored in the memory 734" (Step S6B3). Then, the position-adjustment-amount calculating section 735C stores the calculated position adjustment amount in the memory 734".

Figure 34:
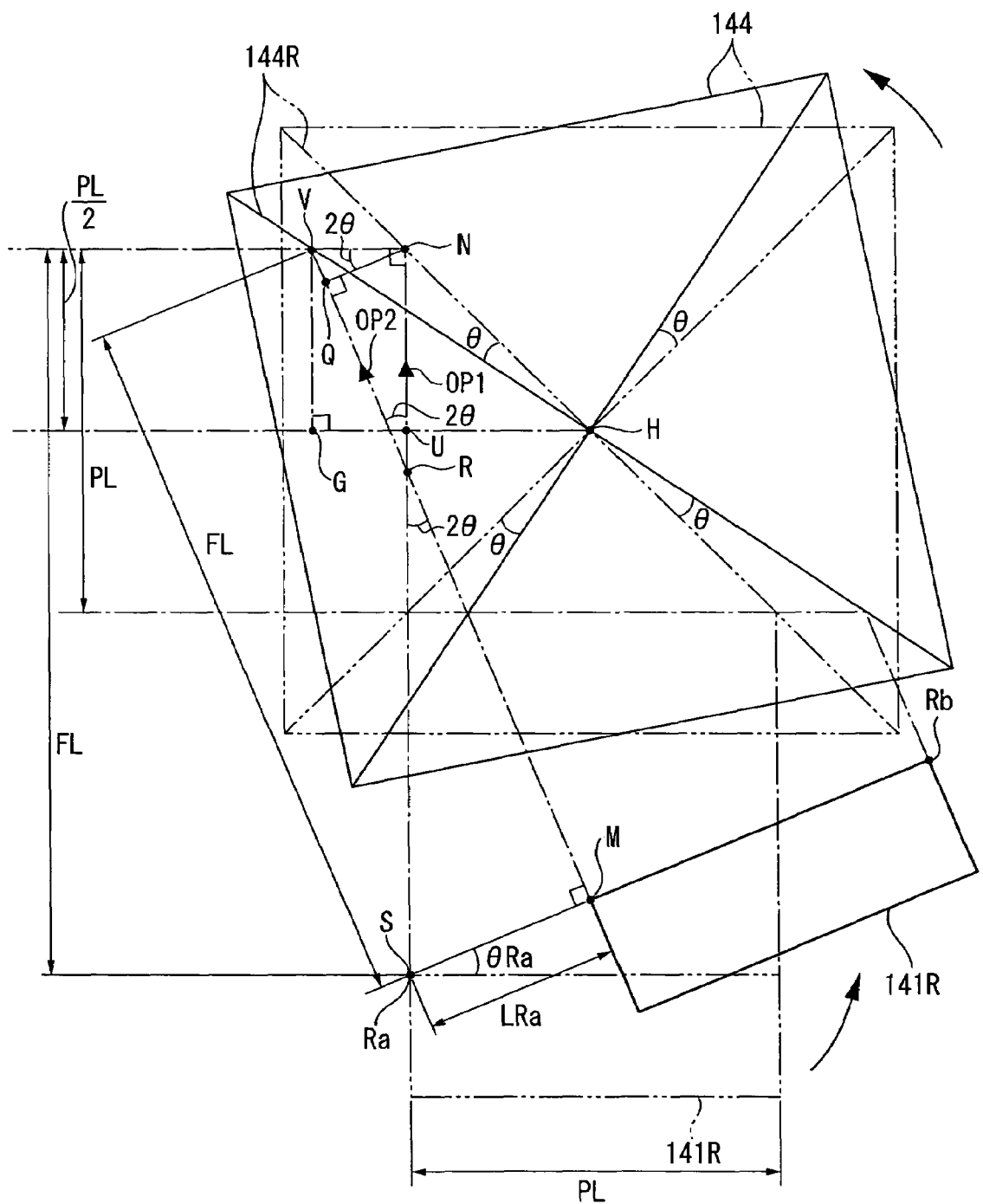
FIG. 34 is an illustration to explain a calculating method of a position adjustment amount according to the third exemplary embodiment.

FIG. 34 is an illustration to explain a calculating method of a position adjustment amount. Specifically, FIG. 34 is a plan view schematically showing the cross dichroic prism 144 and the red-light optical modulator 141R.

It should be noted that, even if the red-light optical modulator 141R is positioned at the back-focus position (position of the optical modulator 141R shown in a chain double-dashed line in FIG. 34) calculated in the Step S6B2, an introduction position of the light beam passing through the optical modulator 141R and the cross dichroic prism 144 on the projection lens 160 tends to be displaced from a designed reference introduction position, because a reflecting surface 144R of the cross dichroic prism 144 is rotated in a state that the cross dichroic prism 144 is rotated by a predetermined rotation angle θ (as shown in a solid line in FIG. 34) relative to the designed reference position (position of the cross dichroic prism 144 shown in a chain double-dashed line in FIG. 34). Hence, in the state that the cross dichroic prism 144 is rotated by the predetermined rotation angle θ relative to the designed reference position, the position of the optical modulator 141R needs to be adjusted to the predetermined position (position of the optical modulator 141R shown in a solid line in FIG. 34) such that the introduction position becomes the same as the reference introduction position in the state when the cross dichroic prism 144 is on the designed reference position. Accordingly, even if the optical modulator 141R is positioned at the back-focus position calculated in the Step S6B2, the position adjustment of the optical modulator 141R requires a lot of time in the state that the cross dichroic prism 144 is rotated by the predetermined rotation angle relative to the designed reference position.

The position-adjustment-amount calculating section 735C calculates, as a rotation angle 2θ, the rotation amount θRa of the position adjustment amount of the optical modulator 141R which is for positioning the optical modulator 141R to the predetermined position that ensures the same introduction position based on the rotation angle θ of the cross dichroic prism 144 stored in the memory 734".

The reason why the rotation amount θRa of the optical modulator 141R is considered as the rotation angle 2θ is as follows.

Generally, it is known that if either one of an incident optical path and a reflection optical path of a light beam is aligned in a state that a reflecting surface is not rotated and in a state that the reflecting surface is rotated in a predetermined direction by a predetermined angle θA, the other one of the incident optical path and the reflection optical path is displaced in the predetermined direction by an angle that is twice the predetermined angle θA. Hence, as shown in FIG. 34, when the reflecting surface 144R is rotated in the predetermined direction by the rotation angle θ, the optical modulator 141R needs to be rotated such that the incident optical path Op2 is positioned at a location displaced in the predetermined direction from the designed incident optical path Op1 by the angle 2θ, which is twice the rotation angle θ. In the third exemplary embodiment, when the cross dichroic prism 144 is rotated relative to the designed reference position in relation with the optical modulator 141R, the position-adjustment-amount calculating section 735C calculates, as the rotation angle 2θ that is twice the rotation angle θ, the rotation amount θRa to rotate the cross dichroic prism 144 in the rotation direction around an angle position Ra on a side that the cross dichroic prism 144 and the optical modulator 141R are close to each other as a rotation axis.

The position-adjustment-amount calculating section 735C calculates the position-shift amount LRa of the position adjustment amount of the optical modulator 141R for positioning the optical modulator 141R at the predetermined position enabling the same introduction position using an equation (4) below based on the rotation angle θ, the panel dimension PL and the focus-direction dimension FL of the cross dichroic prism 144, which are stored in the memory 734". In the third exemplary embodiment, as shown in FIG. 34, the position-adjustment-amount calculating section 735C calculates the position-shift amount LRa as a shift amount in a direction extending from the angle position Ra to an angle position Rb opposite to the angle position Ra in the state that the optical modulator 141R is rotated in the rotation direction of the cross dichroic prism 144 by the rotation amount θRa.

$$LRa = (FL*\sin 2\theta) - (PL*\tan \theta * \cos 2\theta)/(1-\tan \theta) \quad (4)$$

The detail explanation of the equation (4) is as follows.

As shown in FIG. 34, regarding a right-angle triangle having apexes N, Q, R and an right-angle triangle having apexes S, M, R, the position-shift amount LRa is obtained by calculating a distance SM between the apexes S and M, which can be obtained by an equation (5) below.

$$\begin{aligned} SM &= (NR*\sin 2\theta) + (RS*\sin 2\theta) - NQ \\ &= (NR + RS)*\sin 2\theta - NQ \\ &= FL*\sin 2\theta - NQ \end{aligned} \quad (5)$$

In the equation (5), NR is a distance between the apexes N and R; RS is a distance between the apexes R and S; and NQ is a distance between the apexes N and Q.

Herein, as shown in FIG. 34, a distance NV between the apexes N and V is equal to a distance GU between the apexes G and U, i.e., a distance (GH–UH) obtained by subtracting a distance UH between the apexes U and H from a distance GH between the apexes G and H. The distance UH is equal to PL/2, because the apexes N, U, H form a isosceles right triangle. Regarding a right-angle triangle formed by the apexes V, G, H, the angle at the apex H is 45°−θ, the angle at the apex V is 45°+θ, and GH is (PL/2)*tan(45°+θ). Accordingly, NV is obtained in an equation (6) below.

$$\begin{aligned} NV &= GH - UH \\ &= (PL/2)*\tan(45° + \theta) - PL/2 \\ &= (PL*\tan\theta)/(1-\tan\theta) \end{aligned} \quad (6)$$

Regarding a right-angle triangle formed by the apexes N, V and Q, NQ is NV*cos 2θ. That is, NQ is (PL*tan θ*cos 2θ)/(1−tan θ). Thus, the equation (4) is derived by substituting (PL*tan θ*cos 2θ)/(1−tan θ) in NQ of the equation (5).

Positioning Process

In the positioning process (Step S61D), the drive controller 733 drives the six-axis position-adjusting device 30, thereby positioning the optical modulator 141 at the predetermined initial position as explained below.

Like in the Step S6D described in the first exemplary embodiment, the drive controller 733 reads the coordinate values of the back-focus positions PR, PG, PB stored in the memory 734" and outputs predetermined control signals to the drive unit 70A to move the six-axis position-adjusting devices 30, thereby locating the optical modulators 141 at the back-focus positions PR, PG, PB.

Then, the drive controller 733 reads the rotation amount θRa of the position adjustment amount stored in the memory 734" and outputs a predetermined control command to the drive unit 70A in order to drive the six-axis position-adjusting device 30, thereby rotating the red-light optical modulator 141R in the rotation direction of the cross dichroic prism 144 by the rotation angle 2θ around the angle position Ra as a rotation axis. The drive controller 733 also rotates the blue-light optical modulator 141B in the same manner.

Then, the drive controller 733 reads the position-shift amount LRa of the position adjustment amount stored in the memory 734" and outputs a predetermined control command to the drive unit 70A in order to drive the six-axis position-adjusting device 30, thereby moving the red-light optical modulator 141R in the direction extending from the angle position Ra to the angle position Rb opposite to the angle position Ra by the position-shift amount LRa. The drive controller 733 also moves the blue-light optical modulator 141B in the same manner.

In the above described third exemplary embodiment, the dimension-measuring unit 60" has the two CCD cameras 63A, 63B and the size-judging section 732B" and measures the external dimension of the cross dichroic prism 144 in the optical direction based on the deviation amounts D11, D12, D21, D22 respectively between the intersection points Ip01 and Ip02 of the designed reference diagonal area data stored in the memory 734" and the intersection points Ip1 and Ip2 of the diagonal areas Or1 and Or2 captured by the CCD cameras 63A, 63B. Accordingly, the same advantages as the first exemplary embodiment can be obtained.

The size-judging section 732B" can calculates the external dimension (X, Y) of the cross dichroic prism 144 in the optical-axis direction based on the deviation amounts D11, D12, D21, D22 and the designed prism dimension (A1, A2) stored in the memory 734" by a simple calculation with the equations (2) and (3).

The dimension-measuring unit 60" has the angle-judging section 732C, so that the dimension-measuring unit 60" can measure the external dimension of the cross dichroic prism 144 in the optical-axis direction as well as the rotation angle θ of the cross dichroic prism 144 relative to the designed reference position based on the reference diagonal area data stored in the memory 734" and the diagonal areas Or1, Or2 captured by the CCD cameras 63A and 63B.

The initial-position judging section 735" has the position-adjustment-amount calculating section 735C, so that the initial-position judging section 735" can calculates the respective position adjustment amount (rotation amount θRa and position-shift amount LRa) of the optical modulators 141R, 141B which corresponds to the rotation of the cross dichroic prism 144 based on the rotation angle θ of the cross dichroic prism 144 measured by the dimension-measuring unit 60".

After positioning the optical modulators 141 at the back-focus positions PR, PG, PB in the positioning process (Step S61D), the drive controller 733 then moves the red-light optical modulator 141R and the blue-light optical modulator 141B to the positions corresponding to the rotation of the cross dichroic prism 144 based on the position adjustment amount (rotation amount θRa and position-shift amount LRa) calculated by the position-adjustment-amount calculating section 735C.

Accordingly, even when the cross dichroic prism 144 is rotated by the predetermined rotation angle relative to the designed reference position, the optical modulator 141 can be positioned at an appropriate position relative to the cross dichroic prism 144, thereby quickly performing position adjustment of the optical modulator 141 in the position-adjusting method of the optical modulator 141 (Step S61) without increasing a processing time for the focus-fine-adjustment (S61) and the alignment adjustment (S6M) which are performed on the downstream.

The position-adjustment-amount calculating section 735C can calculate the position-shift amount LRa of the optical modulators 141R, 141B based on the rotation angle θ, the focus-direction dimension FL and the panel dimension PL of the cross dichroic prism 144 which are stored in the memory 734'' by a simple calculation with the equations (4).

While the invention has been described above with the preferable exemplary embodiments, the invention is not limited to the exemplary embodiments, but includes improvements and modifications as long as an advantage of some aspects of the invention can be achieved.

In the above-described embodiments, the arrangements of the manufacturing apparatus 1, 2 and 3 are not limited to the ones explained therein.

As one example, in the above-explained first and third exemplary embodiments, the three six-axis position-adjusting devices 30 are provided in correspondence with the optical modulators 141, but the arrangement is not limited thereto, and another arrangement, for instance, in which the mounting unit 50 is rotatable around the center position of the cross dichroic prism 144 and only one six-axis position-adjusting device 30 is provided, may be provided.

As another example, in the second exemplary embodiment, an arrangement may be employed in which the light-beam detector 95 is not provided and each of the six-axis position-adjusting devices 30 are manually operated for the focus-fine-adjustment and the alignment adjustment of the optical modulators 141 (liquid crystal panels 1411) while checking the projection image projected on the transimissive screen 93 with eyes. When such arrangement is employed, the light-beam detector 95 and the best-attitude-position judging section 732A of the controlling unit 73 may not be provided, thereby simplifying the arrangement of the manufacturing apparatus 2 as well as reducing the manufacturing cost of the manufacturing apparatus 2.

In the first and second exemplary embodiments, the arrangement of the dimension-measuring unit 60 is not limited to the arrangement explained therein.

The dimension-measuring unit 60 may be a contact-type that measures the external dimension in the direction of the optical axis of the cross dichroic prism 144 by bringing a probe into contact with the cross dichroic prism 144.

In the first and second exemplary embodiments, the dimension-measuring unit 60 is arranged so as to irradiate the laser beam and receive the reflected laser beam, but as long as the light beam is irradiated and the light beam having passed through the cross dichroic prism 144 is detected, any arrangement other than utilizing or reflecting the laser light may be employed. An arrangement can be exemplified, in which a light-irradiating section and a light-receiving section are provided, the light-irradiating section being disposed on either one of the light incident surfaces 144A of the cross dichroic prism 144 or the light irradiation surface 144B thereof as well as irradiating the light beam to the cross dichroic prism 144, and the light-receiving section being disposed on the other surface opposing to the one surface as well as receiving the light beam irradiated by the light-irradiating section. In this arrangement, the external dimension of the cross dichroic prism 144 in the optical direction is measured by calculating a light volume of the light beam received by the light-receiving section, i.e., the light volume of the light beam shielded by the cross dichroic prism 144.

In the first and second exemplary embodiments, the four dimension-measuring units 60 are provided, but at least two of the dimension-measuring units 60 need to be provided. When the two dimension-measuring units 60 are provided, one of the light incident surfaces 144A and light irradiation surface 144B of the cross dichroic prism 144 (first plane) is the reference plane OL1, and a plane adjacent to the first plane (second plane) is the reference plane OL2. The dimension-measuring units 60 are opposingly provided on planes opposing the first and second planes (i.e. third and fourth planes, respectively). The dimension-measuring units 60 measure a distance between the first plane and the third plane opposing the first plane and a distance between the second plane and the fourth plane opposing the second plane. This arrangement requires fewer components as compared with the arrangement explained in the first and second exemplary embodiments, in which the four dimension-measuring units 60 are provided, thereby reducing the manufacturing cost of the manufacturing apparatus 2.

In the first and third exemplary embodiments, the CCD cameras 41 capture the image light having passed through the optical modulators 141 (liquid crystal panels 1411) and the cross dichroic prism 144, but any other arrangement can be employed. For instance, image pickup elements such as the 3CCD cameras explained in the second exemplary embodiment or MOS (metal-Oxide Semiconductor) sensors may be used for capturing. By employing the 3CCD cameras, which are explained in the second exemplary embodiment, instead of the CCD cameras 41, the focus-fine-adjustment and the alignment adjustment of the optical modulators 141 (liquid crystal panels 1411) can be simultaneously performed, thereby quickly manufacturing the optical device body 140A.

Similarly, in the second exemplary embodiment, the projection image on the transmisssive screen 93 is captured by the 3CCD cameras 951, but image pickup elements such as the CCD cameras explained in the first exemplary embodiment or the MOS sensors can be used for capturing.

In the exemplary embodiments, the manufacturing method of the optical device body 140A may not follow the flowcharts shown in FIGS. 11, 14, 18, 26, 27, 31 and 33. In the exemplary embodiments, the optical-modulator-holding process (Step S5, Step S16) only needs to be performed before the positioning process (Step S6D, Step S17D), so that the optical-modulator-holding process may not necessarily performed subsequent to the Step S4 or Step S15.

In the exemplary embodiments, as the distance information relating to the back-focus distance defined in accordance with the specifications of the projection lens 160, the back-focus position BF and the distance BF0 from the lens vertex T on the uppermost steam of the projection lens 160 to the planar center axis Ox of the cross dichroic prism 144 are employed and stored in the memory 734, but the distance information is not limited thereto. As the distance information, the distances BFR, BFG, BFB from the planar center axis Ox of the cross dichroic prism 144 to the designed back-focus positions may be employed and stored in the memory 734.

In the third exemplary embodiments, the arrangement of the dimension-measuring unit 60" is explained by using a case that the dimension-measuring unit 60" is employed in the first exemplary embodiment, but the dimension-measuring unit 60" is not limited to the use in the first exemplary embodiment and may be employed in the second exemplary embodiment.

In the third exemplary embodiment, the arrangement in which the angle-judging section 732C of the image processor 732" and the position-adjustment-amount calculating section 735C of the initial-position judging section 735" are omitted may be employed.

In the third exemplary embodiment, the two CCD cameras 63A, 63B are employed as the image pickup, but the arrangement is not limited thereto, and image pickup elements such as the 3CCD cameras explained in the second exemplary embodiment or MOS sensors may be alternatively employed. The two CCD cameras 63A, 63B may be positioned at different positions other than the positions described in the third exemplary embodiment as long as the CCD cameras 63A and 63B can capture the diagonal areas in the four angle areas of the upper surface of the cross dichroic prism 144.

In the third exemplary embodiment, the position-adjustment-amount calculating section 735C calculates the position-shift amount LRa of the optical modulators 141R, 141B by the equation (4), but the arrangement is not limited thereto, and a different arrangement in which another equation is used for the calculation may be employed as long as the position-shift amount of the optical modulators 141R, 141B corresponding to the rotation of the cross dichroic prism 144 can be calculated.

In the third exemplary embodiment, the optical modulators 141R, 141B are moved based on the position adjustment amount (rotation amount θRa and position-shift amount LRa), but another arrangement may be employed as long as the optical modulators 141 that are opposite to each other are moved, for instance, when the optical modulators 141R and 141G are opposingly disposed, only the optical modulators 141R and 141G need to be moved.

In the exemplary embodiments, the optical device body 140A are provided with the three optical modulators 141, but the optical device body 140A may have a different arrangement in which two optical modulators or more than four optical modulators are provided. The optical device body 140A has the arrangement in which the green-light optical modulator is disposed on the light incident surface confronting the projection lens 160 out of the three light incident surfaces of the cross dichroic prism 144 and the red-light optical modulator and the blue-light optical modulator are disposed on the other two light incident surfaces, but the positions of the optical modulators are not limited to such arrangement. Hence, the red-light optical modulator or the blue-light optical modulator may be arranged on the light incident surface confronting the projection lens 160, for instance.

In the exemplary embodiments, though the front-type projector that projects an image in a direction for observing the screen is explained as an example, the invention may employ a rear-type projector that projects an image in a direction opposite to the direction for observing the screen.

Although the best arrangement for implementing the invention has been disclosed above, the invention is not limited thereto. In other words, the invention is mainly illustrated and described on the specific embodiments, however, a person skilled in the art can modify the specific arrangement such as shape, material, quantity on the above-described embodiments as long as a technical idea and a scope of the invention can be achieved.

Therefore, the description limiting the shape and the material disclosed above is intended to be illustrative for easy understanding and not to limit the invention, hence the invention includes the description using a name of component without a part of or all of the limitation on the shape and the material etc.

The manufacturing apparatus of the optical device according to the invention can speedy manufacture the optical device. Therefore, it is useful as the manufacturing apparatus of the optical device.

What is claimed is:

1. A manufacturing apparatus of an optical device that is used for a projector, the optical device including a plurality of optical modulators that respectively modulate each of a plurality of color lights in accordance with image information; and a color-combining optical device that combines the color lights modulated by the optical modulators to form an image light, the projector including a projection optical device that is disposed on a downstream of an optical path of the optical device and projects the image light formed by the optical device in an enlarged manner, the manufacturing apparatus, comprising:

a holding unit that holds the color-combining optical device at a predetermined position;

position adjusters that respectively hold the optical modulators and adjust positions of the optical modulators relative to the color-combining optical device;

dimension-measuring units that measure an external dimension of the color-combining optical device in an optical-axis direction; and a controlling unit that drives the position adjusters, wherein the controlling unit includes:

a storage that stores distance information relating to a back-focus distance defined in accordance with specifications of the projection optical device;

a deviation-amount calculating unit that calculates a deviation amount of an optical path length of a light beam from the optical modulator to the projection optical device when the color-combining optical device is interposed between the optical modulator and the projection optical device based on the external dimension of the color-combining optical device in the optical-axis direction measured by the dimension-measuring units;

a back-focus-position calculating unit that calculates a back-focus position of the projection optical device in correspondence with a deviation of the optical path length based on the distance information stored in the storage and the deviation amount of the optical path length calculated by the deviation-amount calculating unit; and a drive controller that drives the position adjusters and positions the optical modulators at the back-focus positions of the projection optical device in correspondence with the deviation of the optical path length calculated by the back-focus-position calculating unit.

2. The manufacturing apparatus of the optical device according to claim 1, further comprising:

an adjustment light-source device that introduces a position-adjusting light beam to the optical modulator; and a light-beam detector that detects the image light passing through the optical modulator and the color-combining optical device, wherein the controlling unit includes:

a capturing unit that captures the image detected by the light-beam detector and converts the captured image to an image signal; and an image processor that performs an image processing based on the image signal output by the capturing unit and judges best attitude positions of the optical modulators based on results of the image processing, and after positioning the optical modulators at the back-focus positions of the projection optical device in correspondence with the deviation of the optical path length, the drive controller drives the position adjusters based on the best attitude positions judged by the image processor and finely adjusts the positions of the optical modulators.

3. The manufacturing apparatus of the optical device according to claim 1, wherein the dimension-measuring unit includes:

a laser-beam irradiation unit that irradiates a laser beam to a reference position or a measurement position in measuring an external dimension of an object to be measured in the optical-axis direction; and a laser-beam-receiving unit that receives the laser beam reflected at the reference position or the measurement position, and the dimension-measuring unit measures the external dimension of the object to be measured in the optical-axis direction based on a deviation between a light-receiving position on the laser-beam-receiving unit of the laser beam reflected at the reference position and a light-receiving position on the laser-beam-receiving unit of the laser beam reflected at the measurement position.

4. The manufacturing apparatus of the optical device according to claim 1, wherein the color-combining optical device has a rectangular shape in plan view, and the dimension-measuring unit has two image pickups that respectively capture rectangular diagonal areas of the color-combining optical device and measure the external dimension of the color-combining optical device in the optical-axis direction based on a deviation between designed reference top positions of reference diagonal areas of the color-combining optical device and top positions of the diagonal areas captured by the two image pickups.

5. The manufacturing apparatus of the optical device according to claim 4, wherein the dimension-measuring unit measures a rotation angle of the color-combining optical device relative to a designed reference position based on the reference diagonal areas and the diagonal areas captured by the two image pickups, the controlling unit has a position-adjustment-amount calculating section that calculates position adjustment amounts of the optical modulators in accordance with a rotation of the color-combining optical device based on the rotation angle of the color-combining optical device measured by the dimension-measuring unit, and the drive controller drives the position adjusters based on the position adjustment amounts calculated by the position-adjustment-amount calculating section and positions the optical modulators at positions corresponding to the position adjustment amounts.

6. A manufacturing method of an optical device that is used for a projector, the optical device including a plurality of optical modulators that respectively modulate each of a plurality of color lights in accordance with image information; and a color-combining optical device that combines the color lights modulated by the optical modulators to form an image light, the projector including a projection optical device that is disposed on a downstream of an optical path of the optical device and projects the image light formed by the optical device in an enlarged manner, the manufacturing method, comprising:

device-attaching for attaching the color-combining optical device at a predetermined position;

dimension-measuring for measuring an external dimension of the color-combining optical device in an optical-axis direction;

deviation-amount-calculating for calculating a deviation amount of an optical path length of a light beam from the optical modulator to the projection optical device when the color-combining optical device is interposed between the optical modulator and the projection optical device based on the external dimension of the color-combining optical device in the optical-axis direction measured in the dimension-measuring;

back-focus-position-calculating for calculating a back-focus position of the projection optical device in correspondence with a deviation of the optical path length based on the deviation amount of the optical path length calculated in the deviation-amount-calculating and distance information relating to a back-focus distance defined in accordance with specifications of the projection optical device;

optical-modulator-holding for holding the optical modulators by the position adjusters; and positioning the optical modulators at the back-focus positions of the projection optical device in correspondence with the deviation of the optical path length calculated in the back-focus-position-calculating by driving the position adjusters.

7. A projector, comprising:

a light source device;

an optical device; and a projection optical device that projects an image light formed by the optical device in an enlarged manner, wherein the optical device is manufactured by a manufacturing method, including:

device-attaching for attaching the color-combining optical device at a predetermined position;

dimension-measuring for measuring an external dimension of the color-combining optical device in an optical-axis direction;

deviation-amount-calculating for calculating a deviation amount of an optical path length of a light beam from the optical modulator to the projection optical device when the color-combining optical device is interposed between the optical modulator and the projection optical device based on the external dimension of the color-combining optical device in the optical-axis direction measured in the dimension-measuring;

back-focus-position-calculating for calculating a back-focus position of the projection optical device in correspondence with a deviation of the optical path length based on the deviation amount of the optical path length calculated in the deviation-amount-calculating and distance information relating to a back-focus distance defined in accordance with specifications of the projection optical device;

optical-modulator-holding for holding the optical modulators by the position adjusters;

positioning the optical modulators at the back-focus positions of the projection optical device in correspondence with the deviation of the optical path length calculated in the back-focus-position-calculating by driving the position adjusters.

* * * * *